US012636833B2

(12) United States Patent
Mackenzie et al.

(10) Patent No.: US 12,636,833 B2
(45) Date of Patent: May 26, 2026

(54) LARGE-SCALE 3D EXTRUSION PRINTING

(71) Applicant: The University of British Columbia, Vancouver (CA)

(72) Inventors: Jordan Mackenzie, Vancouver (CA); Dominic Mark Martinez, Vancouver (CA)

(73) Assignee: The University of British Columbia, Vancouver (CA)

( * ) Notice: Subject to any disclaimer, the term of this patent is extended or adjusted under 35 U.S.C. 154(b) by 816 days.

(21) Appl. No.: 17/902,721

(22) Filed: Sep. 2, 2022

(65) Prior Publication Data

US 2023/0182391 A1 Jun. 15, 2023

Related U.S. Application Data

(63) Continuation of application No. PCT/CA2021/050326, filed on Mar. 10, 2021.

(Continued)

(51) Int. Cl.

| | |
|---|---|
| ***B33Y 40/00*** | (2020.01) |
| ***B29C 64/321*** | (2017.01) |
| ***B33Y 70/00*** | (2020.01) |
| *B29K 101/00* | (2006.01) |
| *B29K 105/00* | (2006.01) |

(52) U.S. Cl.

CPC ............ *B29C 64/321* (2017.08); *B33Y 40/00* (2014.12); *B33Y 70/00* (2014.12); *B29K 2005/00* (2013.01); *B29K 2101/00* (2013.01); *B29K 2105/0061* (2013.01)

(58) Field of Classification Search

CPC ....... B29C 64/321; B33Y 40/00; B33Y 70/00; B29K 2005/00; B29K 2101/00; B29K 2105/0061

See application file for complete search history.

(56) References Cited

U.S. PATENT DOCUMENTS

2003/0175410 A1 9/2003 Campbell et al.
2009/0273105 A1* 11/2009 McQuade ................ B01J 13/16 422/131

(Continued)

FOREIGN PATENT DOCUMENTS

CN 101068747 B 12/2010
CN 108327263 A 7/2018

OTHER PUBLICATIONS

Melnick, R.A., Scaling Microfluidic 3D printing for hydrogels, Department of Chemical and Biological Engineering, UBC, published Apr. 30, 2021.

(Continued)

*Primary Examiner* — Jiangtian Xu
(74) *Attorney, Agent, or Firm* — Todd A. Rattray; Oyen Wiggs Green & Mutala LLP

(57) ABSTRACT

A method of moving materials comprises: flowing a first fluid in an axial direction, the first fluid characterized by inertial forces dominating viscous forces of the first fluid; flowing a second fluid in the axial direction, the first and second fluids miscible with one another and the first and second fluids having an interface region therebetween; permitting a reaction to create a reaction product in the interface region, the reaction product mitigating flow-disrupting mixing between the first and second fluids.

12 Claims, 28 Drawing Sheets

Related U.S. Application Data

(60) Provisional application No. 62/987,584, filed on Mar. 10, 2020.

(56) References Cited

U.S. PATENT DOCUMENTS

| | | | | |
|---|---|---|---|---|
| 2010/0112723 | A1 | 5/2010 | Battrell et al. | |
| 2016/0288414 | A1* | 10/2016 | Ozbolat ................. | C09D 11/30 |

OTHER PUBLICATIONS

Brus, et al.; "Structure and Dynamics of Alginate Gels Cross-Linked by Polyvalent lons Probed via Solid State NMR Spectroscopy"; Biomacromolecules 2017, 18, pp. 2478-2488.
J.A. Mackenzie, D. Kerres & D.M. Martinez,"Examining large scale 3D extrusion printing: Creating a paper tube" Progress in Paper Physics, Atlanta (Apr. 26-29, 2021, online presentation).
Qin; "The gel swelling properties of alginate fibers and their applications in wound management"; The Biochemical Materials Research and Development Center, Jiaxing College, Jiaxing 314001, Zhejiang Province, People's Republic of China, Received Mar. 20, 2007; Accepted Apr. 14, 2007.
Gao et al. "Coaxial nozzle-assisted 3D bioprinting with built-in microchannels for nutrients delivery", 2015.
Zhang et al. "Characterization of printable cellular micro-fluidic channels for tissue engineering", 2013.

* cited by examiner

FIG. 12B_(iii)

FIG. 12B_(iv)

LARGE-SCALE 3D EXTRUSION PRINTING

REFERENCE TO RELATED APPLICATIONS

This application is a continuation of Patent Cooperation Treaty (PCT) application No. PCT/CA2021/050326 having an international filing date of 10 Mar. 2021, which in turn claims priority from and, for the purposes of the United States the benefit under 35 USC 119 in relation to, U.S. application No. 62/987,584, filed 10 Mar. 2020. PCT application No. PCT/CA2021/050326 and U.S. application No. 62/987,584 are hereby incorporated herein by reference.

TECHNICAL FIELD

The invention relates to 3D extrusion printing of structures. Particular embodiments provide methods and apparatus for 3D extrusion printing of hydrogel tubing, which may have applications in the medical field or in a variety of other fields.

BACKGROUND

Hydrogels are versatile materials that typically exhibit a high degree of biocompatibility owing to their high water content, low toxicity and antifouling properties. The relatively low cost, ease of use and inherent biodegradability of hydrogels have prompted the medical community to take advantage of these materials in small scale applications such as wound healing, cell transplantation and delivery of bioactive agents. The use of hydrogels in large-scale medical applications has been limited due to the poor mechanical strength of hydrogels structures caused by structural inhomogeneities during gelation and, in conventional 3D bioprinting, the deposition process. One particularly interesting, but not limiting, application of large hydrogel structures is in medical procedures that involve transporting blood outside the human body, as the antifouling properties of natural polymer hydrogels may have the potential to limit blood-material interactions.

Extracorporeal circulation is a type of medical intervention where blood is transported externally from a patient through plastic tubing (extracorporeal circuits, ECC) and may then be used for other procedures, such as hemodialysis, extracorporeal membrane oxygenation (ECMO), cardiopulmonary bypass surgery and/or the like. The most common materials currently used in ECC are silicone, polyvinyl chloride (PVC) and polyurethane (PU); however, despite their widespread use, blood has been shown to interact with the surface of these synthetic tubings, resulting in protein and platelet deposition, which can lead to clot formation and an inflammatory response when the blood is reintroduced into a patient. With subsequent dialysis treatments, a patient's inflammatory status can increase, leading to chronic inflammation. Because of this tendency for clot formation and inflammatory reaction, these patients are often treated with high doses of potentially harmful drugs (e.g. anticoagulants) to compensate for the limitations of the ECC material. Surface modification of the conventional plastic ECC tubing to make the material more biocompatible is a promising approach. However, the availability of truly antithrombotic surface coatings that are cost effective has thus far prevented commercial adoption of such surface modification techniques. For the medical community to take advantage of the biocompatibility and biodegradability of hydrogels at the ECC scale, there is a general desire for apparatus and methods capable of creating strong hydrogel structures (e.g. ECC tubes) with tunable dimensions in a robust and scalable manner.

Some complex hydrogel structures have been constructed by the deposition of successive threads from 3D bioprinters. These hydrogel threads are printed with a printing head having a maximal outer diameter of $D_o$~400 μm and are formed at a rate of ~4-10 mm of length per second (see Yong He et al. Research on the printability of hydrogels in 3D bioprinting. *Scientific Reports,* 6:29977 EP-, 07 2016.). In terms of hydrodynamic stability, this relatively slow printing speed and relatively small diameter of the printing head ensure a Reynolds number (Re) on the order of Re~1—see equation (11) below. Such a slow deposition process and resulting material integrity have conventionally hindered the applicability of these hydrogel structures for practical use. Further, some such hydrogel structures are not suitable for practical use, because of poor mechanical strength, dehydration and limited long-term use properties.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An aspect of the invention provides a method for 3D extrusion printing of structures such as tubing by layering two fluids flowing in a conduit in which the compositions of the fluids have been selected to cause a local change in rheology at an interface between the liquids to permit the stable generation of material such as tubing at flow rates that would otherwise cause mixing.

Layering of liquids coupled with gelation at their interface rapidly produces tough and environmentally friendly hydrogel tubing with superior blood compatibility. Natural polymers such as alginate are particularly suitable for in-situ layering as they gelate relatively rapidly when contacted with a salt solution—e.g. a salt solution that comprises polyvalent cations (e.g. $Ca^{2+}$ and/or the like).

One aspect of the invention provides a method for large-scale 3D extrusion printing of sculpted biocompatible materials.

Aspects of the invention provide methods and apparatus for producing hydrogel tubing (e.g. blood compatible hydrogel tubing) which comprise generalizing the flow of miscible layered fluids where at least one of the fluids is initially flowing under inertial conditions where chemical composition is coupled to local rheology—e.g. where the chemical constitution of the reactants and the gelation reaction lead to a local change in rheology of moving materials. This coupling has been able to scale-up the size and speed of currently known 3D co-axial extrusion bioprinters to produce hydrogel tubing (e.g. biocompatible hydrogel tubing) at a rate of greater than 3 cm/s which is significantly greater than currently known 3D co-axial extrusion bioprinters.

Hydrogel products produced by the various aspects of the invention are potential replacement material to many plastics (which contrasts with currently known extrusion biomaterials, which exhibit poor mechanical strength and dehydration properties).

Materials may be added into the flow that can both enhance the strength of the printed structure and provide a hydrophobic coating to limit dehydration.

In relation to the extrusion of tubing (e.g. medical tubing), dimensions may range from 3.2-12.7 mm in internal diameter in some embodiments suitable for medical use (e.g. in ECC applications) and can be used for several hours in ECC applications before being disposed.

With the incorporation of a biodegradable material that provides a hydrophobic coating, methods and apparatus according to various aspects of the invention can quickly produce tubing that has comparable mechanical properties to conventional plastics as well as enhanced disposability and blood compatibility compared to conventional plastics.

Fibrous materials may be used to reinforce the hydrogel tubes formed by the methods and apparatus described herein.

One aspect of the invention provides a method of moving materials to create a reaction product. The method comprises: flowing a first fluid in an axial direction, the first fluid characterized by inertial forces dominating viscous forces of the first fluid; flowing a second fluid in the axial direction, the first and second fluids miscible with one another and the first and second fluids having an interface region therebetween; permitting a reaction to create a reaction product in the interface region, the reaction product mitigating flow-disrupting mixing between the first and second fluids.

The first and second fluids may have a contact region at an upstream-most extent of the interface region, the first and second fluids contacting one another at the contact region.

The inertial forces of the first fluid may be greater than the viscous forces of the first fluid such that a Reynolds number of the first fluid at an axial location corresponding to an upstream-most extent of the interface region is greater than 100.

The inertial forces of the first fluid may be greater than the viscous forces of the first fluid such that a Reynolds number of the first fluid at the axial location corresponding to an upstream-most extent of the interface region is greater than 500.

The second fluid may be characterized by inertial forces dominating viscous forces of the second fluid. The inertial forces of the second fluid may be greater than the viscous forces of the second fluid such that a Reynolds number of the second fluid at an axial location corresponding to an upstream-most extent of the interface region is greater than 100. The inertial forces of the second fluid may be greater than the viscous forces of the second fluid such that a Reynolds number of the second fluid at an axial location corresponding to an upstream-most extent of the interface region is greater than 500.

The flow of one or more of the first and second fluids may be turbulent.

The reaction in the interface region may be characterized by a Damköhler value less than 109. The reaction in the interface region may be characterized by a Damköhler value in a range of $10\text{-}10^6$. The reaction in the interface region may be characterized by a Damköhler value in a range of 100-105.

The reaction product may flow in the axial direction with a local Reynolds number of the reaction product in the interface region which may be less than 100. The reaction product may flow in the axial direction with a local Reynolds number of the reaction product in the interface region which may be less than 20.

The method may comprise modifying one or more of a first fluid inlet velocity and a second fluid inlet velocity to control a cross-sectional dimension (e.g. a diameter) of the reaction product.

In the interface region, a rate of rheological change associated with the reaction may be greater than a rate of advection of the first and second fluids. In the interface region, the reaction may cause a local rheological change wherein a ratio of the local viscous forces to the local inertial forces in the interface region is less than about 1.25. In the interface region, the reaction may cause a local rheological change wherein the viscous forces in the interface region are less than the inertial forces in the interface region.

The first fluid may be a solution of a first reactant and the second fluid may be a solution of a second reactant. The first reactant may be a polyvalent cation, the second reactant may be an alginate and reaction product may be a hydrogel. A ratio of the concentration of the first reactant to the second reactant may be less than or equal to 4. A ratio of the concentration of the first reactant to the second reactant is greater than or equal to 0.5.

A shape of the first fluid flow may be rectangular in a cross-section across the axial direction. A shape of the second fluid flow may be rectangular in a cross-section across the axial direction.

Another aspect of the invention provides a method of moving materials to create a reaction product. The method comprises: flowing a first fluid in an axial direction; flowing a second fluid in the axial direction, the first fluid and the second fluid having an interface region therebetween; wherein a Reynolds number of the first fluid at an axial location corresponding to an upstream-most extent of the interface region is greater than 500; and permitting a reaction between the first and second fluids in the interface region, whereby a local Reynolds number of a reaction product in the interface region is less than 100.

The first and second fluids may have a contact region at the upstream-most extent of the interface region, the first and second fluids may contact one another at the contact region.

The first and second fluids may be miscible with one another.

The Reynolds number of the first fluid at the axial location corresponding to the upstream-most extent of the interface region may be greater than 1000.

A Reynolds number of the second fluid at the axial location corresponding to the upstream-most extent of the interface region may be greater than 500. A Reynolds number of the second fluid at the axial location corresponding to the upstream-most extent of the interface region is greater than 1000.

A local Reynolds number of the reaction product in the interface region may be less than 10.

The reaction in the interface region may be characterized by a Damköhler value in a range of $10\text{-}10^6$. The reaction in the interface region may be characterized by a Damköhler value in a range of $100\text{-}10^5$.

The flow of one or more of the first and second fluids may be turbulent.

The method may comprise modifying one or more of a first fluid inlet velocity and a second fluid inlet velocity to control a cross-sectional dimension (e.g. a diameter) of the reaction product.

In the interface region, a rate of rheological change associated with the reaction may be greater than a rate of advection between the first and second fluids. In the interface region, the reaction may cause a local rheological change wherein a ratio of the local viscous forces to the location inertial forces in the interface region is less than about 1.25. In the interface region, the reaction may cause a local rheological change wherein the viscous forces in the interface region are less than the inertial forces in the interface region.

The first fluid may be a solution of a first reactant and the second fluid my be a solution of a second reactant. The first reactant may be a polyvalent cation, the second reactant may be an alginate and reaction product may be a hydrogel. A ratio of the concentration of the first reactant to the second reactant may be less than or equal to 4. A ratio of the concentration of the first reactant to the second reactant may be greater than or equal to 0.5.

A shape of the first fluid flow may be rectangular in a cross-section across the axial direction. A shape of the second fluid flow may be rectangular in a cross-section across the axial direction.

Another aspect of the invention provides a method of moving materials. The method comprises: providing a first fluid flowing in an axial direction; providing a second fluid flowing in the axial direction, the first and second fluids being miscible and having an interface region therebetween; permitting a reaction in the interface region, whereby local non-mixing conditions are created by the reaction which mitigate mixing between the first and second fluids.

Permitting the reaction in the interface region may comprise generating a reaction product in the interface region, the reaction product mitigating mixing between the first and second fluids. Permitting the reaction in the interface region may comprise providing a change of state of at least one of the first and second fluids in the interface region, the change of state mitigating mixing between the first and second fluids.

Another aspect of the invention provides a method for moving materials in an axial direction. The method comprises: providing a first miscible fluid flowing in an axial direction; providing a second miscible fluid flowing in the axial direction, the first and second fluids having an interface region therebetween; providing a property or component of the first miscible fluid to produce a reaction with the second miscible fluid in the interface region, whereby the local Reynolds number in the interface region is reduced below 100; wherein Reynolds numbers of the first and second fluids at an axial location corresponding to an upstream-most extent of the interface region are greater than 500.

Another aspect of the invention provides a method for moving materials. The method comprises: flowing a first fluid in an axial direction; flowing a second fluid in the axial direction, the first and second fluids having an interface region therebetween and the first and second fluids flowing under miscible conditions; reacting the first fluid and the second fluid to thereby create local immiscibility of the first and second fluids in interface region.

Another aspect of the invention provides a method for moving materials. The method comprises: flowing a first fluid in an axial direction; flowing a second fluid in the axial direction, the first and second fluids having an interface region therebetween; reacting the first fluid and the second fluid in the interface region to thereby produce a local Reynolds number less than 100 in the interface region; wherein Reynolds numbers of the first and second fluids at an axial location corresponding to an upstream-most extent of the interface region are greater than 500.

Another aspect of the invention provides a method for moving materials. The method comprises: flowing a first fluid in an axial direction; flowing a second fluid in the axial direction, the first and second fluids having an interface region therebetween; and permitting a reaction between the first fluid and the second fluid in the interface region; wherein: Reynolds numbers of the first and second fluids at an axial location corresponding to an upstream-most extent of the interface region are greater than 500; reacting the first fluid and the second fluid produces a local Reynolds number less than 100 in the interface region; and the reaction between the first and second fluids has a Damköhler value in a range of $10\text{-}10^6$.

Another aspect of the invention provides a method for generating (e.g. extruding) a reaction product according to any of the methods herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

Figure 1A:
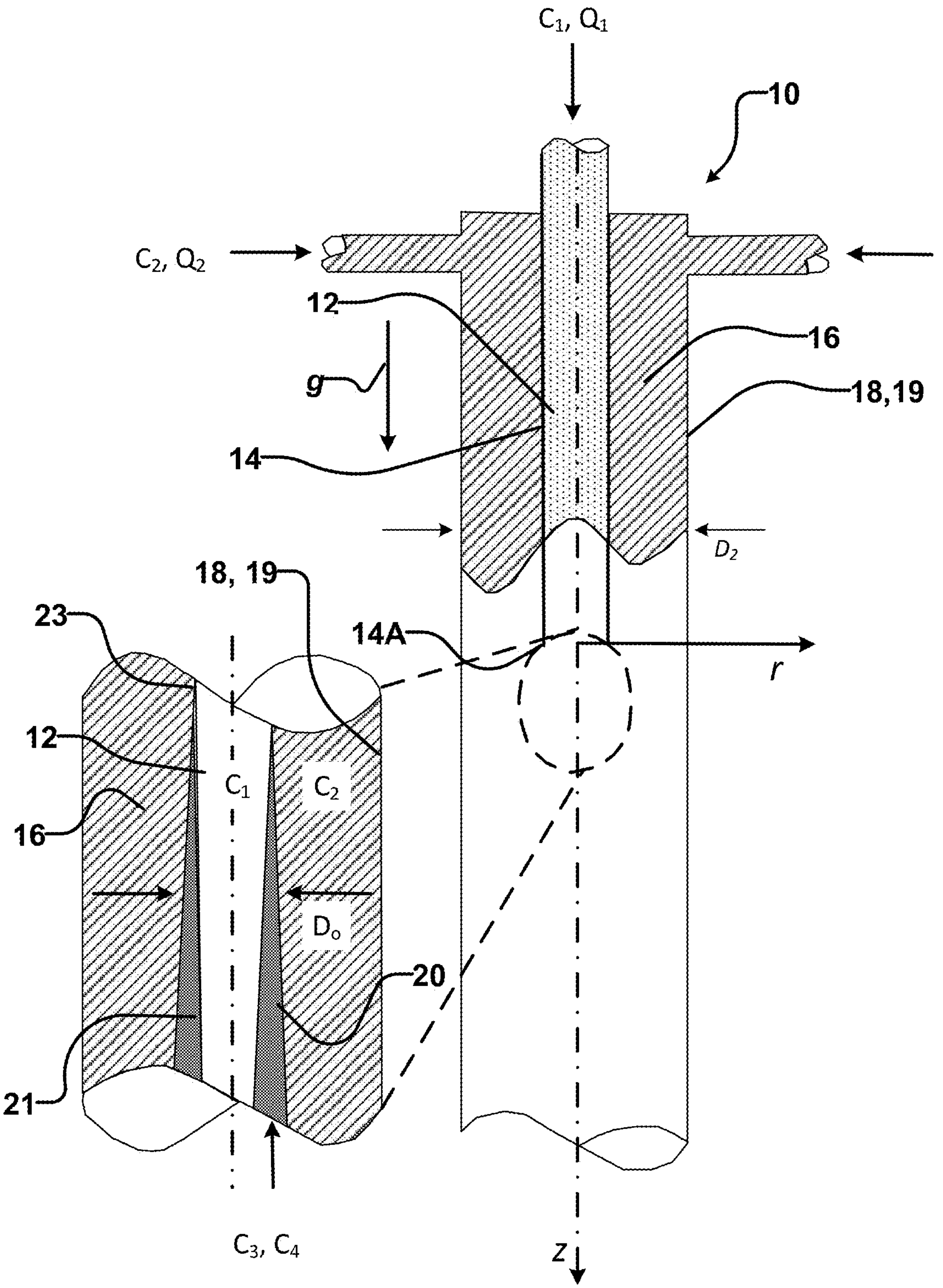
FIG. 1A is a schematic depiction of a method and apparatus for 3D extrusion of a structure (such as hydrogel tube, for example) formed using a plurality of flowing fluid inputs according to a particular embodiment.
Figure 7A:
FIGS. 7A-7D show examples of air dried hydrogel tubes made of alginate (FIG. 7A), alginate with nano-scale fiber additive, specifically nano-fibrillated cellulose (NFC) (FIG. 7B), alginate with micron-scale fiber additive, specifically tempo oxidized northern bleached softwood kraft (NBSK)
Figure 7B:
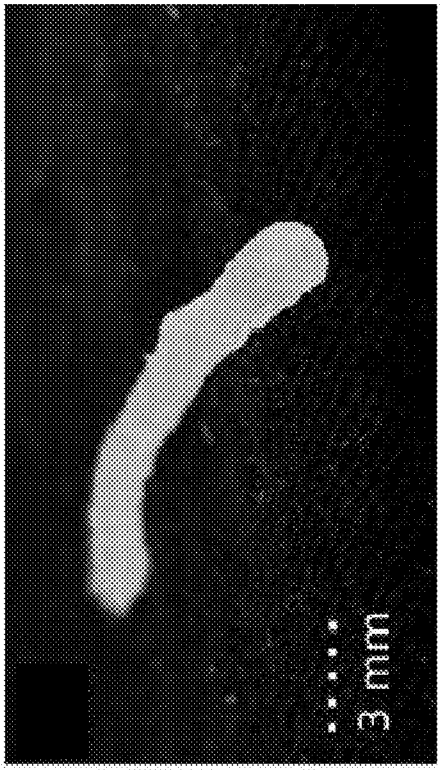
Figure 7C:
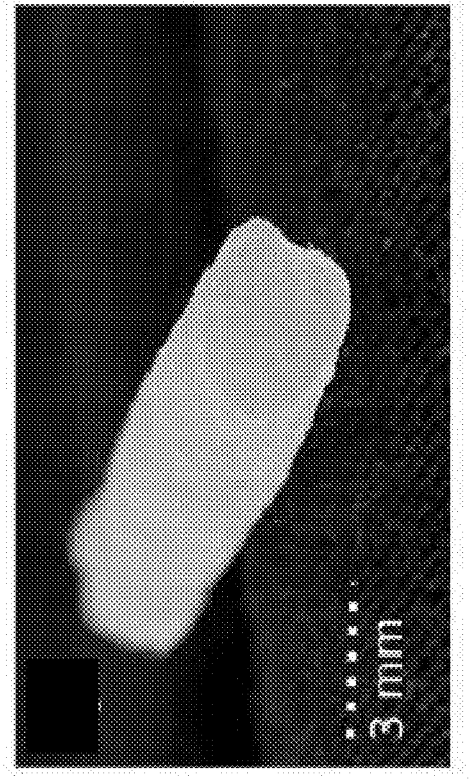
Figure 7D:
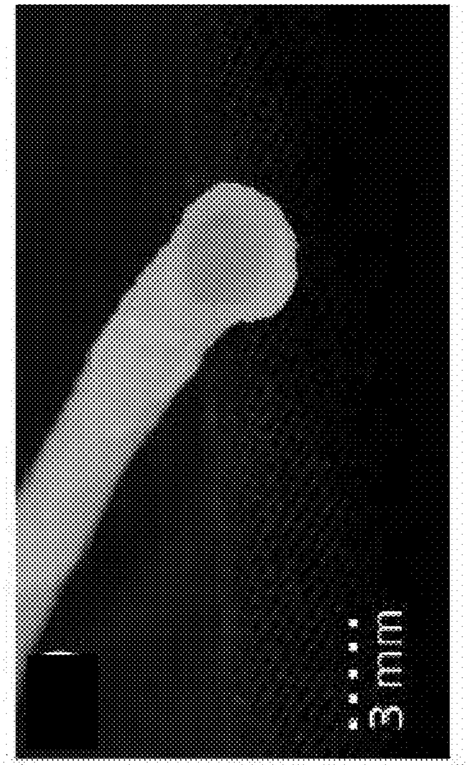

cellulose fibre (FIG. 7C), and alginate with millimeter-scale fiber additive, specifically NBSK cellulose fibre (FIG. 7D) using the FIG. 1A apparatus.

Figure 8B:
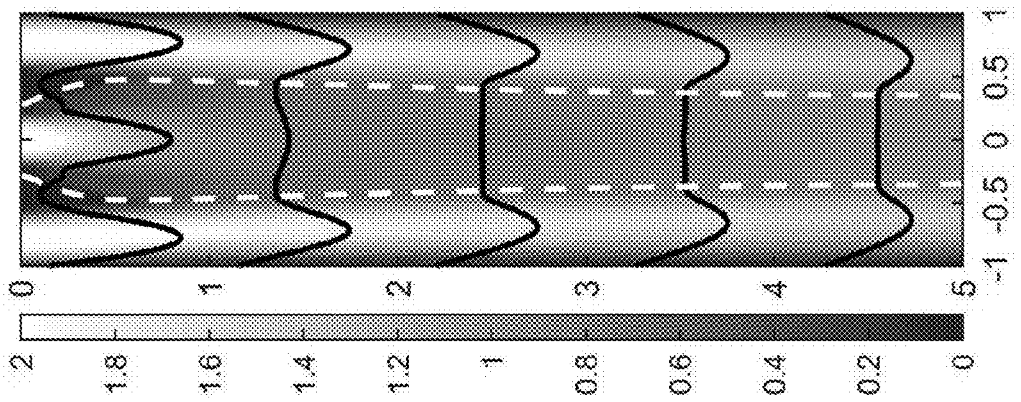
Figure 8A:
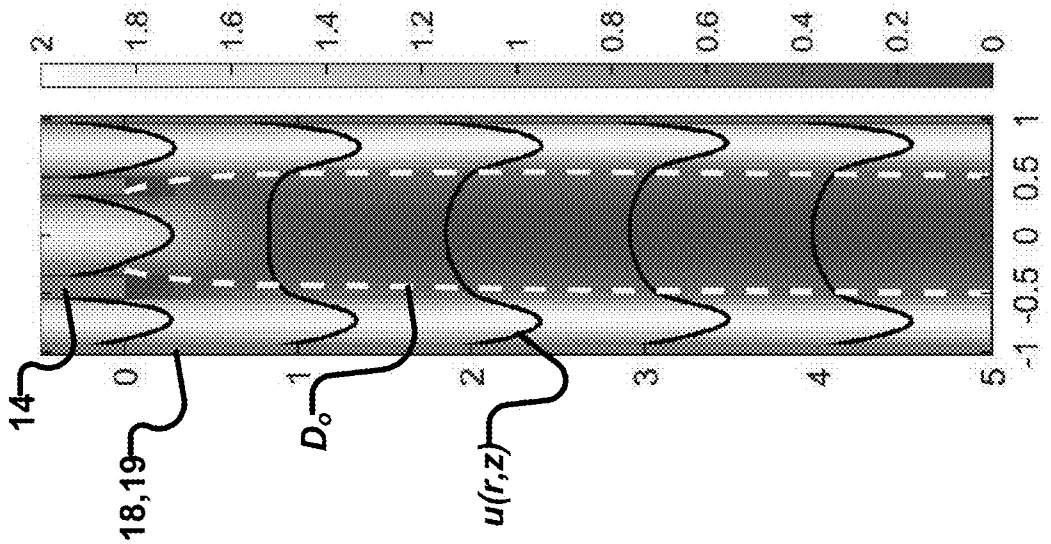
Figure 8C:
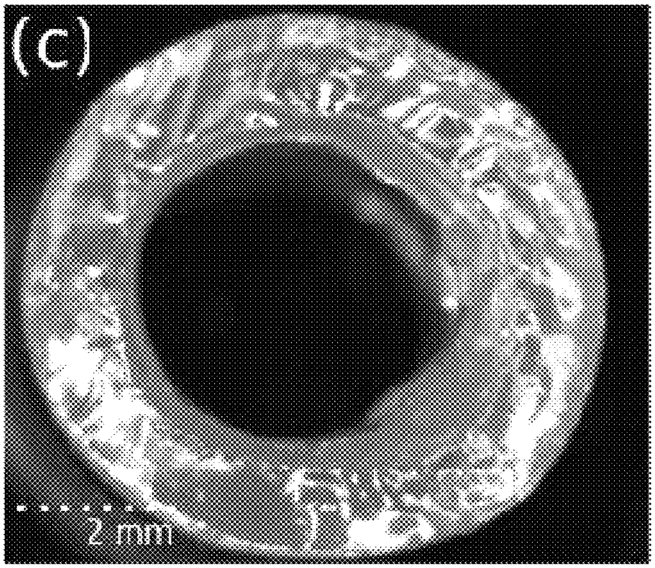
Figure 8D:
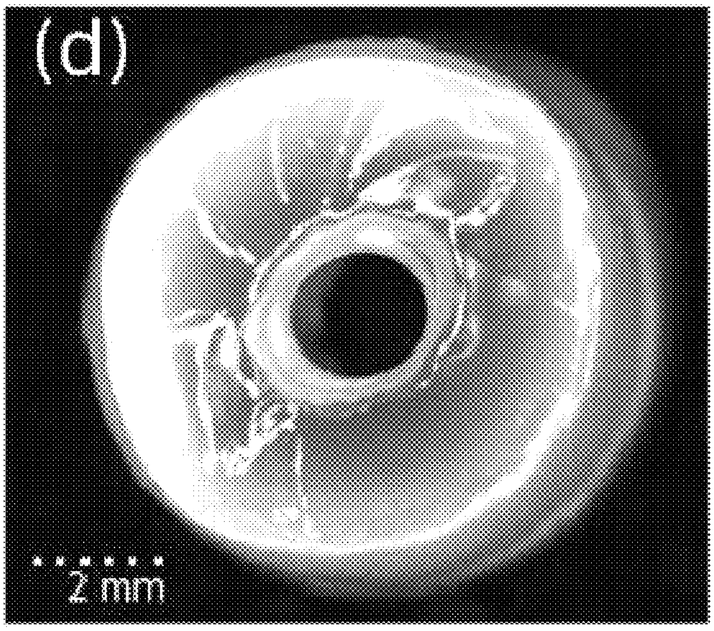
Figure 8E:
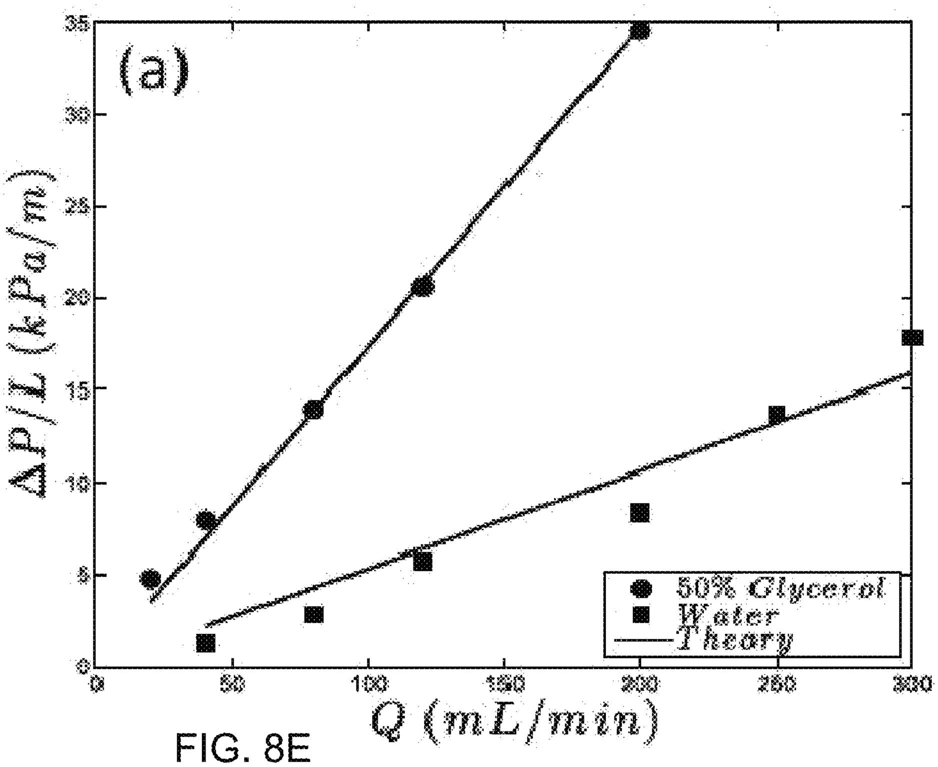

FIG. 8A displays experimental measurements (using particle image velocimetry) of the velocity field and the outer diameter $D_o$ of the hydrogel tube using the FIG. 1A apparatus. FIG. 8B is a simulation under the same conditions as FIG. 8A. FIGS. 8C and 8D show cross-sections of alginate tubes (reaction products) recovered from the FIG. 1A apparatus at different reaction times, with the tube shown in FIG. 8D having a reaction time longer than that of FIG. 8C. FIG. 8E shows the hydraulic performance of hydrogel tubing extruded using the FIG. 1A apparatus for a range of flow rates (Q).

Figures 9A, 9B:
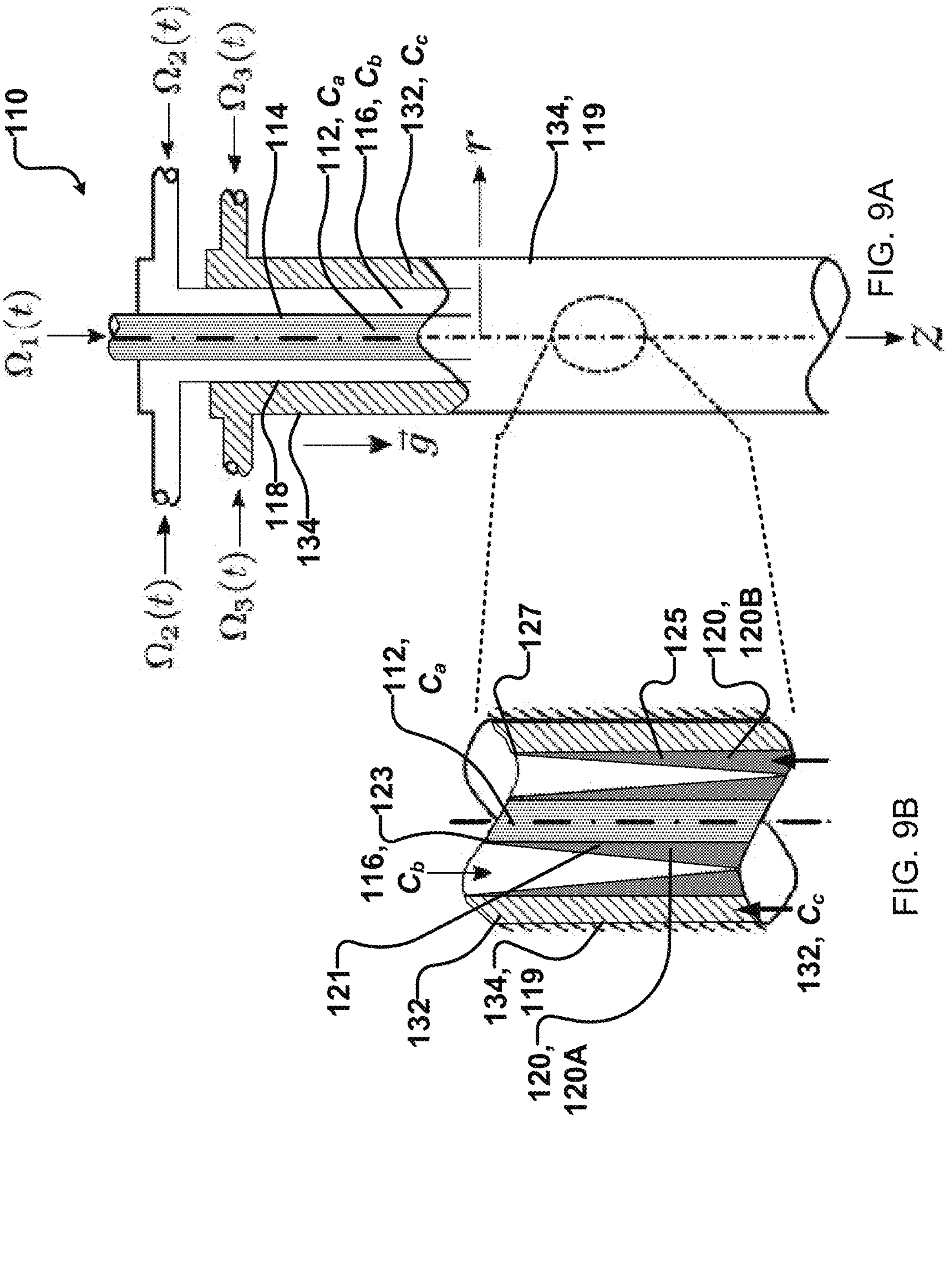

FIG. 9A is a schematic depiction of an apparatus for 3D extrusion of a structure (such as a hydrogel structure, for example) formed using a plurality (e.g. 3) of flowing fluid inputs according to a particular embodiment. FIG. 9B is an enlarged partial view of the flow of the FIG. 9A apparatus.

Figures 10A, 10B:
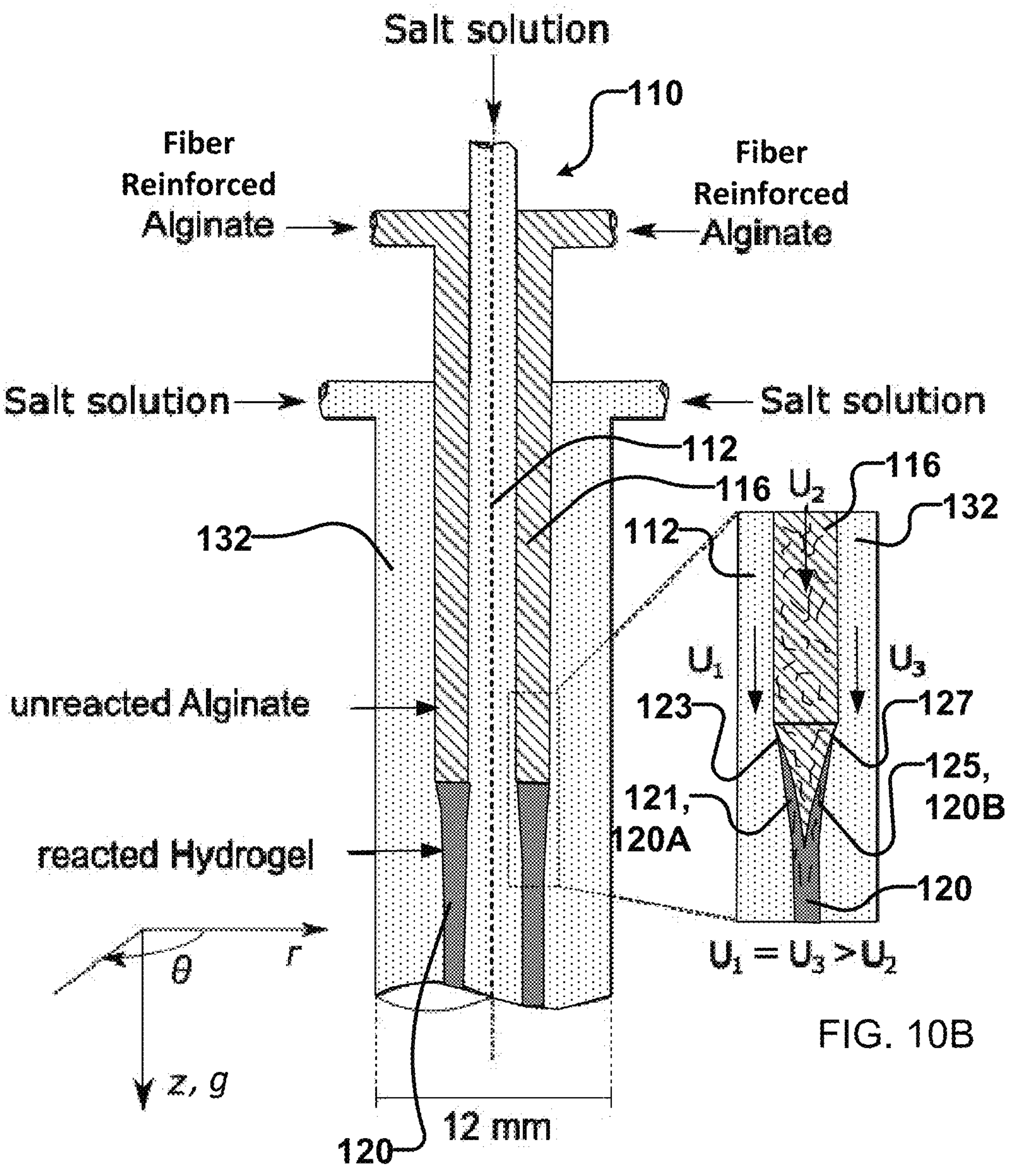

FIGS. 10A and 10B (collectively FIG. 10) show the FIG. 9A apparatus used to produce fiber-reinforced hydrogel tubing.

Figure 11A:
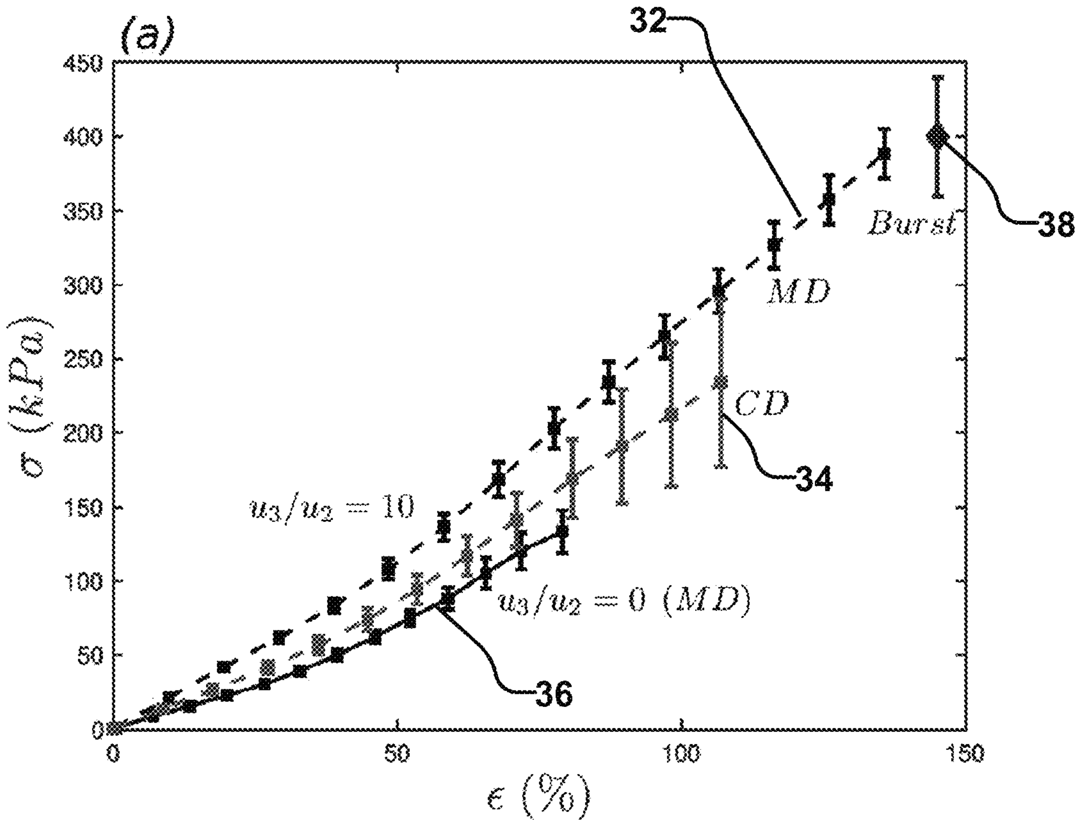
Figure 11B:
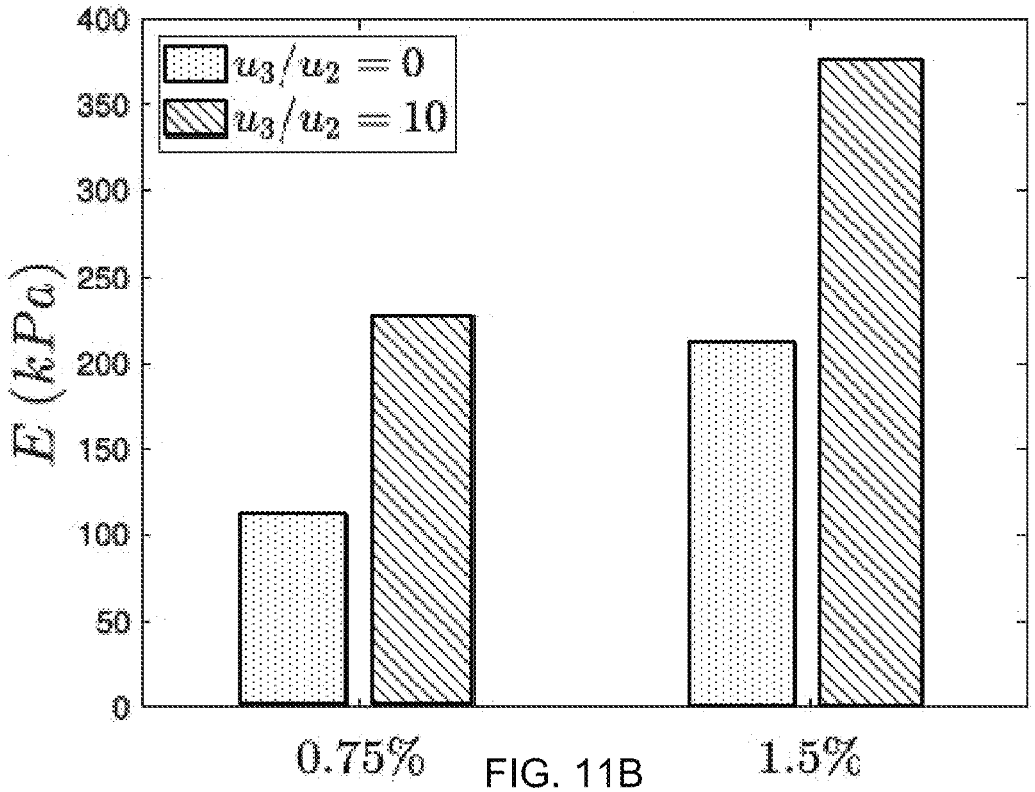
Figure 11C:
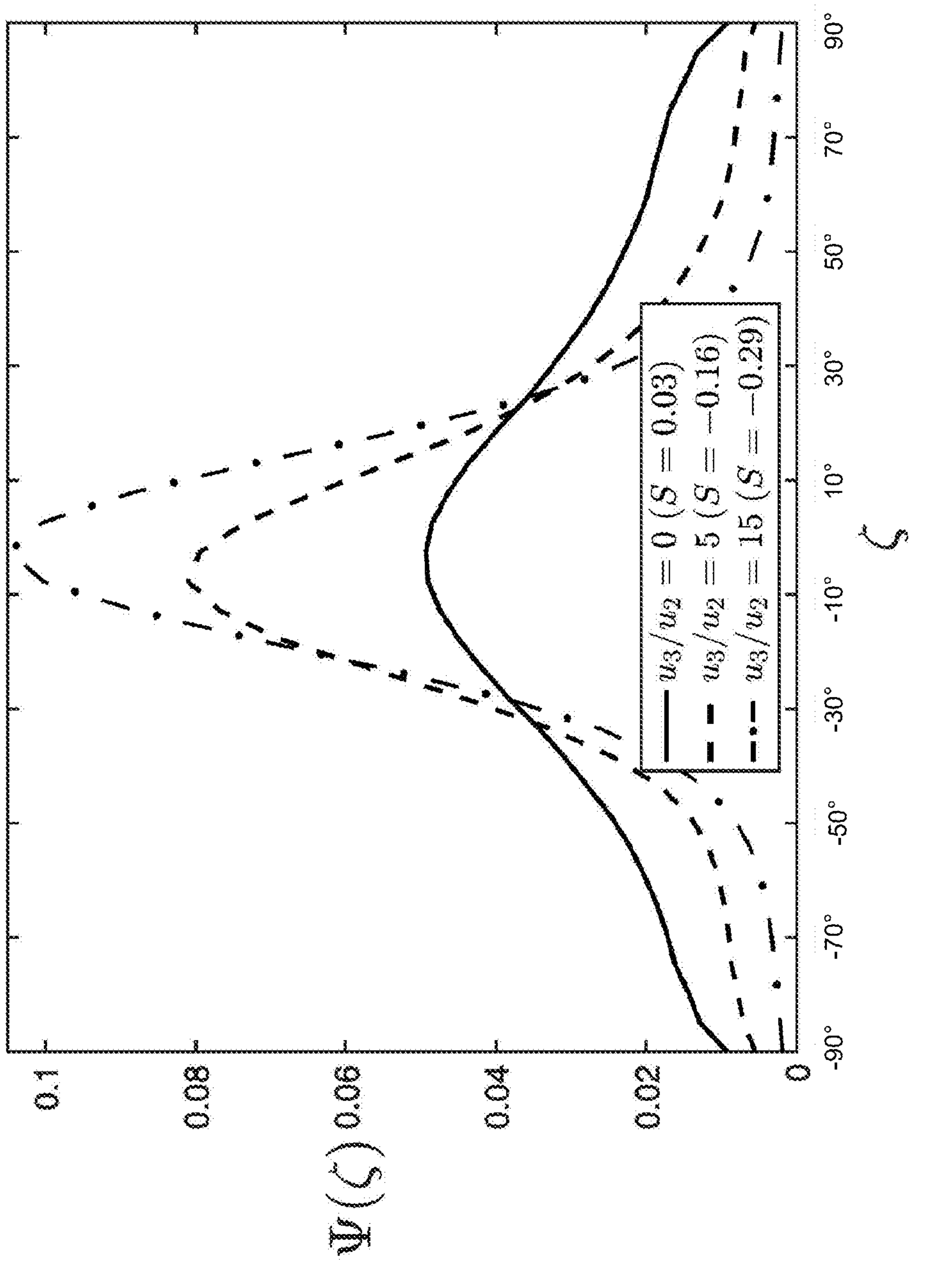
Figure 11D:
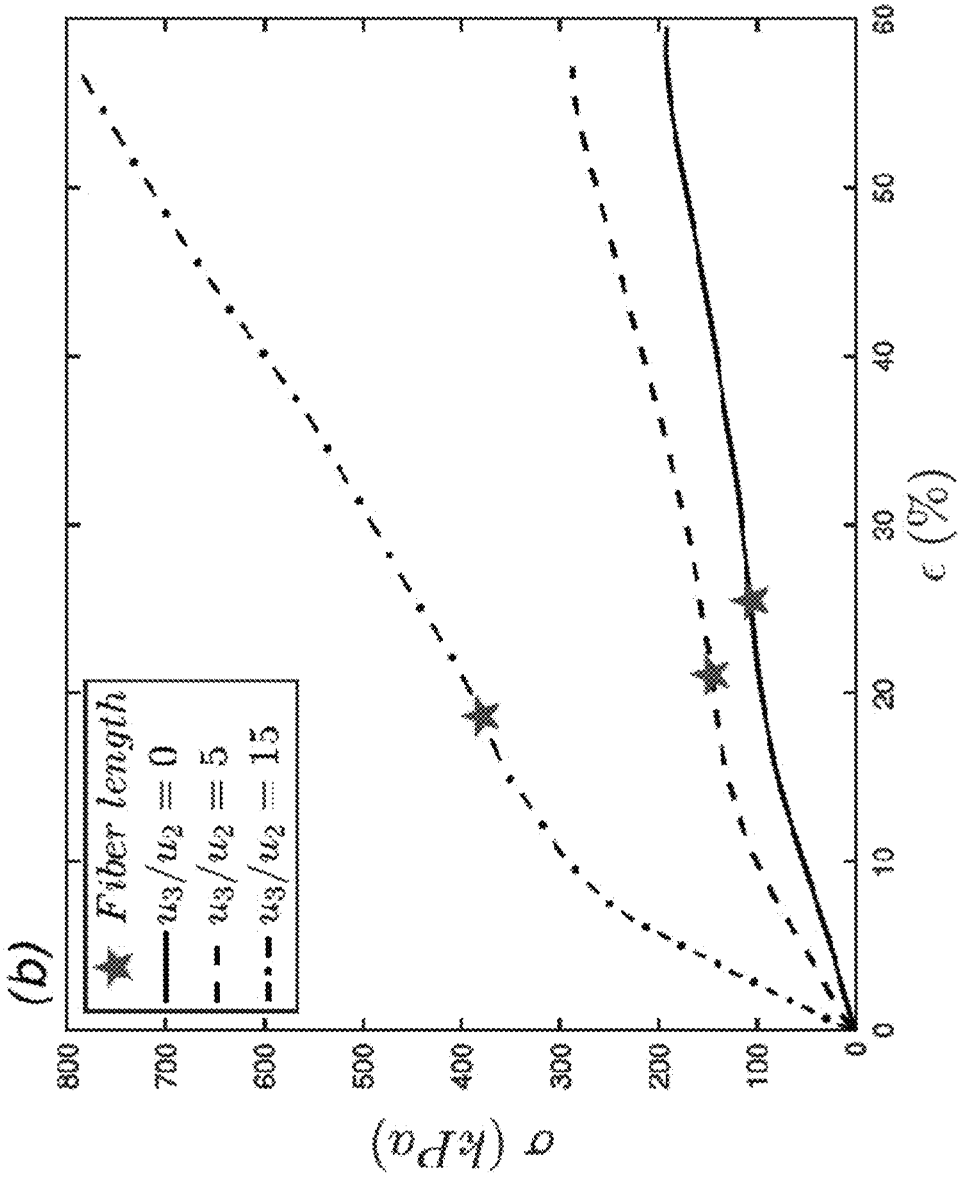
Figure 11E:
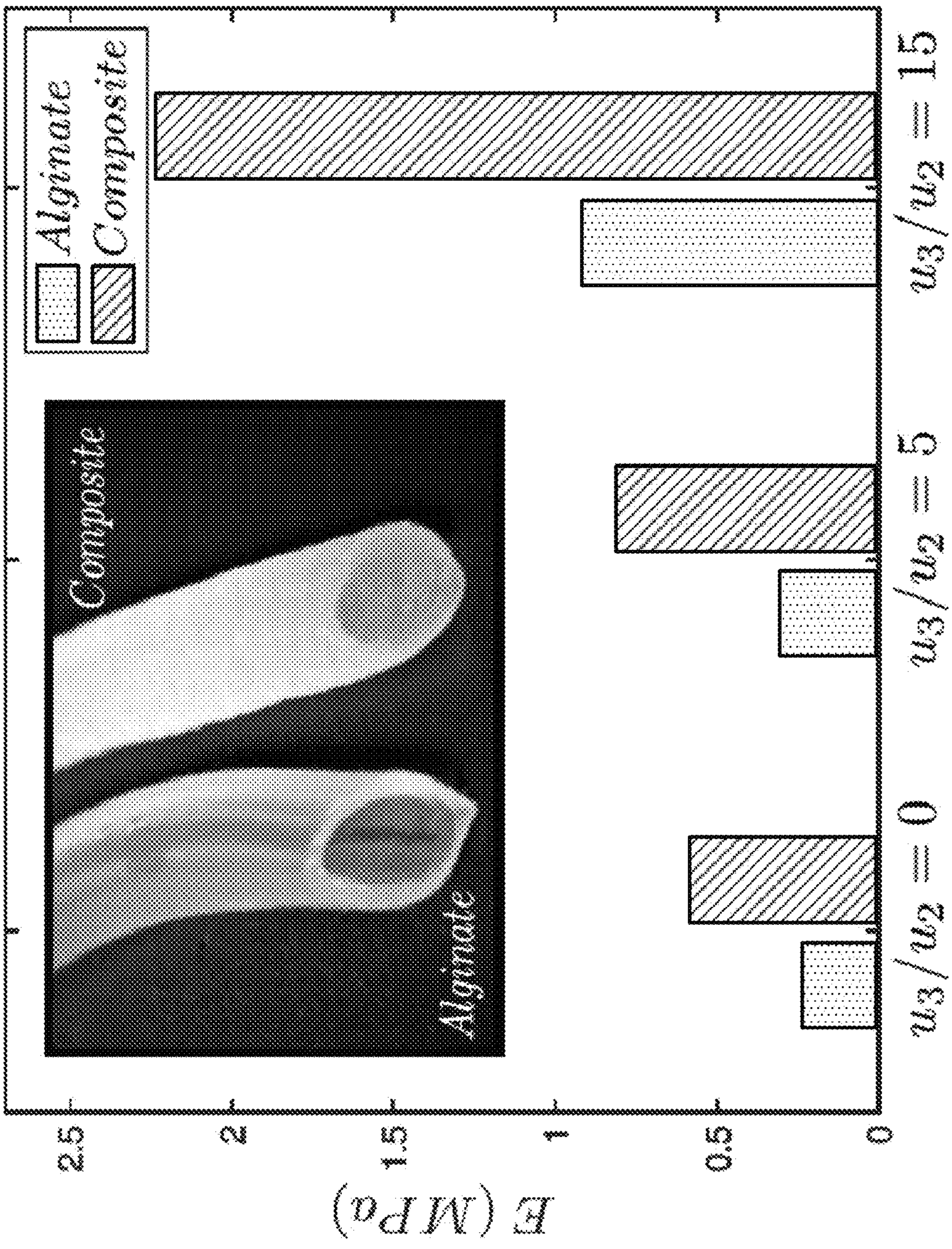

FIG. 11A shows tangential and axial stress-strain curves for hydrogel tubes extruded using the FIG. 10 apparatus measured using a dynamic mechanical analyzer (DMA). FIG. 11B shows the effect of the alginate concentrations (0.75% (w/w) and 1.5% (w/w)) on the Young's modulus of the hydrogel tube (reaction product) under the same experimental conditions and velocity ratios ($u_3/u_2$) shown in FIG. 11A FIG. 11C depicts the effect of the velocity ratio $u_3/u_2$ (of the outer fluid to the inner fluid) on the distribution of fiber orientations (in the reaction product of the FIG. 10 apparatus. FIG. 11D shows stress-strain curves (in the longitudinal direction g) for alginate (A) tubing 120 produced using the FIG. 10 apparatus 110 using alginate 1.5% (w/w) and 1% (w/w) NBSK pulp fiber (as middle fluid 116) and 1% (w/w) $Ca^{2+}$ as inner and outer fluids for various velocity ratios $u_3/u_2$. FIG. 11E shows the elastic modulus of the fiber-reinforced (angled hatching) and non-fiber reinforced (dotted hatching) reaction products at various velocity ratios $u_3/u_2$.

Figure 12A:
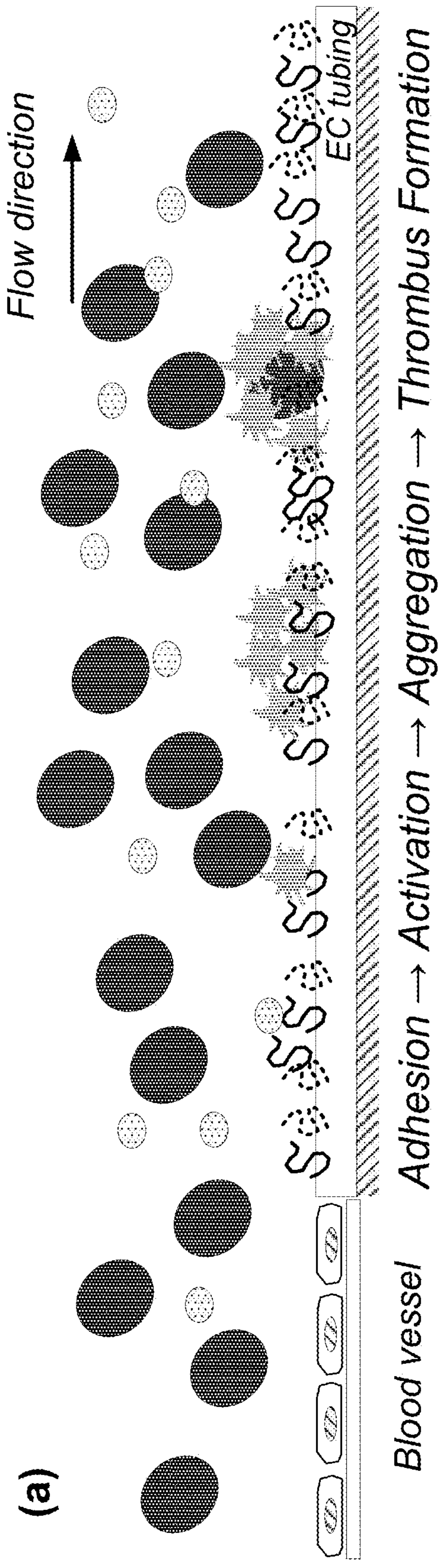
Figure 12B:
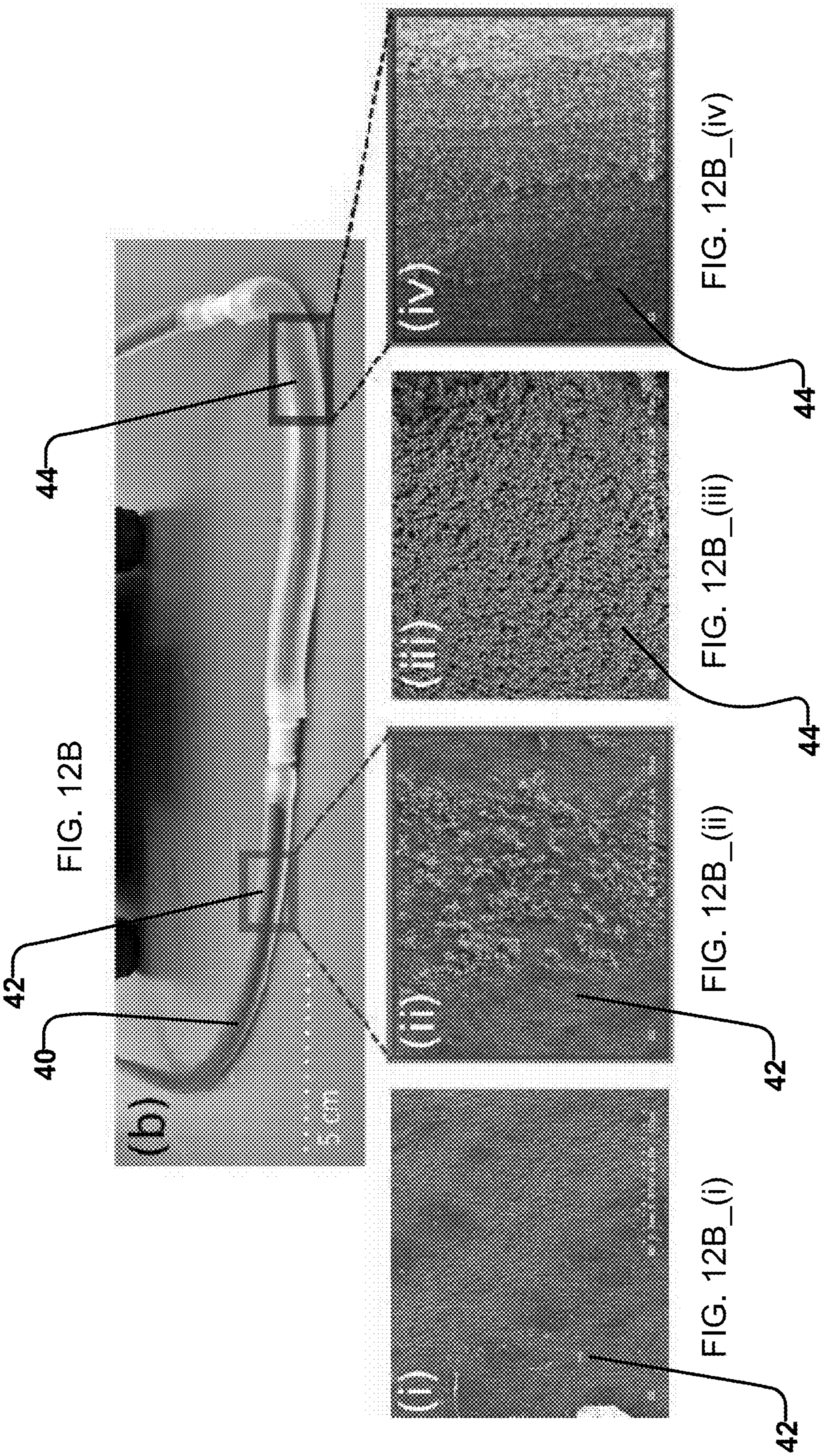
Figure 12C:
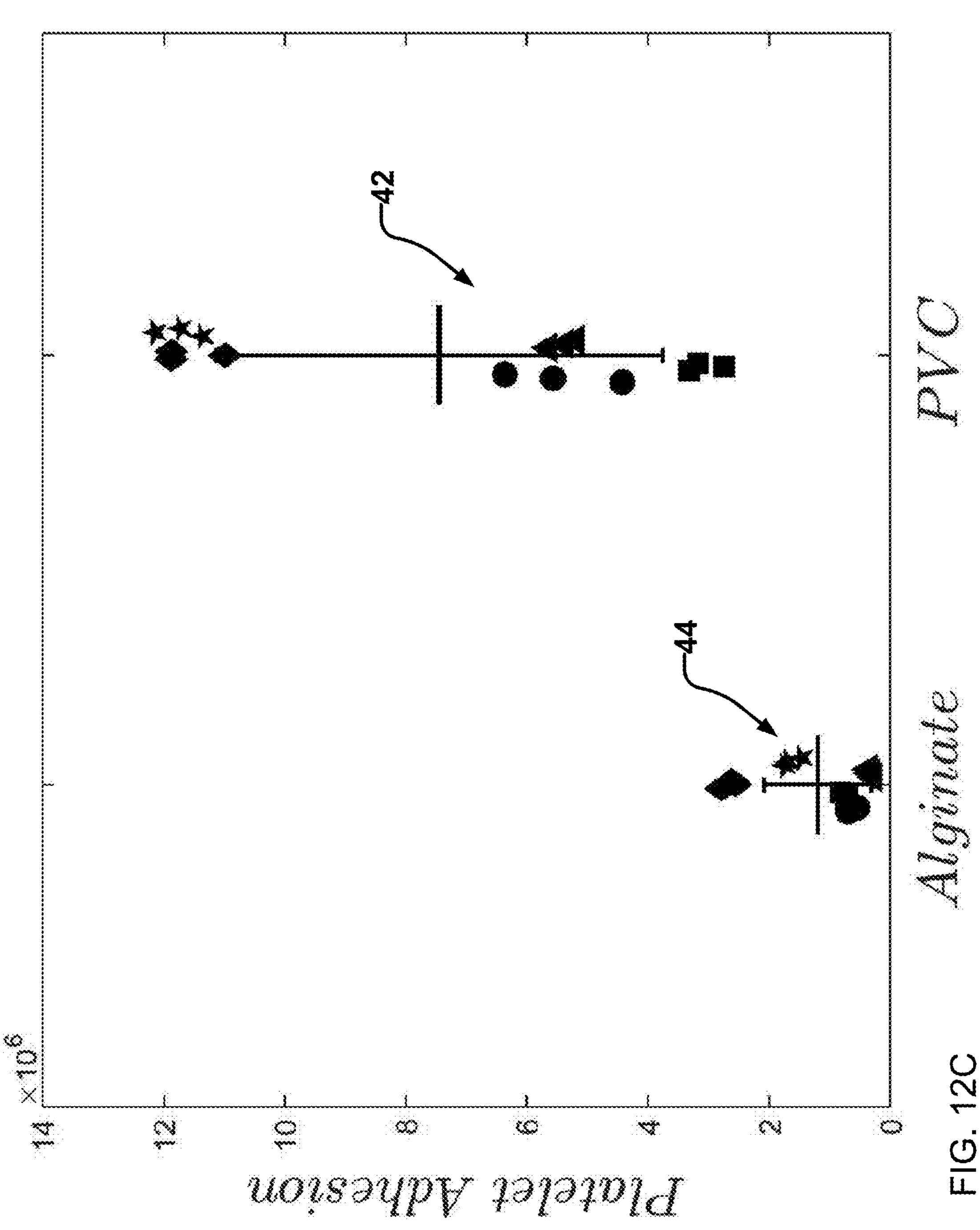
Figure 12D:
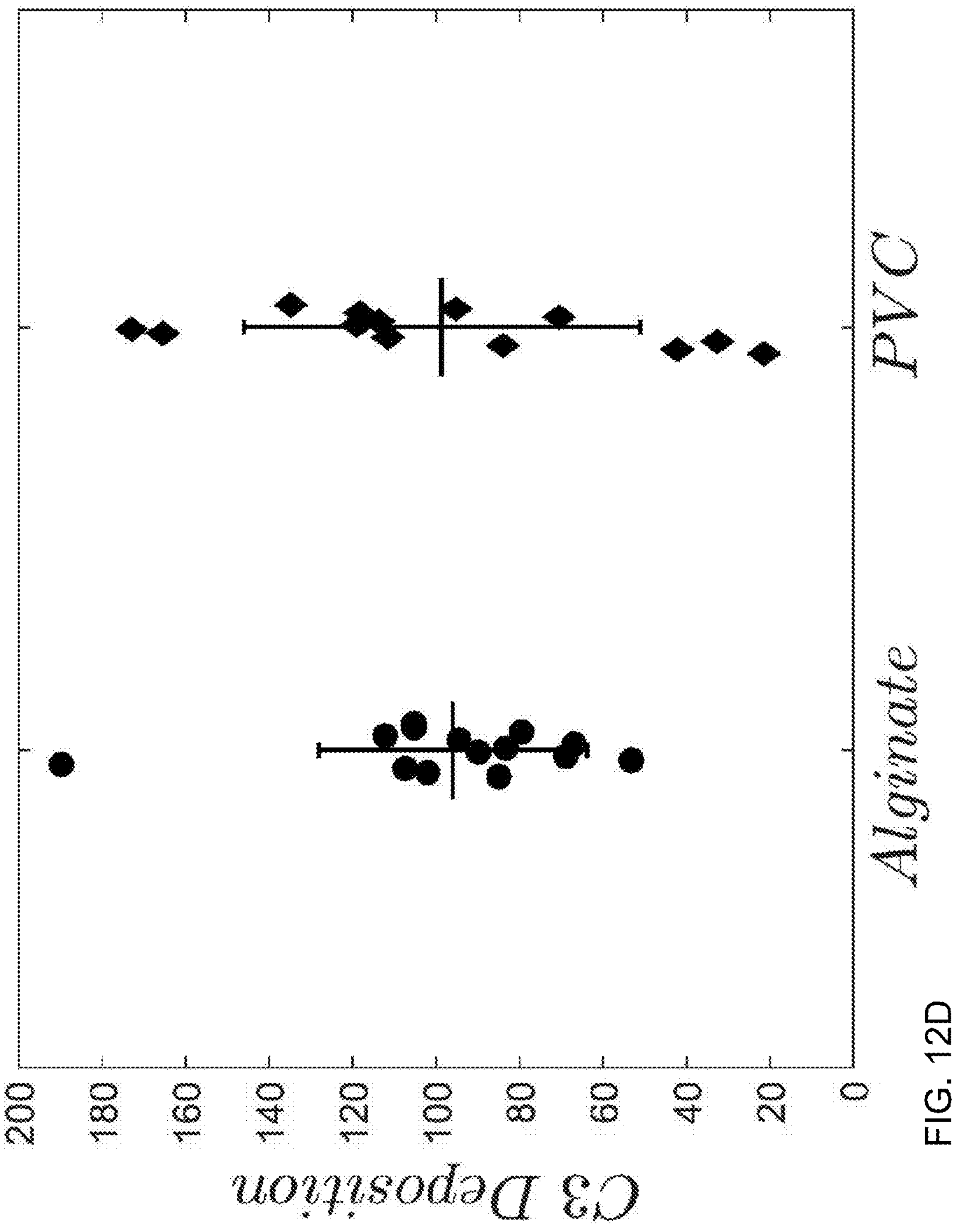

FIG. 12A shows that the adsorption of pro-inflammatory complement proteins, platelet adhesion and red cell hemolysis are important markers of biomaterial compatibility of a material with whole blood. FIG. 12B shows the experimental set up of how the inventors tested the blood compatibility of extruded hydrogel tubing (using the apparatus of FIG. 1A) with alginate as the inner fluid and both $CaCl_2$ and $MgCl_2$ as the outer fluids under ECC-like conditions. Specifically, FIGS. 12B_(i)-(ii) show PVC tubing before and after incubation and FIGS. 12B_(iii)-(iv) show hydrogel tubing formed using apparatus 10 before and after incubation. FIG. 12C shows platelet deposition on the material surface of the FIG. 12B tube portions. FIG. 12D shows the deposition of pro-inflammatory complement protein C3 on the inner wall of the FIG. 12B tube portions following whole blood exposure.

Figures 13A, 13B:
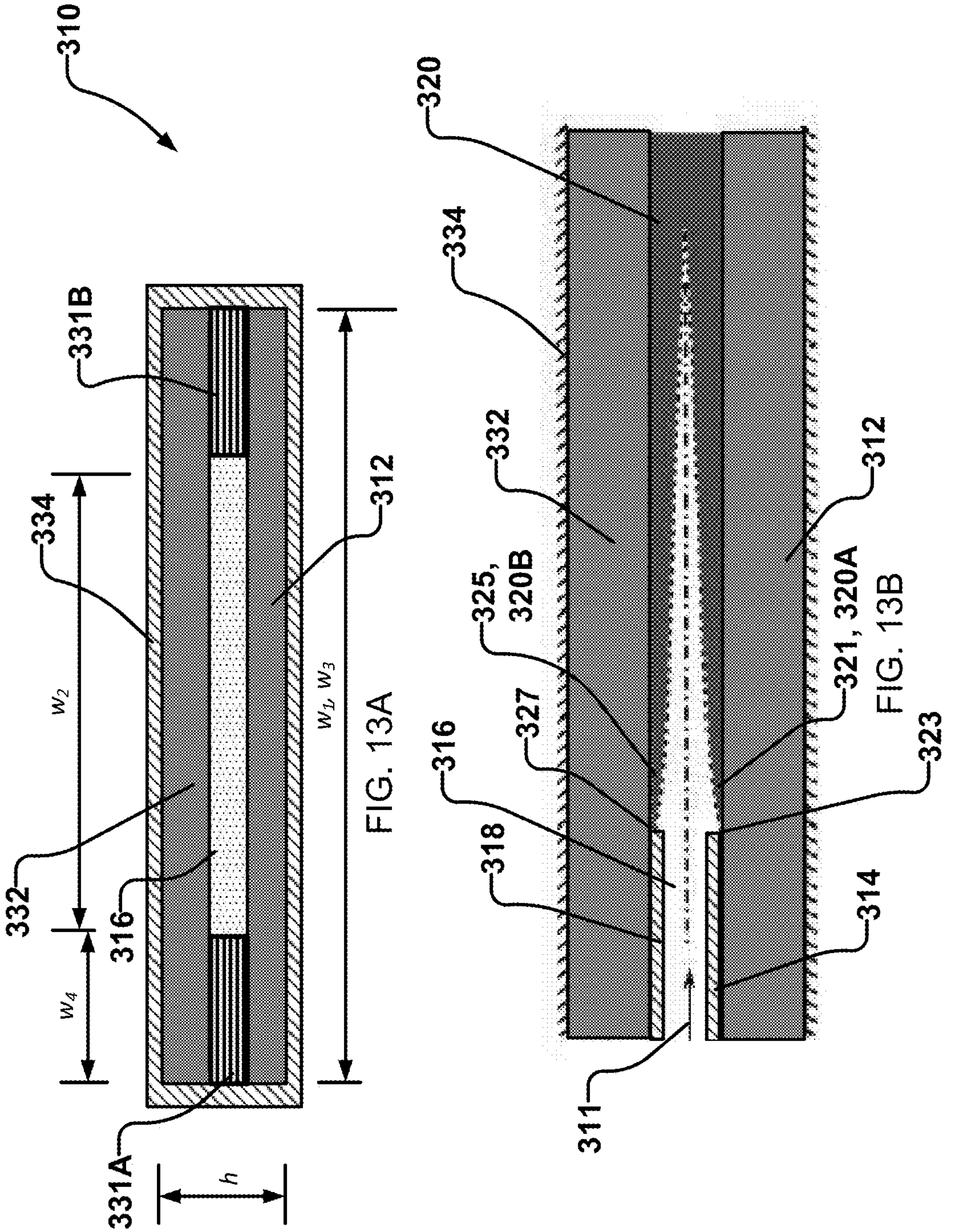

FIGS. 13A and 13B (collectively, FIG. 13) show cross-sections of a planar extrusion apparatus demonstrating that the operational principles of the invention described herein may be extended to different geometries.

Figure 14A:
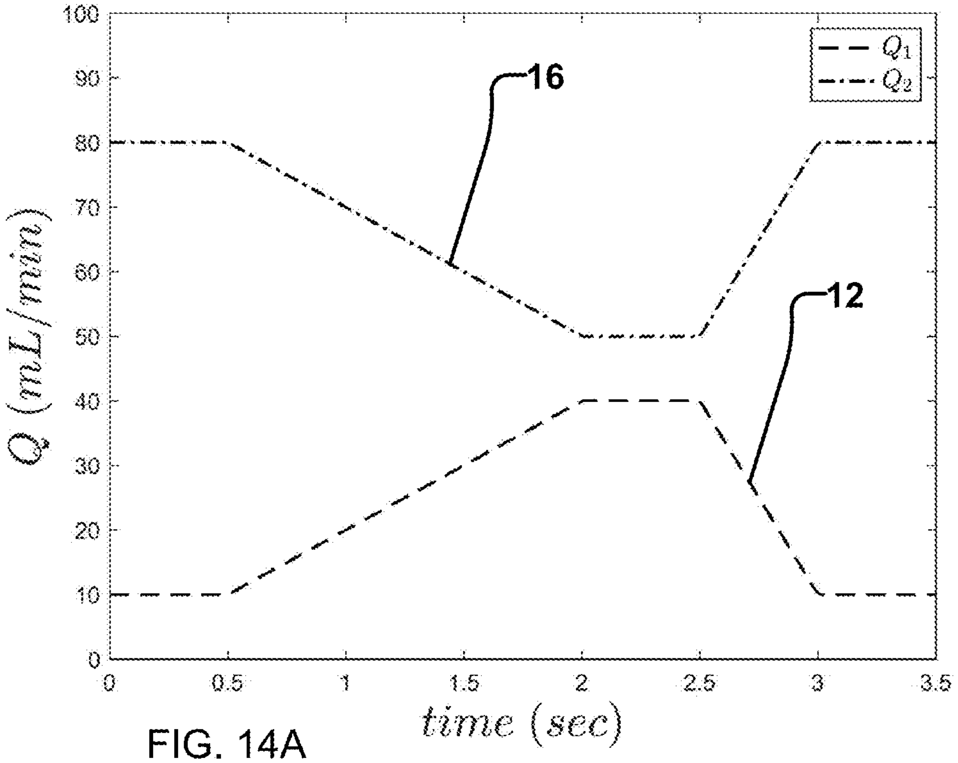
Figure 14B:
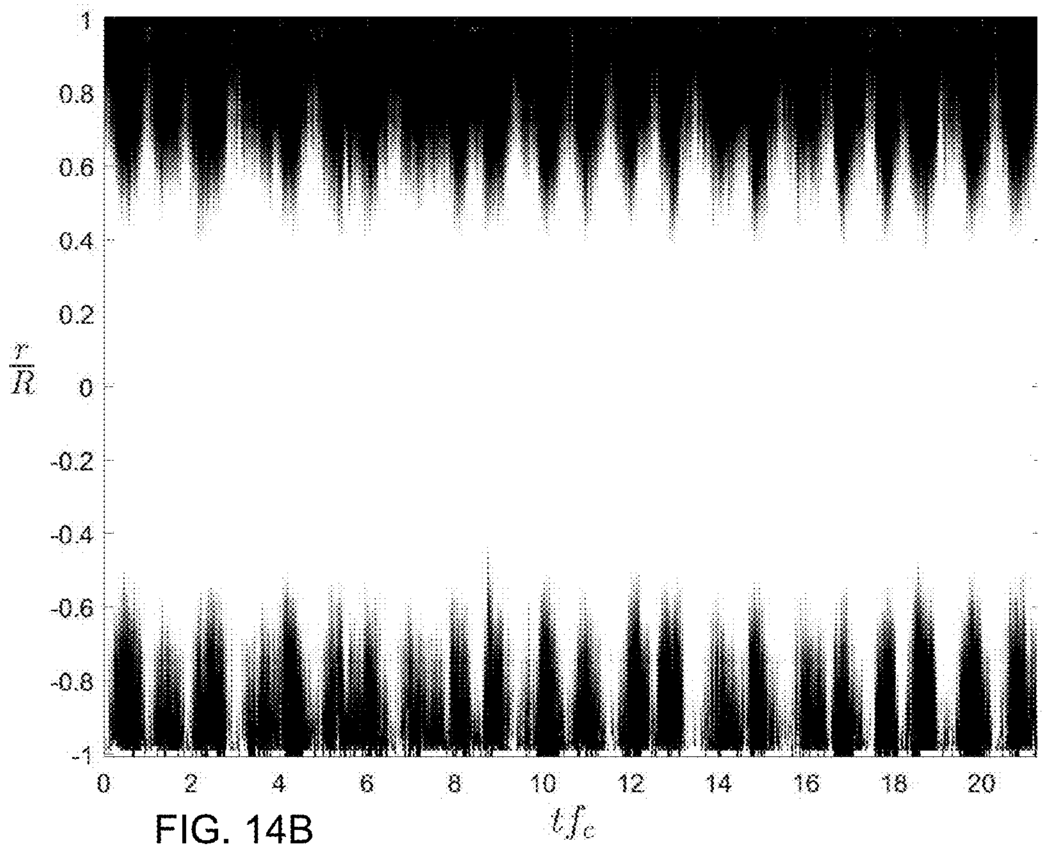

FIGS. 14A and 14B (collectively, FIG. 14) show the variation of volumetric flow rates and the corresponding impact on the outer dimeter of the reaction product according to one experiment performed using the FIG. 1A apparatus.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Slow viscous flow of miscible layered fluids is a classic problem in fluid mechanics. When placed in the confines of a narrow channel or tube, these flows do not mix appreciably, owing to the reversibility of the steady flow field when the stress state is dominated by viscous shear, i.e. in the limit where Re→0. When miscible layered fluids are Newtonian, the fluids commonly mix in the presence of inertia. That is, two miscible Newtonian fluids will tend to mix, especially at higher flow rates.

By initiating or permitting a reaction (e.g. cross-linking of polymers) to occur between two layered fluids—either Newtonian or non-Newtonian—local conditions may be created at an interface region between the fluids in which local conditions inhibit or prevent the mixing of the fluids, even at moderate to high flow rates. The inventors have determined that local conditions can be created (e.g. by a reaction), where the yield stress associated with the reaction (i.e. the strength of the reaction product) between to moving fluids exceeds the inertial forces (i.e. the viscous and inertial forces) that tend to cause the moving fluids to mix, thereby preventing or mitigating mixing of otherwise miscible fluids. One possible (but not limiting) reaction which the inventors have determined to create such conditions is an in situ (i.e. within the flow) gelation reaction involving one or both of the fluids. Reactions other than gelation could also create local conditions where the yield stress associated with the reaction between moving fluids exceeds the inertial forces that tend to cause the moving fluids to mix.

Figure 1C:
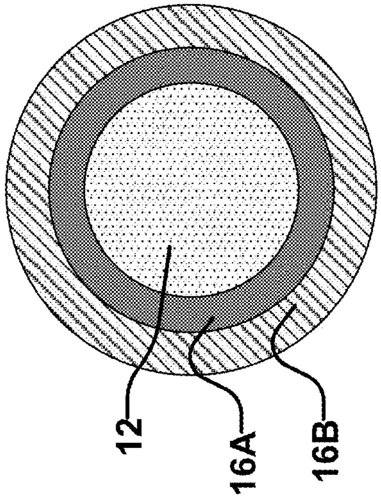
FIGS. 1B-1E show various possible (but not limiting) cross-sections of the FIG. 1A apparatus in a plane generally perpendicular to the flow/extrusion direction.
Figure 1E:
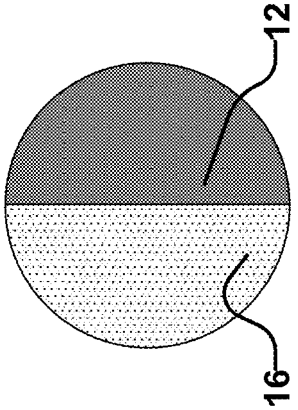
Figure 1B:
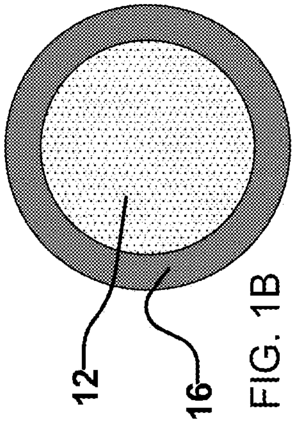

FIG. 1A is a schematic depiction of an apparatus 10 for three-dimensional (3D) extrusion of a structure 20 (such as hydrogel tube 20, for example) formed using a plurality of flowing fluid inputs 12, 16 according to a particular embodiment. The term extrusion and its various derivatives are used throughout this document to describe the various apparatus, methods and reaction products disclosed and/or claimed herein because this term is used in much of the literature in this field—i.e. where a plurality of flowing fluids are brought into the vicinity of one another to create a reaction products. This term should be understood and interpreted in the illustrative sense rather than by the meaning of extrusion in the sense of classical extrusion apparatus and methods, where material is forced through die of known cross-section to produce a product of constant cross-section. The extruded structure 20 may be a reaction product of the flowing fluids 12, 16 in apparatus 10. The FIG. 1A illustration is a cross-sectional view taken in a plane that is generally parallel with fluid flow (extrusion) direction shown by arrow g. The cross-sectional geometry of apparatus 10 (and the corresponding layered fluids 12, 16) as taken in a transverse plane perpendicular to the flow/extrusion direction g can influence the shape of the resulting extruded structure 20. There are many possible geometries in which the layered fluids 12, 16 may be transported in the FIG. 1A apparatus 10. In the embodiments and experiments described herein, the fluids 12, 16 are arranged with an inner flow 12 (having a generally circular transverse cross-section) and one or more outer flows 16A, 16B (collectively, outer flow 16) surrounding the inner cylindrical flow 12 (having generally annular transverse cross-section(s)), as illustrated in FIGS. 1A-1C. These flows 12, 16 can be created for example, by suitably shaped pipes or conduits which provide these flow geometries.

Figure 1D:
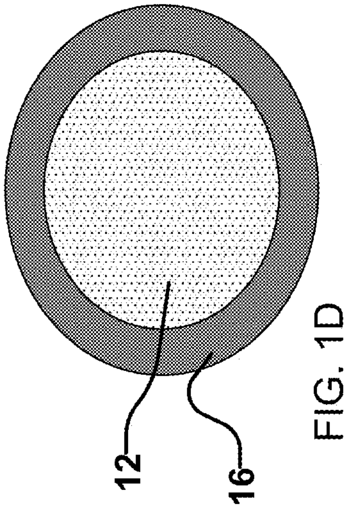

This geometry is non-limiting. Other transverse cross-sectional geometries are possible. In some applications, the transverse cross-sections of various flows 12, 16 may be both non-circular and non-annular. For example, one or more flows 12, 16 may have transverse cross-sectional geometries that are oblong (e.g. FIG. 1D). In some applications, the layered miscible fluids 12, 16 may be arranged so that the fluids are in contact without having an inner flow or an outer flow. For example, the two fluids may be introduced to a cylindrical conduit so that each fluid 12, 16 occupies a bisected transverse cross-sectional portion of the conduit (e.g. FIG. 1E). The transverse geometries of the flows 12, 16 may be used to control the shape of resulting extruded structure 20. For example, where the flowing fluids 12, 16 have an oblong transverse cross-sectional geometry (e.g. FIG. 1D), the extruded structure 20 may comprise a hydrogel tube 20 having an oblong transverse geometry.

Given particular transverse cross-sectional geometries, miscible fluids 12, 16 used in apparatus 10 may flow separately in feed pipes (feed conduits) 14, 18 (which may extend in the flow direction g) prior to fluids 12, 16 being brought into contact with one another in a unitary conduit 19. The unitary conduit 19 may, in some embodiments, such as that shown in FIG. 1A, be an extension of outer conduit 18. With concentric cylindrical flows 12, 16, this may be accomplished by having an inner conduit 14 that is shorter than outer conduit 18, so that inner fluid 12 exiting inner conduit 14 interacts with outer fluid 16 within outer (unitary) conduit 18,19.

The lengths of the inner and outer conduits 14, 18 may be selected so that they are sufficiently long (in the flow direction g, also referred to herein as the longitudinal direction g) that the velocity profile of the fluids 12, 16 become fully-developed, i.e. conduits 14, 18 may be have sufficient lengths in longitudinal direction g to permit fluids 12, 16 to develop an invariant velocity profile in the longitudinal direction g, before fluids 12, 16 interact.

Conduits 14, 18, 19 may be oriented so that the longitudinal flow direction g is in the direction of gravity or closely aligned therewith (e.g. less than 30° in some embodiments, less than 15° in some embodiments), although this orientation is not necessary. In some applications, conduits 14, 18, 19 may be otherwise oriented.

As illustrated in FIGS. 1A, 2 and 3, a first fluid 12 in an inner conduit 14, and a second fluid 16 in an outer conduit 18 are arranged so that first fluid 12 and second fluid 16 flow in longitudinal direction g in inner conduit 14 and outer conduit 18. When inner conduit 14 ends (i.e. at longitudinal locations beyond an outlet 14A of inner conduit 14), flowing fluids 12, 16 are brought into contact with one another and begin to interact in unitary conduit 19. The interaction of first fluid 12 and second fluid 16 produces a reaction product 20. In some embodiments, the reaction product 20 may be an extruded structure 20, such as a hydrogel tube.

Fluids 12, 16 come together (i.e. into contact) at a contact region 23 (which may comprise a contact surface 23). In the case of the illustrated (FIG. 1A) embodiment, contact region 23 coincides with the outlet 14A of inner conduit 14. At contact region 23, fluids 12, 16 begin to react with one another to create a reaction interface region 21 at locations downstream from contact region 23. Contact region 23 may be at the upstream extremity of reaction interface region 21. Fluids 12, 16 may be in contact with one another in contact region 23 and, downstream of contact region 23, may be separated from one another by reaction product 20. At contact region 23, where fluids 12, 16 come into contact, and downstream of contact region 23 in reaction interface region 21, a chemical reaction, or other interaction, such as a change of state and/or the like, may occur between first fluid 12 and second fluid 16. In some embodiments, first fluid 12 may comprise a solvent and a reactive species A at a concentration $C_a$ while second fluid 16 comprises a solvent and a reactive species B at a concentration $C_b$. At contact region 23, where fluids 12, 16 come into contact, and downstream of contact region 23 in reaction interface region 21, a chemical reaction between reactive species A and reactive species B produces reaction product 20. In the FIG. 1A embodiment, the reaction may be localized to a generally annular reaction interface region 21 (e.g. in conduit 19) downstream of contact region 23. Reaction interface region 21 (and reaction product 20) may grow in transverse thickness (e.g. the annulus may get thicker) as fluids 12, 16 flow in longitudinal direction g.

Apparatus 10 can be used to create conditions (e.g. in reaction interface region 21 between flowing fluids 12, 16) which prevent or mitigate the mixing of otherwise miscible flowing fluids 12, 16. Such conditions can be characterized by, for example, the local Reynolds number (local Re) of reaction product 20 in interface region 21 (defined using the viscosity of the reaction product 20). Such conditions may also be characterized by the Damköhler values (Da) of the reaction and the Reynolds numbers ($Re_1$, $Re_2$), fluid velocities ($u_1$, $u_2$) and flow rates ($Q_1$, $Q_2$) of fluids 12, 16 respectively. The velocities $u_1$, $u_2$ of fluids 12, 16 may be defined according to the flow rates $Q_1$, $Q_2$ of fluids 12, 16 divided by the areas of their respective conduits upstream of contact region 23—i.e.

$$u_1 = \frac{Q_1}{A_1} \text{ and } u_2 = \frac{Q_2}{A_2},$$

where $A_1$ is the cross-sectional area of conduit 14 and $A_2$ is the cross-sectional area of the annular conduit in which fluid 16 flows upstream of contact region 23 (i.e. in the illustrated embodiment, $A_2$ is the cross-sectional area of outer conduit 18, 19 less the cross-sectional area of conduit 14).

In general, the Reynolds number of a flowing fluid in a conduit can be expressed as $$Re = \frac{\rho d u}{\mu},$$

where ρ is the density of the fluid, d is a characteristic dimension scale, u is the average velocity of the fluid and μ is the viscosity of the fluid. Because the characteristic dimension scale d can be different for different materials in apparatus 10 (and the other apparatus described herein) at locations upstream of where the different fluids come into contact with one another (e.g. upstream of contact region 23), the Reynolds numbers described and/or claimed herein should be considered at or downstream of the location, where different fluids first come into contact with one another (e.g. at or downstream of contact region 23). At this location (and downstream of this location), the characteristic dimension scale d may be considered to be the inner diameter (or other cross-sectional dimension) of the outer conduit. In the case of apparatus 10, for example, Reynolds numbers should be considered at or downstream of contact region 23, where the characteristic dimension scale d is the inner diameter of the outer conduit 18, 19. As used herein, one may characterize a Reynolds number of either of fluids 12, 16 at or downstream of contact region 23. As used herein, the "local" Reynolds number (local Re) of the reaction product may refer to the Reynolds number of the reaction product at or downstream of the contact region where two fluids first come into contact (e.g. at or downstream of contact region 23 between fluids 12, 16 in the case of the FIG. 1A embodiment). The local Re of the reaction product may be expressed as $$Re_p = \frac{\rho d u_c}{\mu_p};$$

where ρ is a characteristic density of the fluids 12, 16 (where this characteristic density may reduce to that of water in the dilute limit), d is a characteristic dimension scale (e.g. the inner diameter of the outer conduit 18, 19), $u_c$ is a velocity parameter defined as the total flow rate $Q_t=\Sigma_i Q_i$ (where $Q_1$ is the flow rate of inner fluid 12 and $Q_2$ is the flow rate of outer fluid 16) divided by the cross-sectional area of outer conduit 18,19 and $\mu_p$ is the apparent viscosity of the reaction product (e.g. reaction product 20).

The Reynolds numbers ($Re_1$, $Re_2$) of the fluids 12, 16 at or downstream of where they first come into contact (e.g. at or downstream of contact region 23) may be defined according to $$Re_1 = \frac{\rho d u_c}{\mu_1} \text{ and } Re_2 = \frac{\rho d u_c}{\mu_2}$$

where $\mu_1$ and $\mu_2$ are the respective viscosities of fluids 12, 16 and the other parameters have the meaning described above. The Damköhler value (Da) of the reaction in apparatus 10 (and the other apparatus described herein) may be defined according to $$Da = \frac{d r_\alpha}{u_c},$$

where $r_a$ is a reaction rate $r_a=kC_X$, where k is a rate constant and $C_X$ is a concentration of species X in the reaction and the other parameters have the meanings discussed above.

The flow rates ($Q_i$, $Q_2$) of fluids 12, 16 (which impact the parameter $u_c$ discussed above) may be set such that the Reynolds number, $Re_1$, for first fluid 12 and/or the Reynolds number, $Re_2$, for second fluid 16 may be greater than 100, 500, 1000 or 2000, based upon the rheological properties of first fluid 12 and second fluid 16. At least one of first fluid 12 and second fluid 16 may have a Reynolds number greater than 100, 500, 1000 or 2000. If the fluid rheology of either fluid 12, 16 is non-Newtonian, the viscosity of the fluid as used in the definition of the Reynold's number may be evaluated at the nominal shear rate, i.e. $u_c/d$.

The reaction rate between flowing fluids 12, 16 in reaction interface region 21 may generally be large in comparison to the advective or diffusive time scales, such that the Damköhler number (Da) of the reaction is large. The selection of the constituent parts of fluids 12, 16 (e.g. reactants dissolved in fluids 12, 16), and/or other properties of fluids 12, 16 may be chosen to provide a Damköhler number in reaction interface region 21 in a range of $10\text{-}10^6$ in some embodiments. In some embodiments, this range is $100\text{-}10^5$. The Damköhler value Da may be less than $10^9$.

In reaction interface region 21, a reaction product 20 is created by a reaction between fluids 12, 16. Contact region 23, at the upstream extremity of reaction interface region 21 (e.g. where fluids 12, 16 first come into contact and a reaction product 20 is first created), may be referred to as the initial interface 23. Since fluids 12, 16 are flowing in longitudinal direction g, they carry reaction product 20 forward, with the reaction continuing to occur in reaction interface region 21 downstream of initial interface 23. It will be appreciated that in the illustrated embodiment of FIGS. 1A and 1B, where first and second fluids 12, 16 have circular and annular transverse cross-sections, initial interface 23 and reaction interface region 21 may have annular transverse cross-sections, which will tend to produce reaction product 20 with an annular transverse cross-section and continuous length, i.e. a tube. If fluids 12, 16 are able to continue to interact through reaction product 20, further chemical reaction may occur, thickening the transverse dimensions of reaction product 20 at locations of reaction interface region 21 downstream of initial interface 23.

Reaction product 20 may exist as an intact, continuous and separate material from fluids 12, 16, and may exhibit a clearly defined interface, such that reaction product 20 does not mix into fluids 12, 16. If reaction product 20 behaves as a fluid, the tubular shape of reaction product 20 may remain continuous (and fluids 12, 16 will not mix) if the local Reynolds number of reaction product 20, $Re_p$ as defined above, is sufficiently low. In some embodiments, this local Reynolds number of reaction product 20 $Re_p$ is less than 100, 50, 20, 10, or 1. If reaction product 20 behaves as a solid, the tubular shape of reaction product 20 may remain continuous when the stress applied to reaction product 20 (due to its motion or otherwise) is less than the ultimate strength of the material of reaction product 20.

The rheological properties of reaction product 20 may be dependent upon the concentrations of the reactants. If reaction product 20 behaves as a solid and if the velocities $u_1$, $u_2$ of fluids 12, 16 vary with time, the tubular shape of reaction product 20 may remain continuous (with possible variation of its inner and/or outer diameter) while the stress applied to cause its motion is less than the strength of the material of reaction product 20. Outside of these criteria, reaction product 20 may not form a continuous tube and the reactive species (fluids 12, 16) may mix across reaction interface region 21.

If the conditions are such that the reaction product 20 forms a continuous tube (and fluids 12, 16 do not mix), the trajectory of reaction product 20 may remain generally parallel to the longitudinal/flow direction g for various combinations of [$C_a$, $C_b$, $u_1$, $u_2$, $\mu_1$, $\mu_2$, $\rho_1$, $\rho_2$, $D_a$, D] where $\mu_1$, $\mu_2$ are the apparent viscosity of the fluids 12, 16; $\rho_1$, $\rho_2$ are the densities of the fluids 12, 16, and D is the diffusivity of the reactants dissolved in fluid 16 into reaction product 20. If the conditions are such that reaction product 20 forms a continuous tube, then the thickness of the tube wall may increase at locations in reaction interface region 21 downstream of initial interface 23. The mechanism for this increase in thickness at downstream locations may be a diffusive process, i.e. reactive species A and B diffuse into reaction interface region 21 and/or into reaction product 20. The growth of the tube wall of reaction product 20 may continue while reactive species A and B remain present in the system. Consequently, transverse dimensions of the tube wall of reaction product 20 may be controlled by removing one or more of the reactive species, for example by reaching the end of conduit 19 and allowing fluids 12, 16 to spread transversely apart from one another out and/or away from reaction product 20.

The transverse dimensions (e.g. inner and/or outer diameter) of reaction product 20 may be further controlled by varying inlet velocities $u_1$, $u_2$ (e.g. a ratio of inlet velocities $u_1$, $u_2$) upstream of initial interface 23. If operated under suitable inlet velocity conditions, the transverse dimensions of reaction product 20 may be shaped accordingly. With varying inlet velocity conditions, the transverse dimensions of reaction product 20 may be made to vary along its axial length.

The extrusion structure (reaction product 20) production techniques described herein may be modified. By way of non-limiting example, the co-axial 3D extrusion apparatus of FIG. 1A can be extended to multi (three or more)-layer 3D co-axial extrusion.

Simulations Using the Two-Layer Apparatus

The FIG. 1A extrusion apparatus 10 may be illustratively simulated for the case of a gelation reaction between two Newtonian fluids. The gelation reaction may be idealized to have the form:

$$\underbrace{2n(\text{—RCOOH—})}_{C_1} + \underbrace{nCaCl_2}_{C_2} \longrightarrow \underbrace{n(\text{—RCO—Ca—OCR—})_{gel}}_{C_3} + \underbrace{2nHCl}_{C_4}$$

Where $C_i$ defines the concentration of each species in FIG. 1A with $C_1$ and $C_2$ respectively being input fluids 12, 16, $C_3$ representing a hydrogel reaction product 20 and $C_4$ representing a second reaction product. In the specific case where interior fluid 12 is an ionically cross-linkable hydrogel (e.g. alginates, alginic acids, nano-fibrillated cellulose (NFC), combinations of these materials and/or the like) and outer fluid 16 is a calcium solution, equation (1A) may have the form:

$$2nX + nCa^{2+} \rightarrow n\underbrace{[X \cdot Ca^{2+} \cdot X]}_{\equiv P} \quad (1\text{ B})$$

where: n is the degree of cross-linking (the egg-box coefficient for the case of alginate); X represents either alginate or NFC, P is the reaction product 20 and where the chlorine is not specifically shown.

Numerical simulations were conducted in the dilute limit with fluids 12, 16 reacting according to equation (1B). In this limit, the total density ρ is the constant solvent density (e.g. water) and the equations of motion read:

$$\frac{\partial C_i}{\partial t} + \nabla \cdot (C_i u) - \nabla \cdot (D_i \nabla C_i) = r_i, \quad i \in [H_2O, Ca^{2+}, X, P] \quad (2)$$

$$\nabla \cdot u = 0 \quad (3)$$

$$\rho\left(\frac{\partial u}{\partial t} + \nabla \cdot (u \otimes u)\right) - \nabla \cdot \tau + \nabla p = 0. \quad (4)$$

where u is the two-dimensional velocity field, p the pressure field, and τ the deviatoric part of the Cauchy stress tensor. The rate of reaction, $r_i$, is defined by elementary kinetics:

$$r_{H_2O} = 0 \quad (5)$$

and $$\frac{r_{Ca^{2+}}}{k_{Ca^{2+}}} = \frac{r_X}{k_X} = -\frac{r_P}{k_P} = -C_{Ca^{2+}} + C_X \quad (6)$$

where $k_i$ is the rate of reaction scaled to the molar mass fraction $$\frac{M_i}{M_{Ca^{2+}} M_X}.$$

Due to the large differences in molar masses $M_{Ca^{2+}}$«MX, M of solutes, only the diffusivity of calcium ions was modelled as non-negligible: $D_{Ca^{2+}}>0$ and $D_{H_2O}=D_X=D_p=0$. The system was closed with the Bingham constitutive model $$\tau = \mu\dot{\gamma} + \tau_y \frac{\dot{\gamma}}{\|\dot{\gamma}\|} \text{ if } \dot{\gamma} \neq 0 \quad (7)$$

$$\|\tau\| \leq \tau_y \text{ if } \dot{\gamma} = 0 \quad (8)$$

with $$\dot{\gamma} = (\nabla u + \nabla u^T) \quad \|\tau\| = \sqrt{\frac{1}{2}\Sigma_{i,j=1}^2 \tau_{ij}^2} \quad (9)$$

The viscosity μ and yield stress $\tau_y$ may vary in space and time since all of the four fluids involved—the pure solvent $H_2O$ and solutions of $Ca^{2+}$, X or P—can exhibit different rheologies. The mixture viscosity was computed using a Grunberg-Nissan model (as outlined in L. Grunberg and A. H. Nissan. Mixture law for viscosity. Nature, 164(4175): 799-800, 1949, which is hereby incorporated herein by reference) and the local yield stress from a weighted average $$\ln(\mu)=\Sigma_i x_i \ln(\mu_i) \tau_y=\Sigma_i x_i \tau_{y,i} \quad (10)$$

where $\mu_i$ and $\tau_{y,i}$ are the viscosity and yield stress of the four fluids, determined by experiment, and $x_i$ their molar fractions in the mixture. The system of equations (2)-(4), (7) and (8) was complemented with no-slip and no-penetration boundary conditions along the walls, fully-developed flow conditions at the outlet and a prescribed flux and concentration of each species at the inlet. The flow was initialized with a steady Stokes flow field, with the concentrations $C_i$ layered in the entire domain like at the inlet.

This system was solved numerically employing Glowinski's fractional-step θ-scheme (as outlined in R. Glowinski. Viscous flow simulation by finite element methods and related numerical techniques. In E. M. Murman and S. S. Abarbanel, editors, *Progress and Supercomputing in Computational Fluid Dynamics*, pages 173-210, Boston, 1985. Birkhauser, which is hereby incorporated herein by reference) as a second-order time-stepping scheme with very little numerical dissipation. At each time step, the fully coupled system was split into the advection-diffusion-reaction problem from equation (2) and the viscoplastic flow problem from equations (3)-(8) and then solved iteratively in a block-Jacobi cycle. An algebraic flux correction scheme (as outlined in D. Kuzmin. Linearity-preserving flux correction and convergence acceleration for constrained Galerkin schemes. *J. Comput. Appl. Math.*, 236(9):2317-2337, 2012, which is hereby incorporated herein by reference) was applied to the mass transport block to resolve sharp gradients in the solutions of equation (2), while enforcing monotonicity, positivity, and mass conservation. To resolve the viscoplastic rheology in its original non-smooth form with no artificial regularization, a fixed-point iteration was employed and preconditioned with the semismooth approximation of De los Reyes and Gonzalez Andrade (as outlined in J. C. De los Reyes and S. Gonzalez Andrade. Numerical simulation of two-dimensional Bingham fluid flow by semismooth Newton methods. *Journal of Computational and Applied Mathematics,* 235(1):11-32, 2010, which is hereby incorporated herein by reference). For the discretization in space, the hybridizable discontinuous Galerkin method of Rhebergen and Wells was employed (as outlined in S. Rhebergen and G. N. Wells. A hybridizable discontinuous Galerkin method for the Navier-Stokes equations with pointwise divergence-free velocity field. *Journal of Scientific Computing,* 76(3):1484-1501, 2018, which is hereby incorporated herein by reference), which was based on triangular Brezzi-Douglas-Marini elements of order 1 for the velocity, and piecewise constant approximations for the pressure and the stress tensor. This resulted in a scheme which is stable and which leads to cellwise momentum-conservative and pointwise mass-conservative numerical solutions.

After calibration of the constitutive relationships (e.g. diffusivity $D_{Ca^{2+}}$ and yield stress $\tau_y$ through independent experiments, the inventors probed the hydrodynamic behavior of the FIG. 1A apparatus 10 over a relatively large parameter-space governing the FIG. 1A apparatus 10. Specifically, the inventors considered the Reynolds (Re), Peclet (Pe), Damköhler (Da), and Bingham (Bi) numbers defined by $$Re = \frac{\rho d u_c}{\mu_c}; Pe = \frac{d u_c}{D_{Ca^{2+}}}; Da = \frac{d r_a}{u_c}; Bi = \frac{d \tau_y}{u_c \mu_c} \quad (11)$$

and velocity ($u_1/u_2$) and viscosity ($\mu_1/\mu_2$) ratios between fluids 12, 16 at the location where fluids 12, 16 come into contact (e.g. contact region 23). For this investigation, the velocities $u_1$, $u_2$ of fluids 12, 16 were defined according to the flow rates $Q_1$, $Q_2$ of fluids 12, 16 divided by the areas of their respective conduits upstream of contact region 23—i.e.

$$u_1 = \frac{Q_1}{A_1} \text{ and } u_2 = \frac{Q_2}{A_2},$$

where $A_1$ is the cross-sectional area of conduit 14 and $A_2$ is the cross-sectional area of the annular conduit in which fluid 16 flows upstream of contact region 23 (i.e. in the illustrated embodiment, $A_2$ is the cross-sectional area of outer conduit 18, 19 less the cross-sectional area of conduit 14). The inner diameter of outer conduit 18, 19 parameter d was defined to be a characteristic length scale and the reaction rate $r_a = kC_{Ca^{2+}}$, where k is a rate constant and $C_n$ refers to the concentration of species n. In the dilute limit, the density $\rho$ of the fluids 12, 16 was assumed to be equal to the density of water. Also, a characteristic viscosity $\mu_c$ was chosen to be the lowest viscosity in the system to characterize the maximum level of inertia in the system. Accordingly, in the case of the simulations, the characteristic viscosity $\mu_c$ was chosen to be $\mu_c = \min(\mu_1, \mu_2)$. The average velocity $u_c$ was defined by the total flow rate $Q_t = \Sigma_i Q_i$ (where $Q_1$ is the flow rate of inner fluid 12 and $Q_2$ is the flow rate of outer fluid 16) divided by the cross-sectional area of outer conduit 18, 19 and the mass flux of each stream may be defined as $\Omega_i = C_j Q_i$, where $j \in$ [water, $Ca^2$,X]. The Reynolds numbers ($Re_1$, $Re_2$) of fluids 12, 16 were defined as above according to $$Re_1 = \frac{\rho d u_c}{\mu_1} \text{ and } Re_2 = \frac{\rho d u_c}{\mu_2}$$

where $\mu_1$ and $\mu_2$ are the respective viscosities of fluids 12, 16 and the other parameters have the meaning described above in relation to equation (11). In the particular case of simulation results described herein, the diameter of inner conduit 14 was set to 4 mm and that of outer conduit 18, 19 was set to 10 mm.

The system of equations (2)-(4), (7) and (8) described in the Simulations section above was complemented with the following boundary conditions $$u = u_{in} \quad \text{on } \Gamma_{in} \quad \text{(inflow)}$$

$$u = 0 \quad \text{on } \Gamma_{wall} \quad \text{(no slip)}$$

$$(\tau n)\cdot n - p = -p_{atm} \quad \text{on } \Gamma_{out} \quad \text{(fully developed)}$$

$$u \times n = 0 \quad \text{on } \Gamma_{out} \quad \text{(fully developed)}$$

$$C_i = C_{i,in} \quad \text{on } \Gamma_{in} \quad \text{(inflow)}$$

$$(C_i u - D\nabla C_i)\cdot n = 0 \quad \text{on } \Gamma_{wall} \quad \text{(no flux)}$$

$$\frac{\partial C_i}{\delta n} = 0 \quad \text{on } \Gamma_{out} \quad \text{(fully developed)}$$

Where the inflow velocity $u_{in}$, the atmospheric pressure $p_{atm}$, and the inflow concentrations $C_{i,in}$ were prescribed data.

Figure 2A:
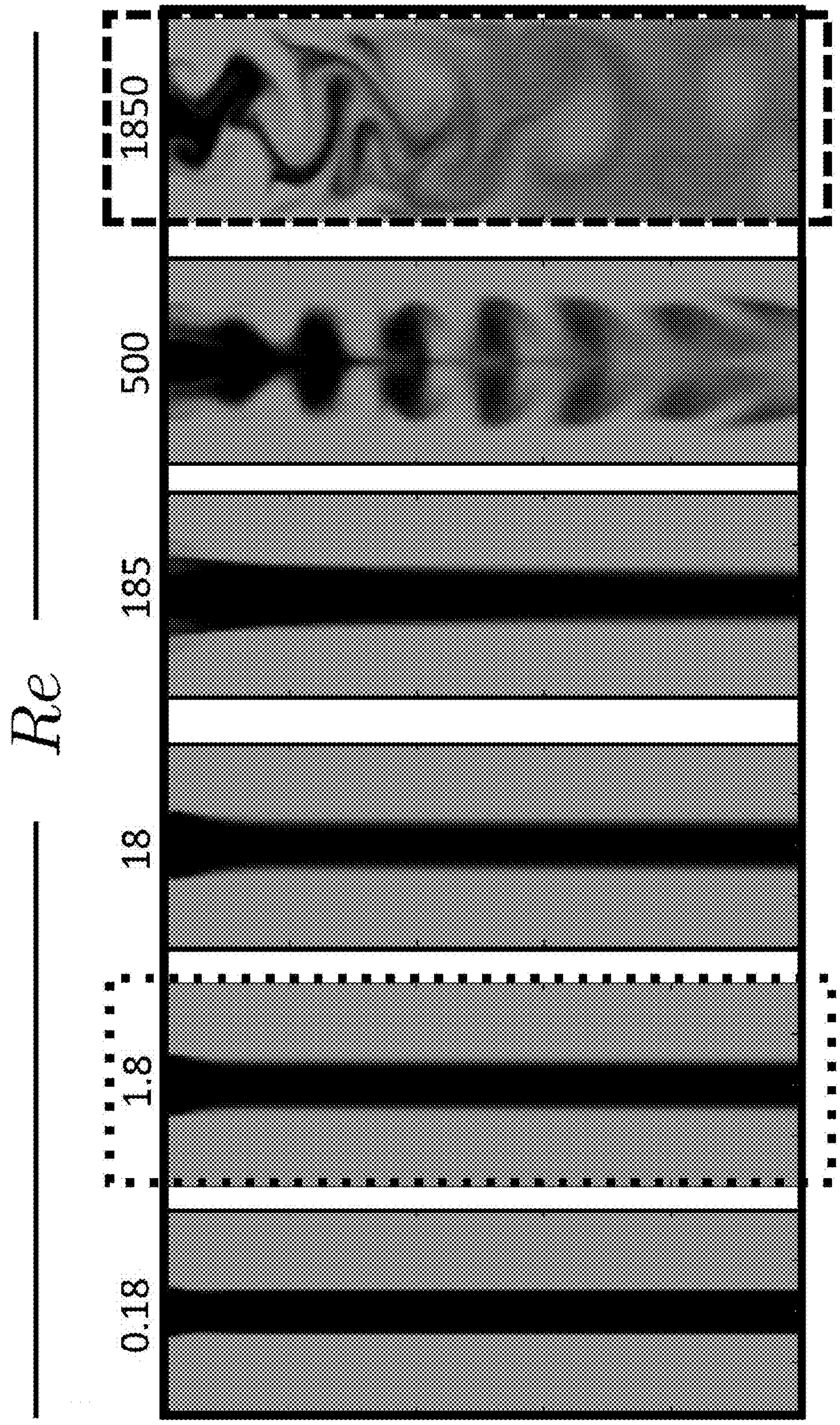
FIGS. 2A-2D show various simulation results on a simulated version of the FIG. 1A apparatus using non-reactive fluids.
Figure 2B:
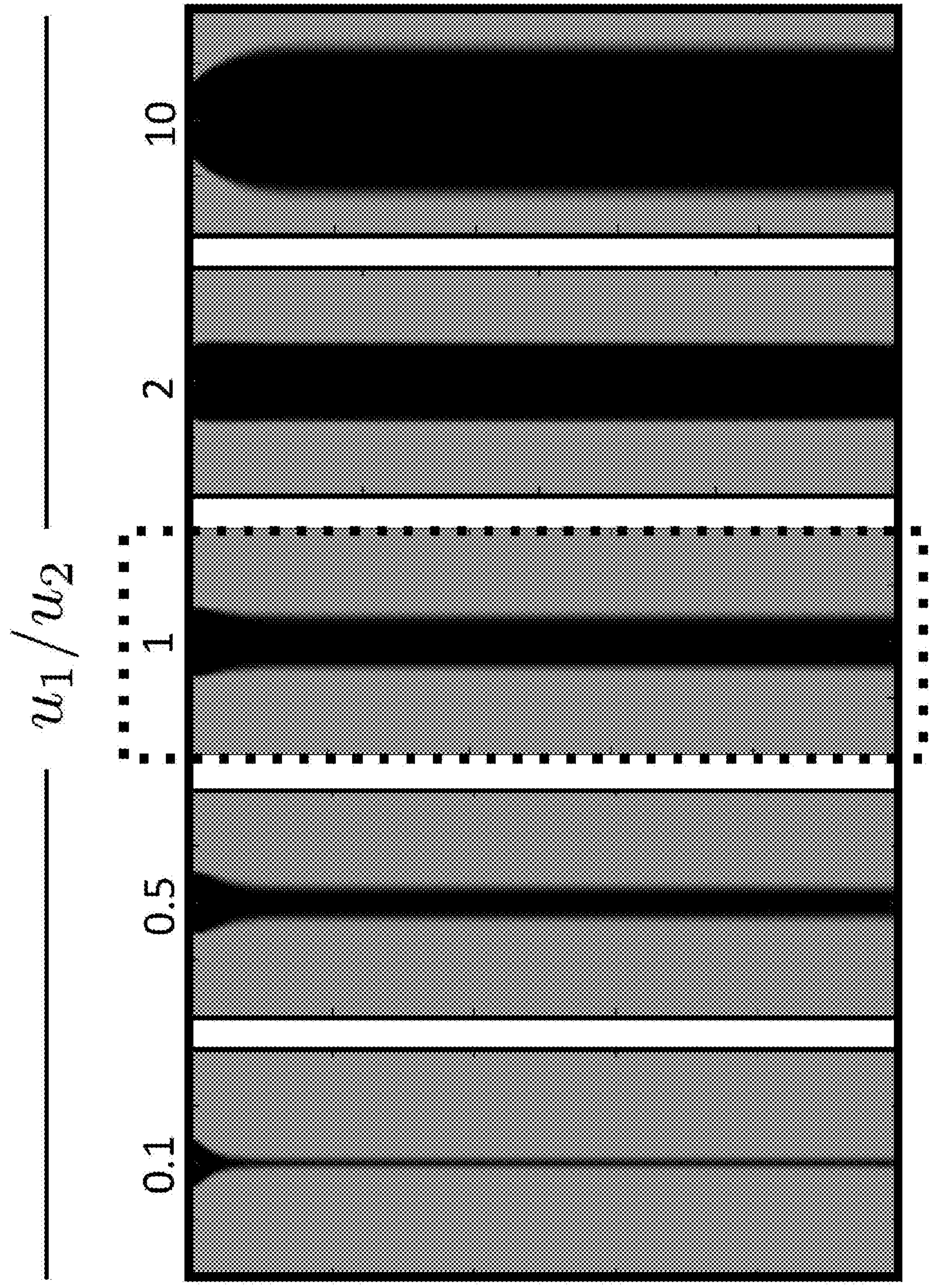
Figure 2C:
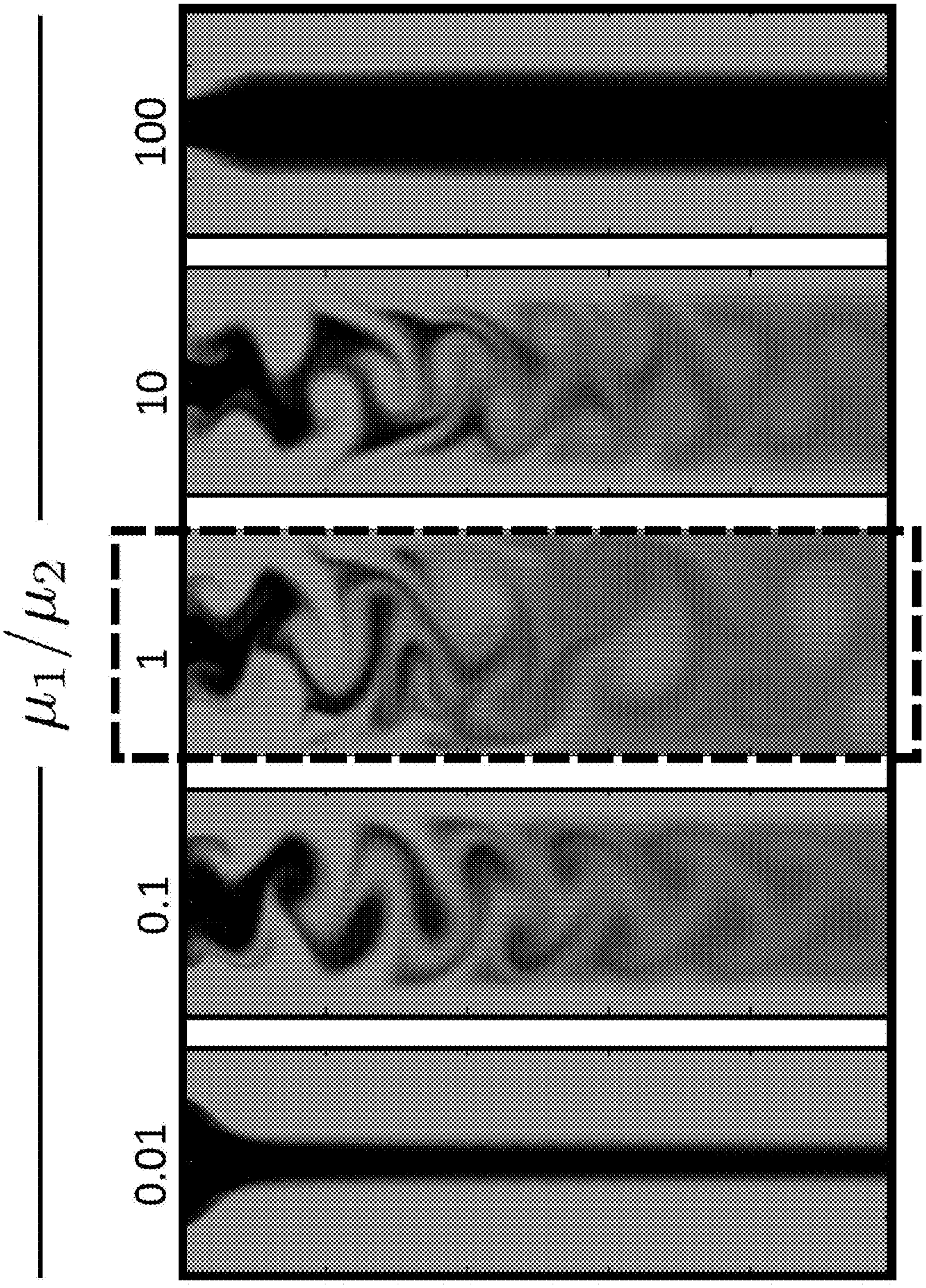
Figure 2D:
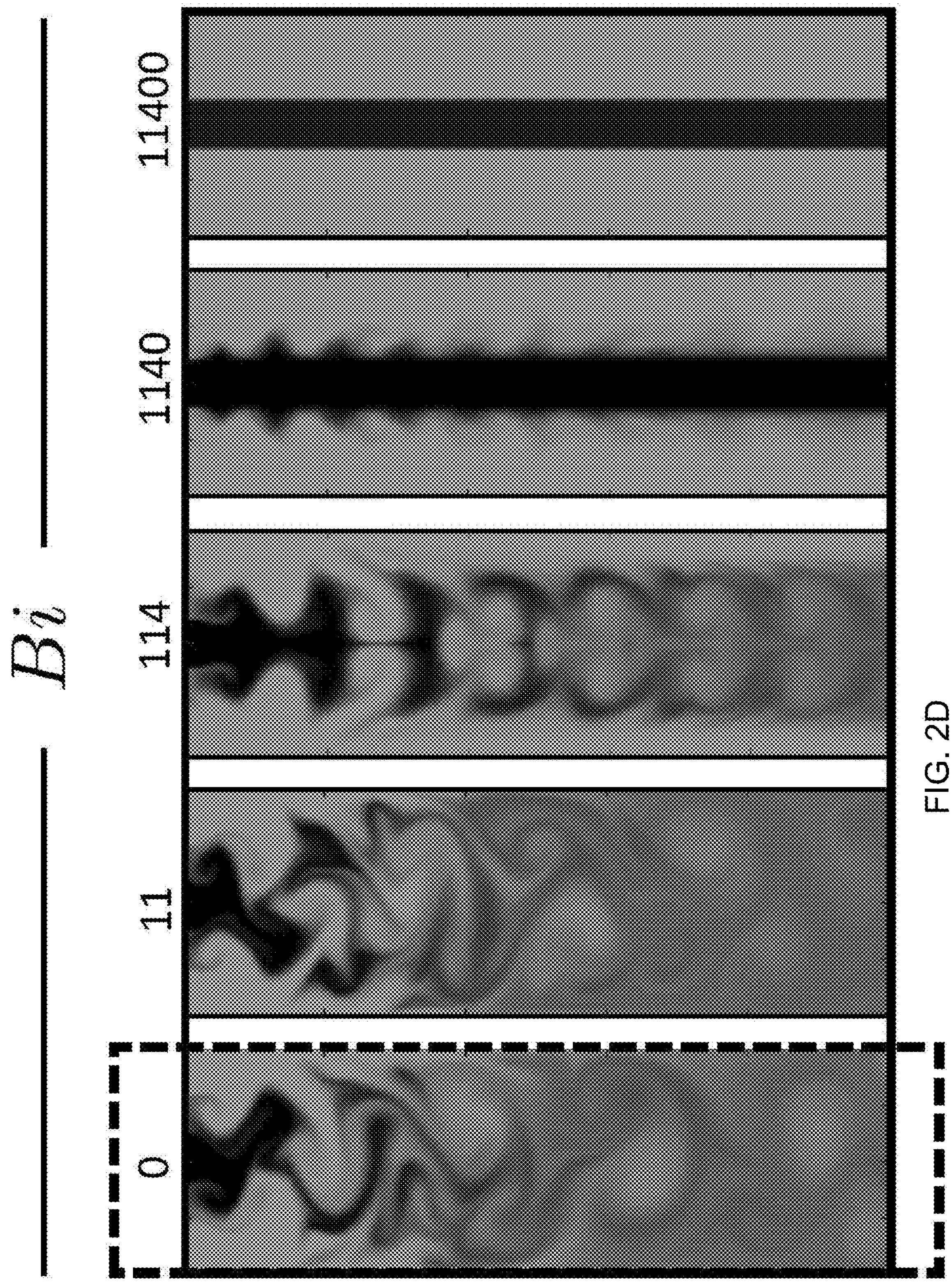

Simulation results are shown in FIGS. 2A-2D for a pair of non-reactive fluids 12, 16 in apparatus 10. The simulations shown in FIGS. 2A-2D were conducted in a large Pe limit to minimize the effect of diffusion and with Da=0 to eliminate the effect of a reaction between the fluid 12, 16. Each of FIGS. 2A-2D examines the behavior of fluids in apparatus 10 when one variable (shown at the top of the drawing) is varied. FIG. 2A illustrates the effect of Re on the apparatus 10 flow for two fluids 12, 16 at equivalent inlet velocities and viscosities. For the FIG. 2A series of simulations, fluids 12, 16 were Newtonian with $\mu_1 = \mu_2 = \mu_c = 1\times10^{-3}$ Pa·s. FIG. 2A shows that interfacial instabilities dominate the flow state when Re increases—i.e. fluids 12, 16 mix when Re reaches a level that is too high. FIG. 2B shows simulation results for the Re=1.8 conditions shown in dotted outline from FIG. 2A (i.e. Re=1.8, $u_1/u_2 = \mu_1/\mu_2 = 1$, Bi=0 and Da=0) and probes the effect of the velocity ratio ($u_1/u_2$) over the range $u_1/u_2 \in$ [0.1, 10]. FIG. 2B shows that, under non-mixing conditions, the diameter of the flow of inner fluid 12 can be varied (e.g. increased) by varying (e.g. increasing) the velocity ratio ($u_1/u_2$). Thus, the velocity ratio ($u_1/u_2$) can be used to control the cross-sectional area of a reaction product 20 (FIG. 1A). FIG. 2C shows simulation results for the Re=1850 conditions shown in dashed outline from FIG. 2A (i.e. Re=1850, $u_1/u_2 = 1$, $\mu_1/\mu_2 = 1$, Bi=0 and Da=0), and then examines the effect of viscosity ratio ($\mu_1/\mu_2$) over the range $\mu_1/\mu_2 \in$ [0.1, 10]. FIG. 2C shows that when the viscosity of one of fluids 12, 16 is sufficiently greater than the viscosity of the other one of fluids 12, 16, then this can give rise to non-mixing conditions. That is, interfacial instabilities are dampened when inner fluid 12 has a significantly larger viscosity ($\mu_1$) than the viscosity ($\mu_2$) of outer fluid 16 (or vice versa) for Newtonian fluids. FIG. 2D shows simulation results for the Re=1850 conditions shown in dashed outline from FIG. 2A (i.e. Re=1850, $u_1/u_2=1$, $\mu_1/\mu_2=1$, Bi=0 and Da=0), and then examines the effect of Bi over the range Bi∈[0,11400]. FIG. 2D illustrates that interfacial instabilities are dampened with an increase in Bi (e.g. for Bi over a threshold) for non-Newtonian fluids.

Figure 3A:
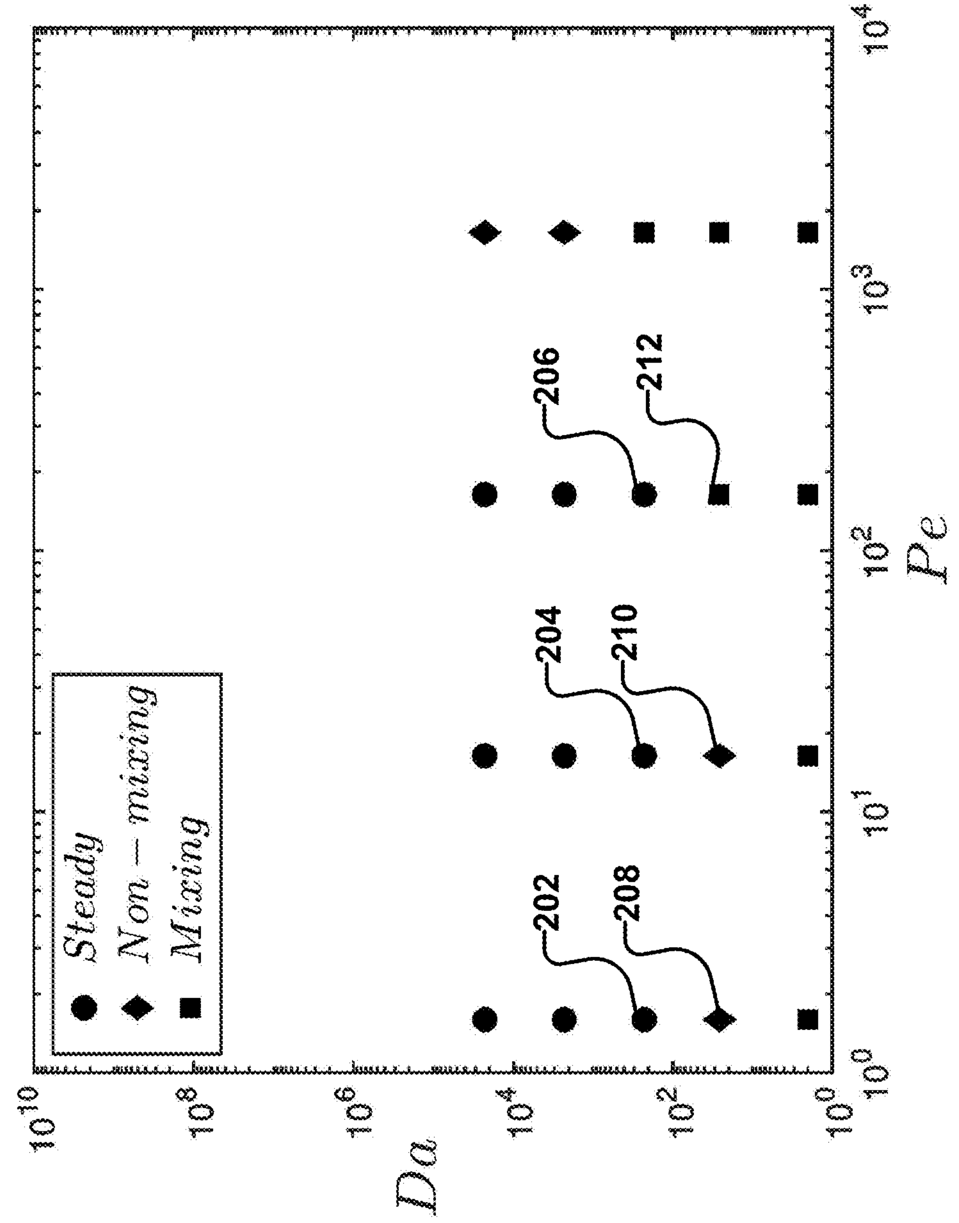
FIG. 3A shows the stability of a number of simulation cases for the FIG. 1A apparatus using reactive fluids as a function of the Peclet (Pe) and Damköhler (Da) numbers.
Figure 3B:
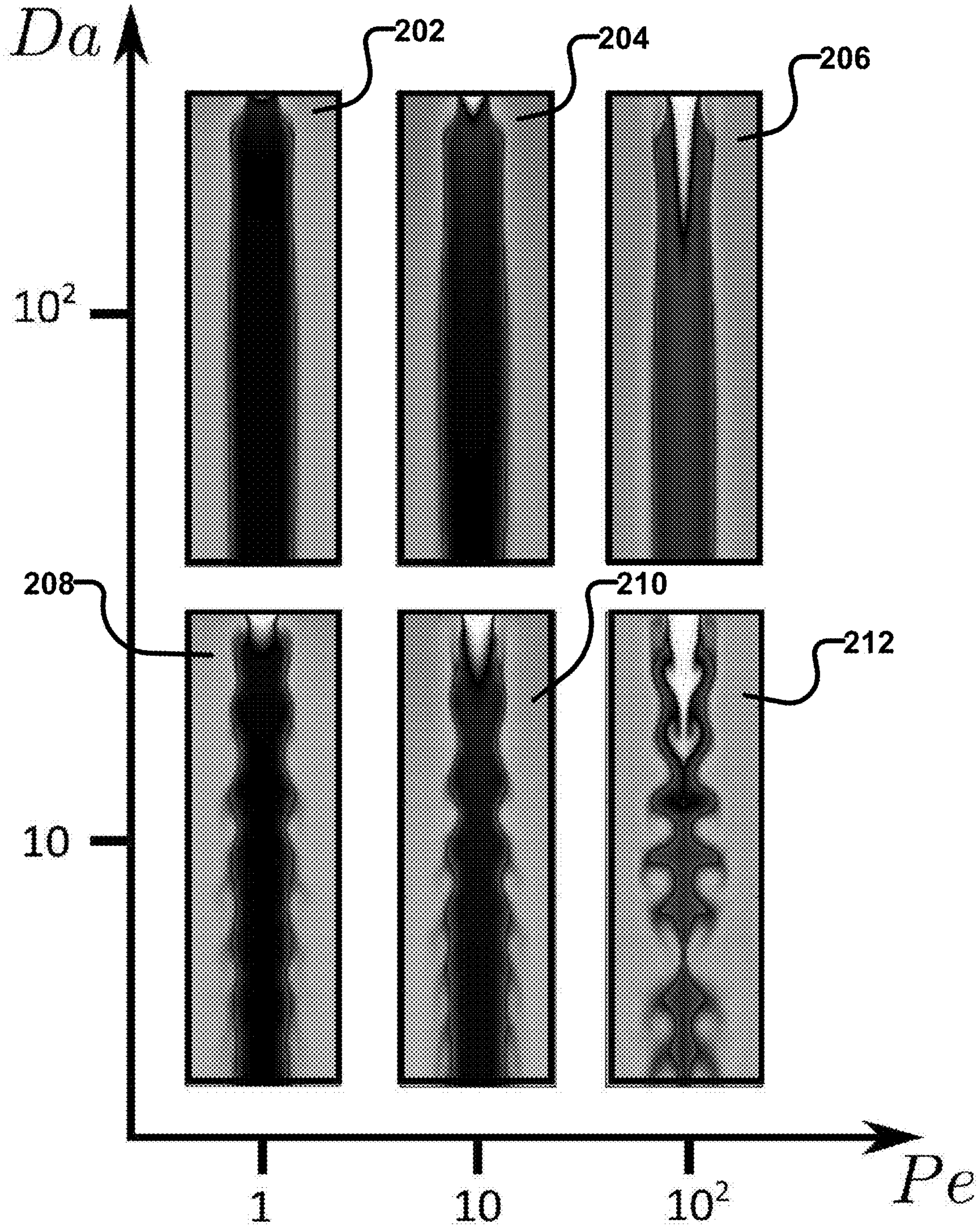
FIG. 3B displays a series of representative snapshots of the concentration fields of a number of the FIG. 3A simulations.
Figure 3C:
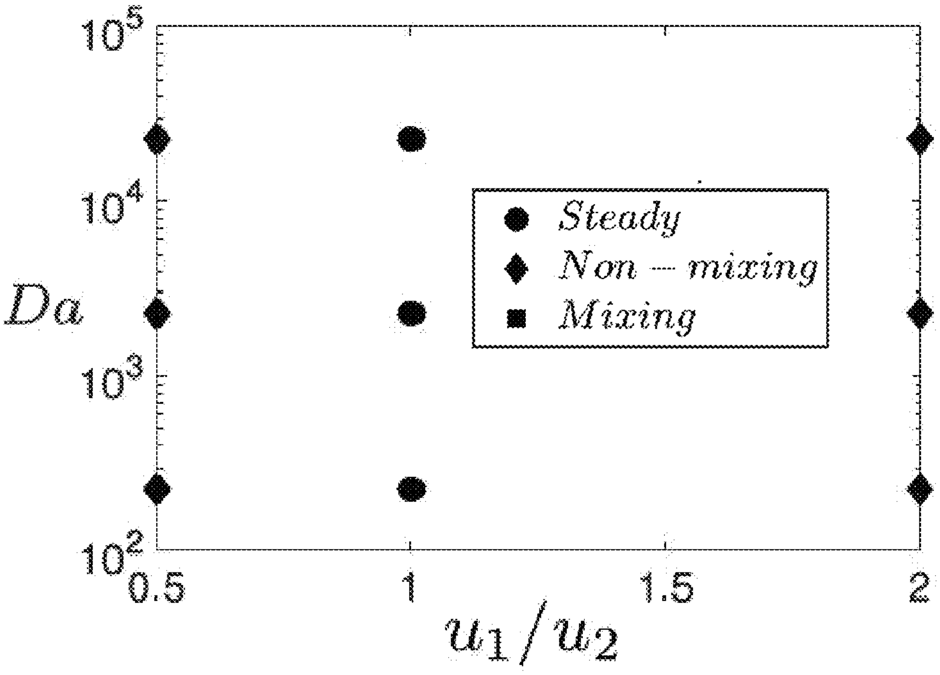
FIG. 3C extends the FIG. 3A simulation range and examines stability as a function of Da and the velocity ratio $u_1/u_2$, at a fixed Peclet number of Pe=164, to understand the sensitivity of the FIG. 3A simulations to the inlet conditions.

The inventors then extended the simulation results relating to the FIG. 1A apparatus 10 to consider reactive fluids 12, 16. This was done by first identifying the subset of cases given in FIGS. 2A-2D which yield unstable conditions, and then slowly increasing both the reaction rate (Da) and diffusion ($Pe^{-1}$) until the interface stabilized. FIG. 3A shows a representative series of simulations of the FIG. 1A apparatus 10 with reactive fluids 12, 16, outlining the combinations (Pe, Da) where non-mixing conditions are created. The stable flows are characterized as either steady (circles) or non-mixing (diamonds), the latter of which is limited to cases where interfacial instabilities are dampened after contact region 23 or when symmetry is broken and the interface remains intact. FIG. 3B displays a series of representative snapshots of the concentration fields corresponding to a number of the FIG. 3A simulations 202, 204, 206, 208, 210, 212. The reactant X (as represented in the equations above) is inner fluid 12 (shown as white), outer fluid 16 ($Ca^{2+}$) is shown as light grey, and reaction product 20 (shown as black) forms in reaction interface region 21 between fluids 12, 16. For all of the simulations shown in FIGS. 3A and 3B, Re=1840, and $\mu_X=\mu_{Ca^{2+}}=1\times10^{-3}$ Pa·s and $u_1/u_2=1$. Reaction products 20 behave as a Newtonian fluid (Bi=0) with $\mu_P=0.1$ Pa·s, which is significantly larger than the reactants and aids in interface stabilization. FIG. 3C extends the FIG. 3A simulation range and examines stability of the interface between reactive fluids 12, 16 as a function of Da and the velocity ratio $u_1/u_2$, at a fixed Peclet number of Pe=164, to understand the sensitivity of the FIG. 3A simulations to the inlet conditions.

FIGS. 3A-3C (collectively, FIG. 3) illustrate that creating a steady interface between fluids 12, 16 is sensitive to velocity ratio $u_1/u_2$ and that the local change in viscosity associated with reaction product 20 stabilizes the interface when the reaction rate (Da) and mass transfer are sufficiently large. Significantly, FIGS. 3A-3C that reaction products 20 do not necessarily need to adopt a viscoplastic rheology to achieve stability. Accordingly, gelation at the interface is not a necessary condition to achieve a stabilized interface; interfacial perturbations can be dampened at large viscosity ratios.

Figure 4A:
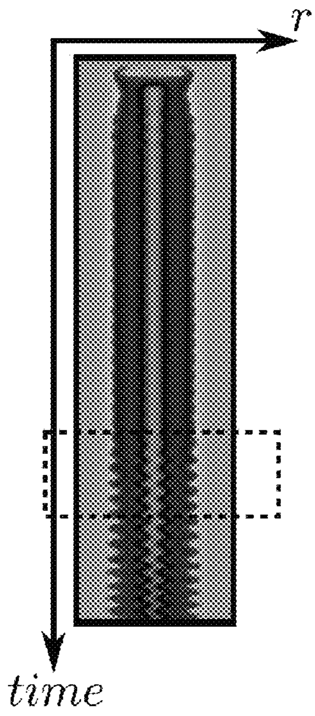
FIG. 4A shows a spatiotemporal plot for a simulation case observed at a particular cross-sectional location for the FIG. 1A apparatus using reactive fluids which illustrates a dynamic non-mixing condition.
Figure 4B:
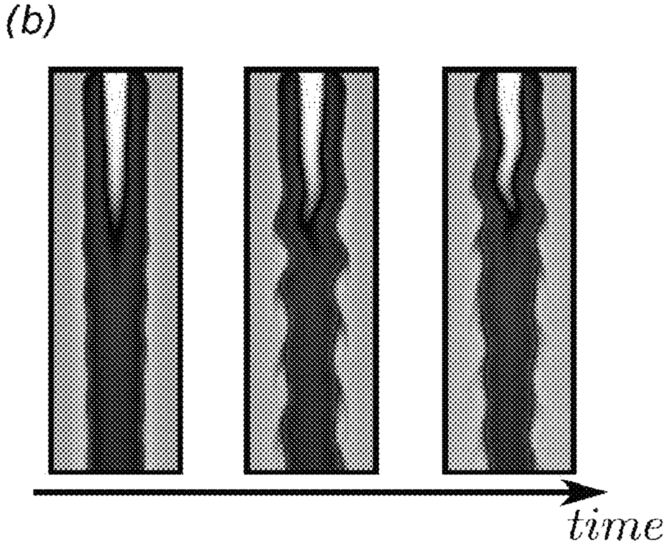
FIG. 4B shows a number of temporally spaced apart snapshots taken from a portion of the FIG. 4A spatiotemporal plot.

FIGS. 4A and 4B (collectively, FIG. 4) illustrate a non-mixing, dynamic case that can arise using the FIG. 1A apparatus 10 with reactive fluids 12, 16, which is common for moderate to large Pe, small Da and small velocity ratio $u_1/u_2$ and which the inventors have also shown to exist experimentally. FIG. 4A is a spatiotemporal diagram of the concentration fields at a select position along apparatus 10 over a time span of 1.6 s conducted with Pe=165, Da=22, Re=1850, $\mu_X=\mu_{Ca^{2+}}=1\times10^{-3}$ Pa·s and $u_1/u_2=2$. Reaction product 20 behaves as a Newtonian fluid with $\mu_P=1$ Pa·s. FIG. 4B shows a number of temporally spaced apart snapshots taken from a portion of the FIG. 4A spatiotemporal plot. FIG. 4 shows that, although symmetry is broken, the interface between fluids 12, 16 remains intact (i.e. there is no mixing between fluids 12, 16). The FIG. 4B snapshots of the flow highlight that the local Newtonian rheology is sufficient to prevent mixing between fluids 12, 16 when symmetry is broken which suggests the feasibility of shaping gelated bodies (reaction products 20) under inertial conditions.

These numerical experiments suggest that flows of fluids 12, 16 using the FIG. 1A apparatus can remain stable (non-mixing) under inertial conditions by controlling rheology, where reaction product 20 adopts a viscosity which is large in comparison to reactants (fluids 12, 16). A viscoplastic rheology is helpful, but not required to achieve stability. These results also show that the stable boundary is influenced by (Pe, Da), with the range of stable Pe increasing with increasing Da. Stability in some simulated cases was observed where (i) the rate of reaction between fluids 12, 16 is fast in comparison to advection and diffusion, i.e. relatively large Damköhler numbers (Da), and (ii) the local Reynolds number ($Re_p$) of reaction product 20 in interface region 21 is order ten (i.e. Re~O(10)).

Experimental Results Using the Two-Layer Apparatus

The inventors conducted experiments using the FIG. 1A apparatus 10 which examined reactions between ionically cross-linkable reactants (e.g. alginates, alginic acids, nano-fibrillated cellulose (NFC), combinations of these materials and/or the like), injected into inner conduit 14 to provide fluid 12 and surrounded by a calcium solution (fluid 16) in outer conduit 18. While the experiments described herein use a salt solution comprising divalent calcium ions ($Ca^{2+}$) as one of the reactants, other salts containing other metal ions are known to react with ionically cross-linkable hydrogels and may be used in accordance with particular embodiments of the methods and apparatus described herein. By way of non-limiting example, such metal ions may include polyvalent metal ions such as: $Pb^{2+}$, $Cu^{2+}$, $Cd^{2+}$, $Ba^{2+}$, $Sr^{2+}$, $Co^{2+}$, $Ni^{2+}$, $Zn^{2+}$, $Mn^{2+}$, $Al^{3+}$, combinations of these metal ions and/or the like. Suitable salt solutions comprising salts of these metal ions may be used as one of the reactants (together with an ionically cross-linkable hydrogel as the other reactant) may be used as the reactants for particular embodiments of the methods and apparatus described herein. Indeed, a wide variety of suitable fluid reactants may be used in accordance with particular embodiments of the methods and apparatus described herein (e.g. as fluids 12, 16, 112, 116, 132) to achieve suitably stable reaction products.

Figure 5A:
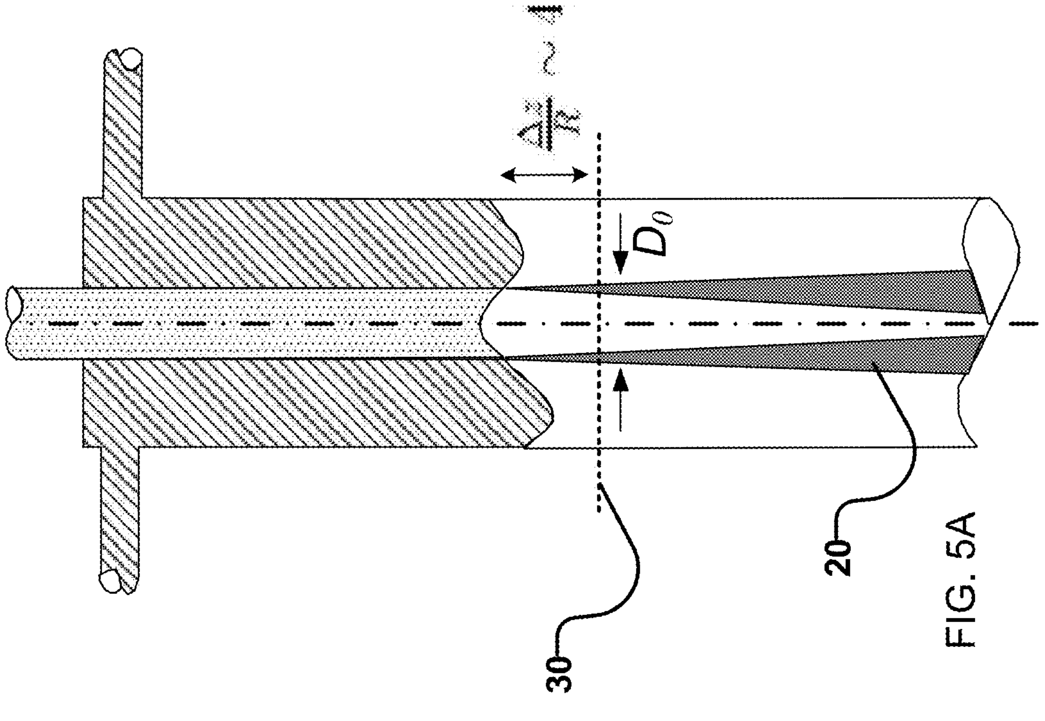
FIG. 5A shows an experimental set-up using the FIG. 1A apparatus.

Apparatus 10 was oriented vertically, where the longitudinal/flow direction g was in the direction of gravity. FIG. 5A schematically illustrates the measurement conditions for the experimental data shown in FIGS. 5B, 5C and 5D, where the horizontal line 30 is the measurement position, Δz represents a longitudinal location (at which the measurements were taken for FIGS. 5B, 5C and 5D) and R represents the radius of outer conduit 18, 19. The design was successfully realized and a systematic study was conducted to delineate the stable operating window of apparatus 10. Repeated realizations of the experiment were performed to characterize operational stability (e.g. generation of reaction product 20 without mixing of fluids 12, 16) as a function of the volumetric flow-rates and concentrations of input fluids 12, 16. An example set of results for these experiments is shown in FIG. 5B for the case where inner fluid 12 was 0.75% (w/w) alginate and outer fluid 16 was 4.0% (w/w) CaCl. Like the theoretical predictions (shown in FIG. 3A), the experimental results indicated unconditional stability for these two reactants with $\{C_2/C_1=C_{Ca^{2+}}/C_X;\ Q_2/Q_1=Q_{Ca^{2+}}/Q_X;\ Q_1+Q_2(\text{mL/min})=Q_{Ca^{2+}}+Q_X(\text{mL/min})\}\in\{[0.5,\ 4];\ [0.75,\ 9.25];\ [45,\ 160]\}$ as the viscosity of reaction product 20 drops the local Reynolds number ($Re_p$) of reaction product 20 to Re~O(10), and the gelation is rapid (for example, in comparison to the advective and diffusive time-scales). This stable (non-mixing) regime is shown as darkly shaded region II in FIG. 5B. In this stable regime (region II), the outer diameter ($D_0$) of the tube was controlled by varying the flow rate ratio ($Q_2/Q_1$) of fluids 16, 12.

The scalability of this method was demonstrated by producing ~200 cm of hydrogel tubing (as reaction product 20) with stable outer dimensions.

Figure 5D:
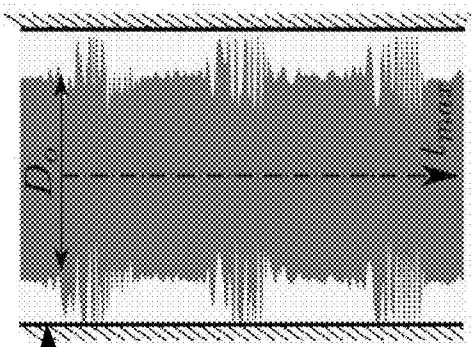
FIGS. 5B, 5C, 5D show various results and conditions based on use of the FIG. 5A set-up and the FIG. 1A apparatus which illustrate conditions corresponding to hydrodynamic stability.
Figure 5C:
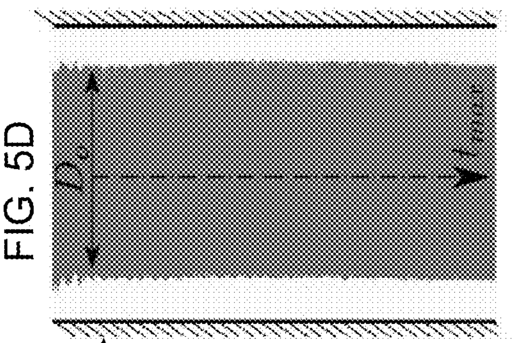
Figure 5B:
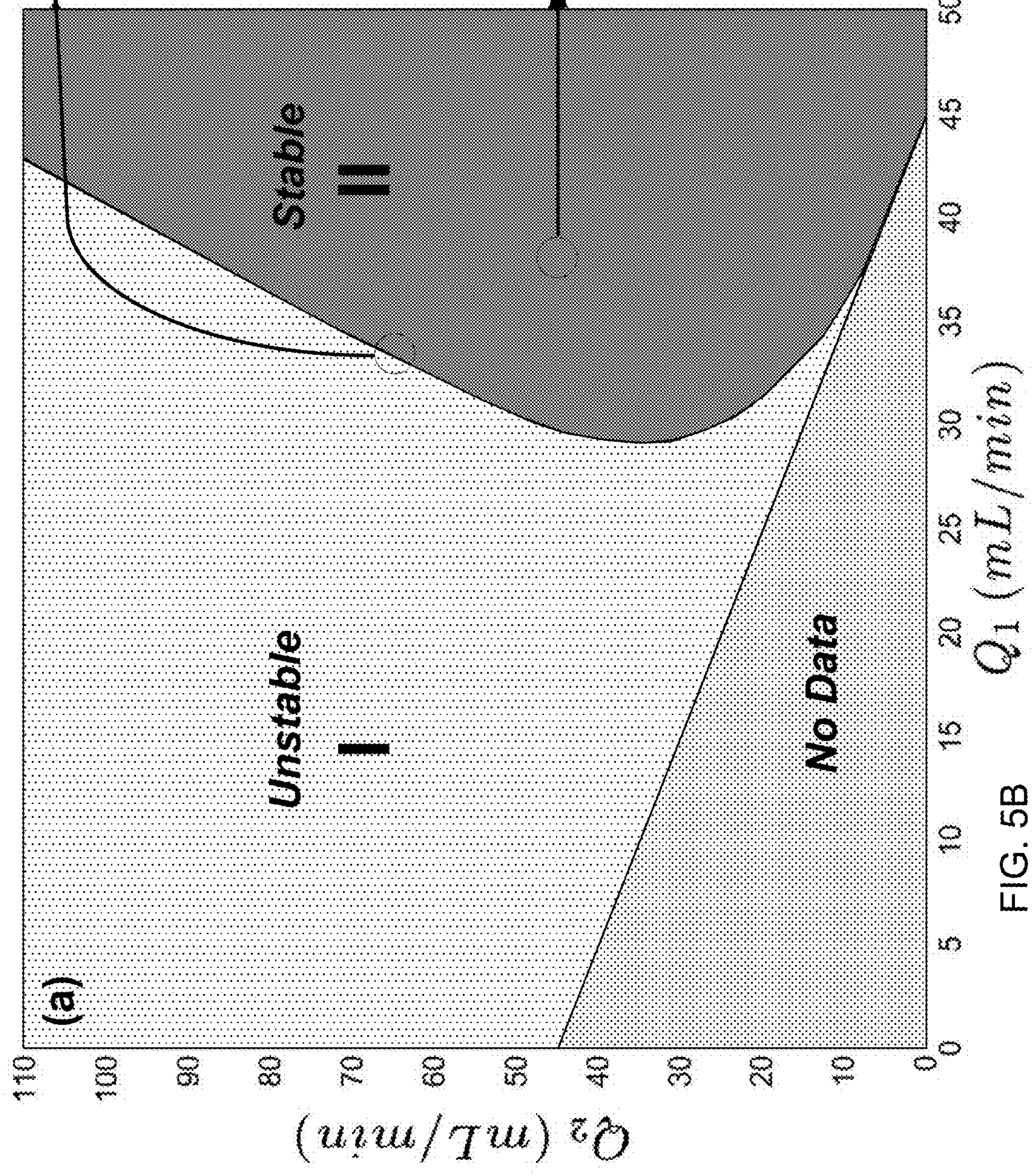

FIGS. 5C and 5D show the time evolution (spatiotemporal plots) of the outer diameter ($D_o$) of the tube (reaction product 20), measured at location 30, as a function of time where $t_{max}$=2 min. FIG. 5C shows the stability of the outer diameter ($D_o$) of reaction product 20 in conditions corresponding to region II in FIG. 5B.

In the conditions of region I shown in FIG. 5B, there was instability (i.e. mixing of fluids 12, 16). On the boundary between unstable region I and stable region II, a quasi-steady feature, shown in FIG. 5D, was found where the outer diameter $D_o$ of the reaction product 20 varied periodically, and the trajectory of the resultant tube followed a helical pattern. The Reynolds number (as defined in equation (11)) for this FIG. 5D example was on the order 250. These complex behaviors are attributed to the non-linear rheology (see FIG. 6) and the elasto-mechanical response of the gelated reaction product structure 20 to spatial gradients in osmotic pressure.

Figure 6:
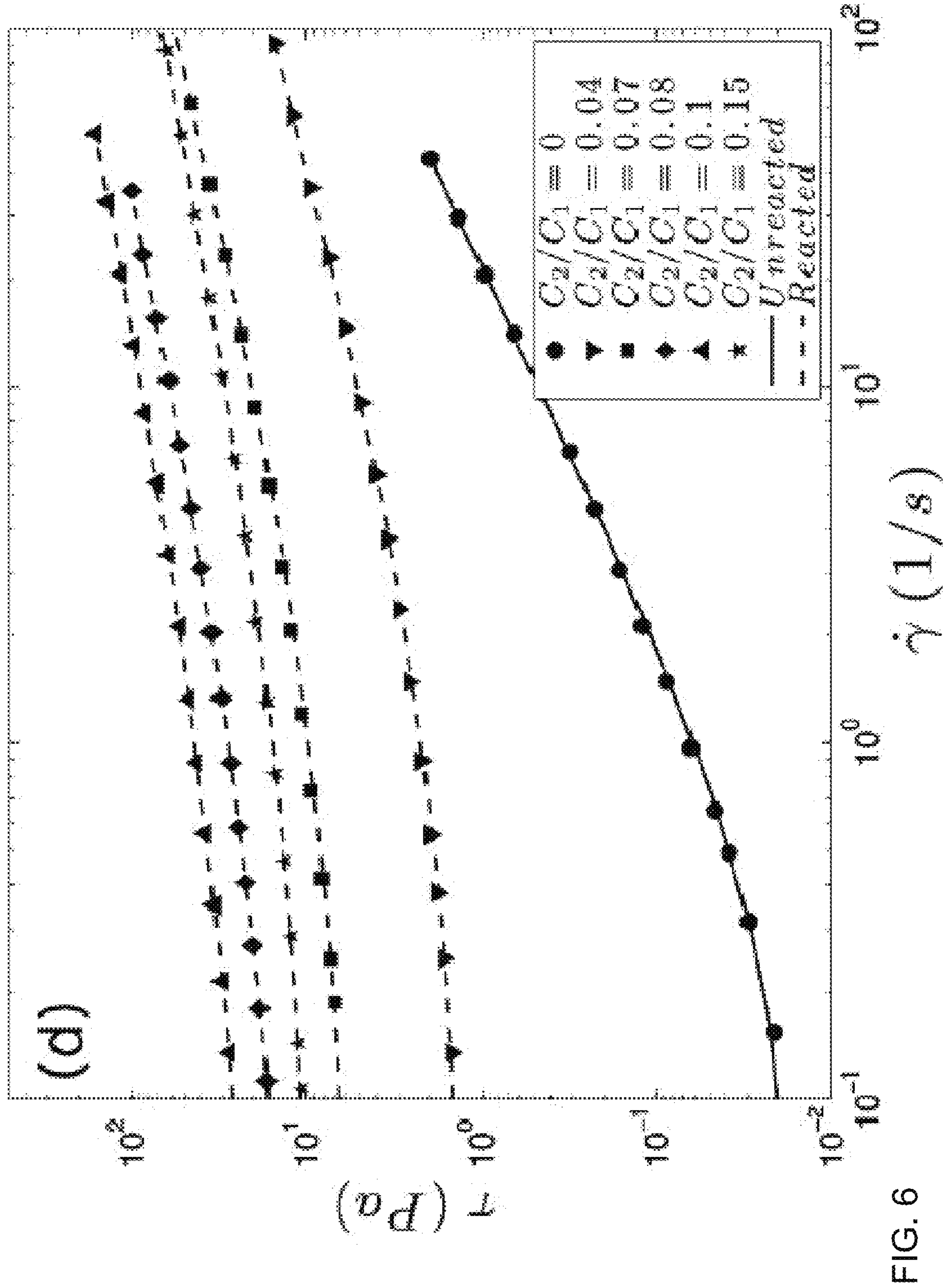
FIG. 6 shows experimental data relating to the FIG. 1A apparatus illustrating that the shear stress of the reaction products is a non-monotonic function of the concentration ratio of the reactants.

FIG. 6 shows a number of flow curves for various experiments conducted using 0.75% (w/w) alginate ($C_1=C_X$) as inner fluid 12 and various concentrations of $CaCl_2$ ($C_2=C_{Ca^{2+}}$) as outer fluid 16. The unreacted (solid lines) and reacted (dashed lines) are the fitted Herschel-Bulkley models. The FIG. 6 results illustrate the rheology of reaction products 20 printed using the FIG. 1A apparatus during the printing process.

The inventors further examined the robustness of the process and translation of the stability criteria to multiphase flows by adding several additives to the starting material that varied in size from several nanometers up to several millimeters. Such additives could include synthetic or natural occurring fibers, nanotube materials, and/or the like. FIGS. 7A-7D show examples of air dried hydrogel tubes 20 made of alginate (FIG. 7A), alginate with nano-scale fiber additive, specifically, nano-fibrillated cellulose (NFC) (FIG. 7B), alginate with micron-scale fiber additive, specifically tempo oxidized northern bleached softwood kraft (NBSK) cellulose fibre (FIG. 7C), and alginate with millimeter scale fiber additive, specifically NBSK cellulose fibre (FIG. 7D) constructed using the FIG. 1A apparatus. These experiments demonstrated that particles which exceed the size of conventional small scale 3D extrusion printers can be added to the large scale FIG. 1A apparatus and that the size of the hydrogel tubes 20 can be shaped (e.g. by switching between stable operating states) in situ to a desired shape when operating in the stable configures (e.g. in the stable region II of FIG. 5B). In some embodiments, such natural and/or synthetic fiber additives may have average aspect ratios (e.g. length to cross-sectional dimension) greater than 25:1. In some embodiments such additive average aspect ratios are greater than 50:1. In some embodiments such additive average aspect ratios are greater than 90:1. In some embodiments, the average length dimension of such natural and/or synthetic additives is greater than 1 mm. In some embodiments, the average length dimension of such additives is greater than 2 mm. In some embodiments, the average length dimension of such additives is greater than 5 mm.

Additives suitable for use with apparatus 10 (and/or the other apparatus described herein) are not generally limited to fibrous additives. Non-limiting examples of additives that could be added to the fluids of the apparatus described herein and could thereby be embedded in the reaction products described herein include drugs, fertilizer, biological materials (e.g. stem cells), photoluminescent materials, reactive species, antimicrobials ($TiO_2$, Ag colloids, etc.), additives to change the hydrophobicity of the outer surface (e.g. chitosan and/or the like), viscosity modifiers, other materials that provide additional functionality and/or the like.

FIG. 8A displays experimental measurements (using particle image velocimetry) of the velocity field (in the flow direction) and the outer diameter $D_o$ of the hydrogel tube 20 using the FIG. 1A apparatus 10 with a 0.25% (w/w) alginate (inner fluid 12) solution contacted with a 1.2% (w/w) $CaCl_2$ solution (outer fluid 16). The outer diameter $D_o$ of the hydrogel tube 20 is shown using a dashed white line. The flow profiles in the axial direction $u_c(r,z)$ are shown in FIG. 8A using black solid lines and, when averaged, equal $u_c$=18 mm/s. The flow profile in the flow direction is referred to as $u_z$. The grey scale map shows the normalized velocity $u_z/u_c$ in the flow direction, with lighter shades corresponding to greater velocities. FIG. 8A exhibits non-monotonic behavior in the axial (longitudinal direction) velocity field, indicating the presence of a body force in addition to the gravitational forces. This force is an osmotic pressure, generated in the system from the sharp gradient in molar concentration between the $CaCl_2$ and alginate solutions, which dramatically affects the magnitude of the velocity field near the interface between the fluids 12, 16.

FIG. 8B shows a numerical simulation under similar inertial conditions to the experiment in FIG. 8A. The FIG. 8B conditions were Da=527, Pe=1200, $\mu_X=10\mu_{Ca^{2+}}=0.01$ Pa·s and $\mu_P=0.1$ Pa·s. It can be observed by comparing FIGS. 8A and 8B that the velocity fields of the simulation results are similar to those of the experimental results.

FIGS. 8C and 8D show cross-sections of alginate tubes (reaction products 20) generated using FIG. 1A apparatus 110 at different reaction times, with the reaction time shown in FIG. 8D being longer than that of FIG. 8C. These images involved the use of 0.75% (w/w) alginate solution as outer fluid 16 and 1% (w/w) $Ca^{2+}$ solution as inner fluid 12. Like the theoretical estimates, FIGS. 8C and 8D illustrate that the wall thickness, $l_w$, can be estimated approximately according to $l_w \approx \sqrt{Dt_r}$ where D is the diffusivity of the salt solution (inner fluid 12) and $t_r$ is the residence time in apparatus 10.

As shown in FIG. 8E, the inventors considered the hydraulic performance of the extruded hydrogel tubing (reaction product) 20 by measuring the change in pressure (ΔP/L) per unit distance (pressure drop) for a range of flow rates (Q) to check whether the material properties of the extruded hydrogel tubing 20 could withstand typical extracorporeal circuit (ECC) conditions. The data shown in FIG. 8E was for a hydrogel tube 20 fabricated using 1.5% alginate as inner fluid 12 and 2% $CACl_2$ as outer fluid 16. As shown in FIG. 8E, the hydraulic behavior of the extruded hydrogel tubing 20 followed standard conduit laws for the case of 50% glycerol (circular data points) and water (square data points).

Three-Layer Apparatus

FIG. 9A is a schematic depiction of an apparatus 110 for 3D extrusion of a structure 120 (such as a hydrogel structure 120, for example) formed using a plurality of flowing fluid inputs 112, 116, 132 according to a particular embodiment. The extruded structure 120 may be a reaction product of the flowing fluids 112, 116 in apparatus 110. The FIG. 9A illustration is a cross-sectional view taken in a plane that is generally parallel with fluid flow (extrusion) direction shown by arrow g. The cross-sectional geometry of apparatus 110 (and the corresponding layered fluids 112, 116, 132) as taken in a transverse plane perpendicular to the flow/extrusion direction g can influence the shape of the resulting extruded structure 120. There are many possible geometries in which the layered fluids 112, 116, 132 may be transported in the FIG. 9A apparatus 110. In the embodiments and experiments described herein, the fluids 112, 116, 132 are arranged with an inner flow 112 (having a generally circular transverse cross-section), a mid-flow 116 surrounding the inner cylindrical flow 112 (having generally annular transverse cross-section) and an outer flow 132 surrounding the mid-flow 116 (also having generally annular transverse cross-section). These flows 112, 116, 132 can be created for example, by suitably shaped pipes or conduits which provide these flow geometries.

This geometry is non-limiting. Other transverse cross-sectional geometries are possible, like those discussed herein for apparatus 10, for example. Given particular transverse cross-sectional geometries, miscible fluids 112, 116, 132 used in apparatus 110 may flow separately in feed pipes (feed conduits) 114, 118, 134 (which may extend in the flow direction g) prior to being brought into contact with one another in a unitary conduit 119. The unitary conduit 119 may, in some embodiments, such as that shown in FIG. 9A, be an extension of outer conduit 134. With concentric cylindrical flows 112, 116, 132 this may be accomplished by having an inner conduit 114 and mid conduit 118 that are shorter than outer conduit 134, so that inner fluid 112, mid fluid 118 and outer fluid 132 come into contact with one another within outer (unitary) conduit 134, 119.

The lengths of the inner, mid and outer conduits 114, 118, 134 may be selected so that they are sufficiently long (in the flow direction g, also referred to herein as the longitudinal direction g) that the velocity profile of the fluids 112, 116, 132 become fully-developed, i.e. develop an invariant velocity profile in the longitudinal direction g, before fluids 112, 116, 132 come into contact with one another and interact.

Conduits 114, 118, 134, 119 may be oriented so that the longitudinal flow direction g is in the direction of gravity or closely aligned therewith, although this orientation is not necessary. In some applications, conduits 114, 118, 134, 119 may be otherwise oriented.

FIG. 9B shows a schematic depiction of the reaction interface regions 121, 125 and extruded reaction product 120 from the FIG. 9A apparatus 110 for stable conditions.

As illustrated in FIG. 9A, a first (inner) fluid 112 in an inner conduit 114, a second (middle) fluid 116 in a middle conduit 118 and a third (outer) fluid 132 in an outer conduit 134 are arranged so that fluids 112, 116, 132 flow in longitudinal direction g in inner conduit 114, middle conduit 118 and outer conduit 134. When inner conduit 114 ends (i.e. at longitudinal locations beyond an outlet of inner conduit 114), flowing fluids 112, 116 are brought into contact with one another and begin to interact in unitary conduit 119. Similarly, when middle conduit 118 ends (i.e. at longitudinal locations beyond an outlet of middle conduit 118), flowing fluids 116, 132 are brought into contact with one another and begin to interact in unitary conduit 119. The longitudinal locations of the ends of inner conduit 114 and middle conduit 118 may be the same, although this is not necessary. In some embodiments, the end of one of inner conduit 114 and outer conduit 118 is at a different location than the end of the other one of inner conduit 114 and outer conduit 118. The interaction of fluids 112, 116, 132 produces a reaction product 120. In some embodiments, the reaction product 120 may be an extruded structure 120, such as a hydrogel tube.

Fluids 112, 116 come together (i.e. into contact) at a contact region 123 (which may comprise a contact surface 123). In the case of the illustrated (FIG. 9A, 9B) embodiment, contact region 123 coincides with the outlet (downstream end) of inner conduit 114. At contact regions 123, fluids 112, 116 begin to react with one another to create a reaction interface region 121 at locations downstream from contact region 123. Contact region 123 may be at the upstream extremity of reaction interface region 121. Fluids 112, 116 may be in contact with one another in contact region 123 and, downstream of contact region 123, may be separated from one another by inner reaction product 120A. At contact region 123, where fluids 112, 116 come into contact, and downstream of contact region 123 in reaction interface region 121, a chemical reaction, or other reaction such as a change of state, may occur between inner fluid 112 and middle fluid 116. In some embodiments, inner fluid 112 may comprise a solvent and a reactive species A at a concentration $C_a$ while middle fluid 116 comprises a solvent and a reactive species B at a concentration $C_b$. At contact region 123, where fluids 112, 116 come into contact, and downstream of contact region 123 in reaction interface region 121, a chemical reaction between reactive species A and reactive species B produces inner reaction product 120A. In the FIGS. 9A and 9B embodiment, the reaction may be localized to a generally annular reaction interface region 121 (e.g. in conduit 119) downstream of contact region 123. Reaction interface region 121 (and inner reaction product 120A) may grow in transverse thickness (e.g. the annulus may get thicker) as fluids 112, 116 flow in longitudinal direction g.

Fluids 116, 132 come together (i.e. into contact) at a contact region 127 (which may comprise a contact surface 127). In the case of the illustrated (FIGS. 9A and 9B) embodiment, contact region 127 coincides with the outlet of middle conduit 118. At contact region 127, fluids 116, 132 begin to react with one another to create a reaction interface region 125 at locations downstream from contact region 127. Contact region 127 may be at the upstream extremity of reaction interface region 125. Fluids 116, 132 may be in contact with one another in contact region 127 and, downstream of contact region 127, may be separated from one another by outer reaction product 120B. Inner and outer reaction products 120A, 120B may be collectively and individually referred to herein as reaction product 120. At contact region 127, where fluids 116, 132 come into contact, and downstream of contact region 127 in reaction interface region 125, a chemical reaction, or other reaction such as a change of state, may occur between middle fluid 116 and outer fluid 132. In some embodiments, middle fluid 116 may comprise a solvent and a reactive species B at a concentration $C_b$ while outer fluid 132 comprises a solvent and a reactive species C at a concentration $C_c$. In some embodiments, the reactive species C of outer fluid 132 is the same as the reactive species A of inner fluid 112, although this is not necessary. At contact region 127, where fluids 116, 132 come into contact, and downstream of contact region 127 in reaction interface region 125, a chemical reaction between reactive species B and reactive species C produces outer reaction product 120B. In the FIGS. 9A and 9B embodiment, the reaction may be localized to a generally annular reaction interface region 125 (e.g. in conduit 119) downstream of contact region 127. Reaction interface region 125 (and outer reaction product 120B) may grow in transverse thickness (e.g. the annulus may get thicker) as fluids 116, 132 flow in longitudinal direction g.

Apparatus 110 can be used to create conditions (e.g. in reaction interface regions 121, 125 between flowing fluids 112, 116, 132) which prevent or mitigate the mixing of otherwise miscible flowing fluids 112, 116 and 116, 132. Such conditions can be characterized by, for example, the local Reynolds number (local Re) of the reaction products 120A, 120B in interface regions 121, 125 between fluids 112, 116 and 116, 132 (defined using the viscosity of the reaction product 120A, 120B). Such conditions may also be characterized by the Damköhler values (Da) of the reactions and the Reynolds numbers ($Re_1$, $Re_2$, $Re_3$), the fluid velocities ($u_1$, $u_2$, $u_3$) and flow rates ($Q_1$, $Q_2$, $Q_3$) of fluids 112, 116, 132 respectively. The velocities $u_1$, $u_2$, $u_3$ of fluids 112, 116, 132 may be defined according to the flow rates $Q_1$, $Q_2$, $Q_3$ of fluids 112, 116, 132 divided by the areas of their respective conduits upstream of contact regions 123, 127.

As discussed above, the Reynolds numbers described and/or claimed herein should be considered at or downstream of the location where different fluids first come into contact with one another (e.g. at or downstream of contact regions 123, 127). At this location (and downstream of this location), the characteristic dimension scale d may be considered to be the inner diameter (or other cross-sectional dimension) of the outer conduit. In the case of apparatus 110, for example, Reynolds numbers should be considered at or downstream of contact region 123, 127, where the characteristic dimension scale d is the inner diameter of the outer conduit 119, 134. Accordingly, one may characterize a Reynolds number of fluids 112, 116, 132 at or downstream of contact regions 123, 127. One may also describe the "local" Reynolds number (local Re) of reaction product 120A at or downstream of the contact region where fluids 112, 116 first come into contact (e.g. at or downstream of contact region 123 between fluids 112, 116 in the case of the FIG. 9A, 9B embodiment) and the "local" Reynolds number (local Re) of reaction product 120B at or downstream of the contact region where fluids 116, 132 first come into contact (e.g. at or downstream of contact region 127 between fluids 116, 132 in the case of the FIG. 9A, 9B embodiment). The local Re of the reaction product 120A may be expressed as $$Re_{pA} = \frac{\rho d u_c}{\mu_p};$$

where ρ is a characteristic density of the fluids 112, 116, 132 (where this characteristic density may reduce to that of water in the dilute limit), d is a characteristic dimension scale (e.g. the inner diameter of the outer conduit 119, 134), $u_c$ is a velocity parameter defined as the total flow rate $Q_t=\Sigma_i Q_i$ (where $Q_1$ is the flow rate of inner fluid 112, $Q_z$ is the flow rate of middle fluid 116 and $Q_3$ is the flow rate of outer fluid 132) divided by the cross-sectional area of outer conduit 119, 134 and $\mu_p$ is the apparent viscosity of the reaction product (e.g. reaction product 120A). In an analogous manner, the local Re of the reaction product 120B may be expressed as $$Re_{pB} = \frac{\rho d u_c}{\mu_p};$$

where ρ is a characteristic density of the fluids 112, 116, 132 (where this characteristic density may reduce to that of water in the dilute limit), d is a characteristic dimension scale (e.g. the inner diameter of the outer conduit 119, 134), $u_c$ is a velocity parameter defined as the total flow rate $Q_t=\Sigma_i Q_i$ (where $Q_1$ is the flow rate of inner fluid 112, $Q_2$ is the flow rate of middle fluid 116 and $Q_3$ is the flow rate of outer fluid 132) divided by the cross-sectional area of outer conduit 119, 134 and $\mu_p$ is the apparent viscosity of the reaction product (e.g. reaction product 120B).

The Reynolds numbers ($Re_1$, $Re_2$, $Re_3$) of the fluids 112, 116, 132 at or downstream of where they first come into contact (e.g. at or downstream of contact regions 123, 127) may be defined according to $$Re_1 = \frac{\rho d u_c}{\mu_1},\ Re_2 = \frac{\rho d u_c}{\mu_2} \text{ and } Re_3 = \frac{\rho d u_c}{\mu_3},$$

where $\mu_1$, $\mu_2$ and $\mu_3$ are the respective viscosities of fluids 112, 116, 132 and the other parameters have the meaning described above. The Damköhler values (Da) of the reactions in apparatus 110 (and the other apparatus described herein) may be defined according to $$Da = \frac{d r_\alpha}{u_c},$$

where $r_a$ is a reaction rate $r_a=kC_X$, where k is a rate constant specific to the particular reaction and $C_X$ is a concentration of species X in the reaction and the other parameters have the meanings discussed above.

The flow rates ($Q_1$, $Q_2$, $Q_3$) of inner, middle and outer fluids 112, 116, 132 (which impact the parameter $u_c$ discussed above) may be set such that the Reynolds numbers, $Re_1$, for inner fluid 112, $Re_2$, for middle fluid 116, and/or, $Re_3$, for outer fluid 132 may be greater than 100, 500, 1000 or 2000, based upon the local rheological properties of inner fluid 112, middle fluid 116 and outer fluid 132. In some embodiments, at least one of inner fluid 112, middle fluid 116 and outer fluid 132 may have a Reynolds number greater than 100, 500, 1000 or 2000. In some embodiments, at least two of (or all of) inner fluid 112, middle fluid 116 and outer fluid 132 may have a Reynolds number greater than 100, 500, 1000 or 2000. If the fluid rheology of any of fluids 112, 116, 132 is non-Newtonian, the viscosity of the fluid as used in the definition of the Reynold's number may be evaluated at the nominal shear rate, i.e. $u_c/d$.

The reaction rate between flowing fluids 112, 116 in reaction interface region 121 and between flowing fluids 116, 132 in reaction interface region 125 may generally be large (for example, in comparison to the advective or diffusive time scales), such that the Damköhler numbers (Da) of these reactions are large. The selection of the constituent parts of fluids 112, 116, 132 (e.g. reactants dissolved in fluids 112, 116, 132), and/or other properties of fluids 112, 116, 132 may be chosen to provide Damköhler numbers in reaction interface region 121 and/or 125 in a range of $10\text{-}10^6$ in some embodiments. In some embodiments, this range is $100\text{-}10^5$. The Damköhler value Da in these reaction interface regions may be less than $10^9$.

In reaction interface region 121, an inner reaction product 120A is created by a reaction between fluids 112, 116 and in reaction interface region 125, an outer reaction product 120B is created by a reaction between fluids 116, 132. Contact region 123, at the upstream extremity of reaction interface region 121 (e.g. where fluids 112, 116 first come into contact and inner reaction product 120A is first created) and contact region 127, at the upstream extremity of reaction interface region 125 (e.g. where fluids 116, 132 first come into contact and outer reaction product 120B is first created), may be referred to as the initial interfaces 123, 127. Since fluids 112, 116, 132 are flowing in longitudinal direction g, they carry reaction product 120 in longitudinal flow direction g, with the reaction continuing to occur in reaction interface regions 121, 125 downstream of initial interfaces 123, 127. It will be appreciated that in the illustrated embodiment of FIGS. 9A and 9B, where inner fluid 112 has a circular transverse cross-section and middle and outer fluids 116, 132 have annular transverse cross-sections, initial interfaces 123, 127 and reaction interface regions 121, 125 may have annular transverse cross-sections, which will tend to produce inner and outer reaction products 120A, 120B with an annular transverse cross-section and continuous length, i.e. tubes. If fluids 112, 116, 132 are able to continue to interact through inner and outer reaction products 120A, 120B, further chemical reaction may occur, thickening the transverse dimensions of inner and outer reaction products 120A, 120B at locations of reaction interface regions 121, 125 downstream of initial interfaces 123, 127.

Reaction products 120A, 120B may exist as intact, continuous and separate materials from fluids 112, 116, 132 and may exhibit clearly defined interfaces, such that reaction products 120A, 120B do not mix into fluids 112, 116, 132. If reaction products 120A, 120B behave as a fluid, the tubular shape of reaction products 120A, 120B may remain continuous (and fluids 112, 116 and 116, 132 will not mix) if the local Reynolds numbers of reaction products 120A, 120B, $Re_{pA}$, $Re_{pB}$ are sufficiently low. In some embodiments, these local Reynolds numbers $Re_{pA}$, $Re_{pB}$ of reaction products 120A, 120B are less than 100, 50, 20, 10, or 1. If reaction products 120A, 120B behave as solids, the tubular shape of reaction products 120A, 120B may remain continuous when the stress applied to reaction products 120A, 120B (due to their motion or otherwise) is less than the ultimate strength of the material of reaction products 120A, 120B.

The rheological properties of reaction products 120A, 120B may be dependent upon the concentrations of the reactants. If reaction products 120A, 120B behave as a solid and if the velocities $u_1$, $u_2$, $u_3$ of fluids 112, 116, 132 vary with time, the tubular shape of reaction products 120A, 120B may remain continuous (with possible variation of their inner and/or outer diameters) while the stress applied to cause their motion is less than the strength of the material of reaction products 120A, 120B. Outside of these criteria, reaction products 120A, 120B may not form a continuous tube and the reactive species (fluids 112, 116, 132) may mix across reaction interface regions 121, 125.

If the conditions are such that the reaction products 120A, 120B form continuous tubes (and fluids 112, 116, 132 do not mix), the trajectories of reaction products 120A, 120B may remain generally parallel to the longitudinal/flow direction g for various combinations of $[C_a, C_b, C_c, u_1, u_2, u_3, \mu_1, \mu_2, \mu_3, \rho_1, \rho_2, \rho_3, D_a, D_1, D_3]$ where $\mu_1$, $\mu_2$, $\mu_3$ are the apparent viscosity of the fluids 112, 116, 132; $\rho_1$, $\rho_2$, $\rho_3$ re the densities of the fluids 112, 116, 132 and $D_1$ and $D_3$ are the diffusivities of the reactants 112, 132 dissolved in fluid 116 into reaction products 120A, 120B. If the conditions are such that reaction products 120 form continuous tubes, then the thickness of the tube walls may increase at locations in reaction interface regions 121, 125 downstream of initial interfaces 123, 127. The mechanism for this increase in thickness at downstream locations may be a diffusive process, i.e. reactive species A and B diffuse into reaction interface region 121 and/or into reaction product 120A and reactive species B and C diffuse into reaction interface region 125 and/or into reaction product 120B. The growth of the tube walls of reaction products 120A, 120B may continue while reactive species A, B and C remain present in the system. Consequently, transverse dimensions of the tube walls of reaction products 120A, 120B may be controlled by removing one or more of the reactive species, for example by reaching the end of conduit 119 and allowing fluids 112, 116, 132 to spread transversely apart from one another out and/or away from reaction products 120A, 120B.

The transverse dimensions (e.g. inner and/or outer diameter) of reaction products 120A, 120B may be further controlled by varying inlet velocities $u_1$, $u_2$, $u_3$ (e.g. a ratio of inlet velocities $u_1$, $u_2$, $u_3$) upstream of initial interfaces 123, 127. If operated under suitable inlet velocity conditions, the transverse dimensions of reaction products 120A, 120B may be shaped accordingly. With varying inlet velocity conditions, the transverse dimensions of reaction products 120A, 120B may be made to vary along their axial lengths.

In some conditions, reaction products 120A, 120B may merge with one another to form a unitary reaction product 120 although this is not necessary. In some embodiments, reaction products 120A, 120B may remain spaced apart from one another. In some embodiments, reaction products 120A, 120B may come together in space but may not form a unitary reaction product. In some embodiments, reaction products 120A, 120B may exhibit mixing.

While a three-layer apparatus 110 (i.e. using three layers of fluids, inner fluid 112, middle fluid 116 and outer fluid 132) is shown and described herein, it will be appreciated that apparatus may be constructed with more than three layers of fluids.

Fiber-Reinforcement and Other Additives

Apparatus 10, 110 may be used to rapidly produce tough reinforced composite hydrogel tubes. Natural polymers such as alginate or nano-fibrillated cellulose (NFC) are particularly suitable as a hydrogel base because they gelate when contacted with a salt solution (such as $CaCl_2$). Apparatus 10, 110 may be used to produce strong composite tubing 120 that contains reinforcement fiber. Suitable additives for use in apparatus 10, 110 include, without limitation, a large variety of materials such as natural fibers, synthetic fibers, nanotube materials (e.g. carbon nanotubes) and/or the like. In some embodiments, such natural and/or synthetic fiber additives may have average aspect ratios (e.g. length to cross-sectional dimension) greater than 25:1. In some embodiments such additive average aspect ratios are greater than 50:1. In some embodiments such additive average aspect ratios are greater than 90:1. In some embodiments, the average length dimension of such natural and/or synthetic additives is greater than 1 mm. In some embodiments, the average length dimension of such additives is greater than 2 mm. In some embodiments, the average length dimension of such additives is greater than 5 mm.

FIGS. 10A and 10B (collectively FIG. 10) show the FIG. 9A apparatus 110 used to produce fiber-reinforced hydrogel tubing 120. Apparatus 110 of the FIG. 10 embodiment is the same as that shown in FIG. 9A and described above. In the FIG. 10 embodiment, inner fluid 112 and outer fluid 132 are both the same salt (e.g. $CaCl_2$) solutions and middle fluid 116 is a fiber-reinforced cross-linkable biopolymer (e.g. alginate) solution. As discussed above, a reaction takes place at the contact regions 123, 127 (see FIG. 10B) of layering between inner and middle fluids 112, 116 to produce inner-middle reaction product 120A and between middle and outer fluids 116, 132 to product middle-outer reaction product 120B. Reaction products 120A, 120B may merge with one another downstream of contact regions 123, 127 to form a unitary reaction product 120, although this is not necessary. In some embodiments, reaction products 120A, 120B may remain spaced apart from one another. In some embodiments, reaction products 120A, 120B may come together in space but may not form a unitary reaction product. In some embodiments, reaction products 120A, 120B may exhibit mixing. With the fiber reinforcement shown in FIG. 10, the stiffness of the fiber-reinforced tube (reaction product) 120 generated by apparatus 110 may be greater than that of reaction product 20 (without fiber reinforcement) generated by apparatus 10.

FIG. 11A illustrates that the results of experiments conducted (with a dynamic mechanical analyzer (DMA) and optical coherence tomography) to characterize the stress-strain curves for various alginate hydrogel tubes (reaction products) 120 produced using the FIG. 10 apparatus without fiber reinforcement for alginate concentrations of 1.5% (w/w) used as middle fluid 116 and 1% (w/w) $Ca^{2+}$ used as inner and outer fluids 112, 132 for various velocity ratios $u_3/u_2$. The velocities of the inner fluid 112 and outer fluid 132 were set to be equal to one another ($u_1=u_3$) and $Q_t=180$ mL/min for the experiments shown in FIG. 11A. Specifically, FIG. 11A shows a stress-strain curve 32 in the longitudinal (g) direction (machine direction (MD)) for $u_3/u_2=10$, a stress-strain curve 34 in the cross direction (CD) for $u_3/u_2=10$, and a stress-strain curve 36 in the longitudinal (g) direction (machine direction (MD)) for $u_3/u_2=0$. FIG. 11A also shows burst stress $\sigma_\theta(P)$ 38 for an alginate tube 120 made with $u_3/u_2=10$. FIG. 11B shows the effect of the alginate concentrations (0.75% (w/w) and 1.5% (w/w)) on the Young's modulus of the hydrogel tube (reaction product) 120 under the same experimental conditions and velocity ratios ($u_3/u_2$) shown in FIG. 11A.

The inventors explored the reinforcing properties of fiber additives by hydrodynamic alignment. Elongational stresses were generated in the FIG. 10 apparatus 110 by accelerating the fiber suspension in middle fluid 116 at the contact regions 123, 127. The resulting orientation distribution within the resultant reaction product 120 was measured using X-ray Tomography. The order of fiber alignment in the composite tubing reaction product 120 may be characterized using the order parameter $$S = \langle \frac{3}{2}\cos^2(90-\zeta) - \frac{1}{2} \rangle \quad (12)$$

where the angle $\zeta$ is the orientation of the fibers' major axes relative to the flow direction g.

The inventors found that that the fibers in the composite tubes 120 align in the flow (longitudinal) direction g by increasing the velocity difference between the fluid layers 112, 116, 132. This effect is shown in FIG. 11C, which depicts the effect of the velocity ratio $u_3/u_2$ (of outer fluid 132 to middle fluid 116) on the distribution ($\Psi$) of fiber orientations $\zeta$ (where $\zeta=0°$ corresponds to flow (longitudinal) direction g). The velocities of the inner fluid 112 and outer fluid 132 were set to be equal to one another ($u_1=u_3$) and $Q_t=180$ mL/min for the experiments shown in FIG. 11C. FIG. 11C shows a probability distribution of the orientation angle $\zeta$ clustered around a central value $\zeta=0°$ representing the axial flow direction. FIG. 11C shows that with increasing velocity ratio $u_3/u_2$, the spread in the distribution of orientation angle $\zeta$ diminishes, as characterized by the order parameter S.

The mechanical properties of the composite hydrogel tubes 120 generated using the FIG. 10 apparatus were measured with a dynamic mechanical analyzer (DMA) to generate the curves shown in FIG. 11D, which show stress-strain curves (in the longitudinal direction g) for alginate (A) tubing 120 produced using the FIG. 10 apparatus 110 using alginate 1.5% (w/w) and 1% (w/w) of a natural fiber additive (as middle fluid 116) and 1% (w/w) $Ca^{2+}$ as inner and outer fluids 112, 132 for various velocity ratios $u_3/u_2$. The velocities of the inner fluid 112 and outer fluid 132 were set to be equal to one another ($u_1=u_3$) and $Q_t=180$ mL/min for the experiments shown in FIG. 11D. FIG. 11D shows that, for the hydrogel matrix (reaction product 120) with added fibre, as the velocity ratio $u_3/u_2$ increases, the stiffness of the reaction product 120 increases in the region where the strain is less than the fiber length. The fracture energy of the composite reinforced tubing (reaction product) was 4100 $J/m^2$, defined as the integral of the stress-strain curve, at $u_3/u_2=15$. Without wishing to be bound by theory, the inventors attribute this strength enhancement to the stress achievable in apparatus 110 at the contact region 127 causing a reduction in the spread in orientation distribution (see FIG. 11C), as determined by x-ray tomography.

The inventors repeated their experiments using the apparatus 110 of FIG. 10 for reaction products 120 without fiber reinforcement and with fiber reinforcement at alginate and fiber concentrations of 1.5% and 1% (w/w) respectively for various velocity ratios $u_3/u_2$. FIG. 11E shows the elastic modulus of the fiber-reinforced (angled hatching) and non-fiber reinforced (dotted hatching) reaction products 120 at various velocity ratios $u_3/u_2$. The velocities of the inner fluid 112 and outer fluid 132 were set to be equal to one another ($u_1=u_3$) and $Q_t=180$ mL/min for the experiments shown in FIG. 11E.

It will be appreciated that while a number of particular reinforcement fibers are described herein, various embodiments may comprise or otherwise use a variety of different reinforcement fibers in the manner described herein. In some embodiments, other additives in addition or in the alternative to fibrous additives may be added to the various fluids to achieve desired functionality. Non-limiting examples of additives that could be added to the fluids of the apparatus described herein and could thereby be embedded in the reaction products described herein include drugs, fertilizer, biological materials (e.g. stem cells), photoluminescent materials, reactive species, antimicrobials ($TiO_2$, Ag colloids, etc.), additives to change the hydrophobicity of the outer surface (e.g. chitosan and/or the like), viscosity modifiers, other materials that provide additional functionality and/or the like.

Planar Embodiment

FIGS. 13A and 13B (collectively, FIG. 13) show cross-sections of a planar extrusion apparatus 310 for extruding a hydrogel reaction product 310 demonstrating that the operational principles of the invention described herein may be extended to different geometries. Except where specifically described herein, apparatus 310 may be similar to or the same as apparatus 10, 110 described herein.

In apparatus 310 shown in the FIG. 13 embodiment, the flow direction (out of the page in FIG. 13A and from left to right in FIG. 13B (as illustrated by arrow 311)) is generally orthogonal to the direction of gravity (e.g. generally horizontal flow direction), although this is not necessary. In some embodiments, apparatus 310 may be used with a flow direction that is within 30° of horizontal or within 15° of horizontal. In some embodiments, apparatus 310 may be used with a flow direction that coincides with the direction of gravity (e.g. a generally vertical flow direction). In some embodiments, apparatus 310 may be used with a flow direction that is within 30° of vertical or within 15° of vertical.

Apparatus 310 comprises an outer conduit 334 and a pair of parallel plates 314, 118, which provide conduits for flowing fluids 312, 316, 332, which flow in direction 311 and have generally rectangular cross-sections. With the orientation shown in FIG. 13, fluid 312 flows on the bottom, fluid 316 is a central fluid and fluid 332 flows on top. In some embodiments, flows 312, 332 comprise salt solutions (e.g. containing polyvalent metal ions such as $Ca^{2+}$) and central fluid flow 316 comprises alginate. As the geometry of apparatus 310 is rectangular, edge effects exist, where the flow field is not locally one-dimensional. Such edge effects create the potential for alternative and sometimes undesired reaction interfaces. The inventors have ascertained that such alternative reaction interfaces typically manifest as additional reaction fronts which propagates inwards, horizontally, from the edges. Deleteriously, this may result in plugging of the channel as the reaction products from these alternative reactions may stick to the sidewalls 331A, 331B (collectively, sidewalls 331). To overcome this, apparatus 310 may be designed such that central fluid flow 316 is narrower (in its cross-sectional dimension $w_2$) than the cross-sectional dimensions $w_1$, $w_3$ of lower and upper flows 312, 332 and the widths ($w_4$) of sidewalls 331 may be greater than the total thickness (h) of the layered fluids 312, 316, 332 so that any (horizontal) perturbation created by sidewalls 331 are dampened before contact with central fluid 316. Such structural properties may help to ensure that that the flow of lower and upper fluids 312, 332 are locally one-dimensional when contacted with central fluid 316.

In the illustrated FIG. 13 embodiment, fluids 312, 316, 332 come into contact with one another at contact regions 323, 327 to provide reaction products 320A, 320B in reaction interface regions 321, 325 within a bore of outer conduit 334. The lengths of outer conduit 334 and plates 314, 318 may be selected so that they are sufficiently long (in the flow direction 311) that the velocity profile of the fluids 312, 316, 332 become fully-developed, i.e. develop an invariant velocity profile in the longitudinal direction 311, before fluids 312, 316, 332 come into contact with one another and interact.

As illustrated in FIG. 13B, when plate 314 ends (i.e. at longitudinal locations downstream plate 314), flowing fluids 312, 316 are brought into contact with one another and begin to interact in unitary outer conduit 334. Similarly, when plate 318 ends (i.e. at longitudinal locations downstream of plate 318), flowing fluids 316, 332 are brought into contact with one another and begin to interact in unitary outer conduit 334. The longitudinal locations of the ends of plates 314, 318 may be the same, although this is not necessary. In some embodiments, the end of one of plate 314 and plate 318 is at a different location than the end of the other one of plate 314 and plate 318. The interaction of fluids 312, 316, 332 produces a reaction product 320. In some embodiments, the reaction product 320 may be an extruded structure 320, such as a hydrogel sheet or film.

Fluids 312, 316 come together (i.e. into contact) at a contact region 323 (which may comprise a contact surface 323). In the case of the illustrated FIG. 13 embodiment, contact region 323 coincides with the downstream end of plate 314. At contact region 323, fluids 312, 316 begin to react with one another to create a reaction interface region 321 at locations downstream from contact region 323. Contact region 323 may be at the upstream extremity of reaction interface region 321. Fluids 312, 316 may be in contact with one another in contact region 323 and, downstream of contact region 323, may be separated from one another by a first reaction product 320A. At contact region 323, where fluids 312, 316 come into contact, and downstream of contact region 323 in reaction interface region 321, a chemical reaction, or other reaction such as a change of state, may occur between fluid 312 and fluid 316. In some embodiments, fluid 312 may comprise a solvent and a reactive species A at a concentration $C_a$ while fluid 316 comprises a solvent and a reactive species B at a concentration $C_b$. At contact region 323, where fluids 312, 316 come into contact, and downstream of contact region 323 in reaction interface region 321, a chemical reaction between reactive species A and reactive species B produces a first reaction product 320A. In the FIG. 13 embodiment, the reaction may be localized to a generally planar reaction interface region 321 downstream of contact region 323. Reaction interface region 321 (and reaction product 320A) may grow in transverse thickness (e.g. reaction product 320A may get thicker in its transverse cross-sectional dimension (shown as vertical in FIG. 13B)) as fluids 312, 316 flow in longitudinal direction 311.

Fluids 316, 332 come together (i.e. into contact) at a contact region 327 (which may comprise a contact surface 327). In the case of the illustrated FIG. 13 embodiment, contact region 327 coincides with the downstream end of plate 316. At contact region 327, fluids 316, 332 begin to react with one another to create a reaction interface region 325 at locations downstream from contact region 327. Contact region 327 may be at the upstream extremity of reaction interface region 325. Fluids 316, 332 may be in contact with one another in contact region 327 and, downstream of contact region 327, may be separated from one another by a second reaction product 320B. Reaction products 320A, 320B may be collectively and individually referred to herein as reaction product 320. At contact region 327, where fluids 316, 332 come into contact, and downstream of contact region 327 in reaction interface region 325, a chemical reaction, or other reaction such as a change of state, may occur between fluids 316, 332. In some embodiments, fluid 316 may comprise a solvent and a reactive species B at a concentration $C_b$ while fluid 332 comprises a solvent and a reactive species C at a concentration $C_c$. In some embodiments, the reactive species C of fluid 332 is the same as the reactive species A of fluid 312, although this is not necessary. At contact region 327, where fluids 316, 332 come into contact, and downstream of contact region 327 in reaction interface region 325, a chemical reaction between reactive species B and reactive species C produces second reaction product 320B. In the FIG. 13 embodiment, the reaction may be localized to a generally planar reaction interface region 325 downstream of contact region 327. Reaction interface region 325 (and reaction product 320B) may grow in transverse thickness (e.g. reaction product 320B may get thicker in its transverse cross-sectional dimension (shown as vertical in FIG. 13B)) as fluids 316, 332 flow in longitudinal direction 311.

Apparatus 310 can be used to create conditions (e.g. in reaction interface regions 321, 325 between flowing fluids 312, 316, 332) which prevent or mitigate the mixing of otherwise miscible flowing fluids 312, 316 and 316, 332. Such conditions can be characterized by, for example, the local Reynolds number (local Re) of the reaction products 320A, 320B in interface regions 321, 325 between fluids 312, 316 and 316, 332 (defined using the viscosity of the reaction product 120A, 120B). Such conditions may also be characterized by the Damköhler values (Da) of the reactions, and the Reynolds numbers ($Re_1$, $Re_2$, $Re_3$), the fluid velocities ($u_1$, $u_2$, $u_3$) and the flow rates ($Q_i$, $Q_2$, $Q_3$) of fluids 312, 316, 332 respectively. The velocities $u_1$, $u_2$, $u_3$ of fluids 312, 316, 332 may be defined according to the flow rates $Q_1$, $Q_2$, $Q_3$ of fluids 312, 316, 332 divided by the areas of their respective conduits upstream of contact regions 323, 327.

As discussed above, the Reynolds numbers described and/or claimed herein should be considered at or downstream of the location where different fluids first come into contact with one another (e.g. at or downstream of contact regions 323, 327). At this location (and downstream of this location), the characteristic dimension scale d may be considered to be a cross-sectional dimension of the outer conduit 334. In the case of apparatus 310, for example, Reynolds numbers should be considered at or downstream of contact region 323, 327, where the characteristic dimension scale d is a cross-sectional dimension of outer conduit 334. Accordingly, one may characterize a Reynolds number of fluids 312, 316, 332 at or downstream of contact regions 323, 327. One may also describe the "local" Reynolds number (local Re) of reaction product 320A at or downstream of the contact region where fluids 312, 316 first come into contact (e.g. at or downstream of contact region 323 between fluids 312, 316 in the case of the FIG. 13 embodiment) and the "local" Reynolds number (local Re) of reaction product 320B at or downstream of the contact region where fluids 316, 332 first come into contact (e.g. at or downstream of contact region 327 between fluids 316, 332 in the case of the FIG. 13 embodiment). The local Re of the reaction product 320A may be expressed as $$Re_{pA} = \frac{\rho d u_c}{\mu_p};$$

where ρ is a characteristic density of the fluids 312, 316, 332 (where this characteristic density may reduce to that of water in the dilute limit), d is a characteristic dimension scale (e.g. a cross-sectional dimension of outer conduit 334), $u_c$ is a velocity parameter defined as the total flow rate $Q_t=\Sigma_i Q_i$ (where $Q_1$ is the flow rate of first fluid 312, $Q_2$ is the flow rate of second fluid 316 and 3 is the flow rate of third fluid 332) divided by the cross-sectional area of outer conduit 334 and $\mu_p$ is the apparent viscosity of the reaction product (e.g. reaction product 320A). In an analogous manner, the local Re of the reaction product 320B may be expressed as $$Re_{pB} = \frac{\rho d u_c}{\mu_p};$$

where ρ is a characteristic density of the fluids 312, 316, 332 (where this characteristic density may reduce to that of water in the dilute limit), d is a characteristic dimension scale (e.g. a cross-sectional dimension of outer conduit 334), $u_c$ is a velocity parameter defined as the total flow rate $Q_t=\Sigma_i Q_i$ (where $Q_1$ is the flow rate of first fluid 312, $Q_2$ is the flow rate of second fluid 316 and $Q_3$ is the flow rate of third fluid 332) divided by the cross-sectional area of outer conduit 334 and $\mu_p$ is the apparent viscosity of the reaction product (e.g. reaction product 320B).

The Reynolds numbers ($Re_1$, $Re_2$, $Re_3$) of the fluids 312, 316, 332 at or downstream of where they first come into contact (e.g. at or downstream of contact regions 323, 327) may be defined according to $$Re_1 = \frac{\rho d u_c}{\mu_1},\ Re_2 = \frac{\rho d u_c}{\mu_2} \text{ and } Re_3 = \frac{\rho d u_c}{\mu_3},$$

where $\mu_1$, $\mu_2$ and $\mu_3$ are the respective viscosities of fluids 312, 316, 332 and the other parameters have the meaning described above. The Damköhler values (Da) of the reactions in apparatus 310 (and the other apparatus described herein) may be defined according to $$Da = \frac{d r_a}{u_c},$$

where $r_a$ is a reaction rate $r_a$=k$C_X$, where k is a rate constant specific to the particular reaction and $C_X$ is a concentration of species X in the reaction and the other parameters have the meanings discussed above.

The flow rates ($Q_1$, $Q_2$, $Q_3$) of first, second and third fluids 312, 316, 332 (which impact the parameter $u_c$ as discussed above) may be set such that the Reynolds numbers, $Re_1$, for fluid 312, $Re_2$, for fluid 316, and/or, $Re_3$, for fluid 332 may be greater than 100, 500, 1000 or 2000 based upon the based upon the local rheological properties of fluid 312, fluid 316 and fluid 332. In some embodiments, at least one of fluids 312, 316 and 332 may have a Reynolds number greater than 100, 500, 1000 or 2000. In some embodiments, at least two of (or all of) fluids 312, 316 and 332 may have a Reynolds number greater than 100, 500, 1000 or 2000. If the fluid rheology of any of fluids 312, 316, 332 is non-Newtonian, the viscosity of the fluid as used in the definition of the Reynold's number may be evaluated at the nominal shear rate, i.e. $u_c$/d.

The reaction rate between flowing fluids 312, 316 in reaction interface region 321 and between flowing fluids 316, 332 in reaction interface region 325 may generally be large (for example, in comparison to the advective or diffusive time scales), such that the Damköhler numbers (Da) of these reactions are large. The selection of the constituent parts of fluids 312, 316, 332 (e.g. reactants dissolved in fluids 312, 316, 332), and/or other properties of fluids 312, 316, 332 may be chosen to provide Damköhler numbers in reaction interface region 321 and/or 325 in a range of 10-$10^6$ in some embodiments. In some embodiments, this range is 100-$10^5$. The Damköhler value Da in these reaction interface regions may be less than $10^9$.

In reaction interface region 321, reaction product 320A is created by a reaction between fluids 312, 316 and in reaction interface region 325, reaction product 320B is created by a reaction between fluids 316, 332. Contact region 323, at the upstream extremity of reaction interface region 321 (e.g. where fluids 312, 316 first come into contact and reaction product 320A is first created) and contact region 327, at the upstream extremity of reaction interface region 325 (e.g. where fluids 316, 332 first come into contact and reaction product 320B is first created), may be referred to as the initial interfaces 323, 327. Since fluids 312, 316, 332 are flowing in longitudinal direction 311, they carry reaction product 320 forward, with the reaction continuing to occur in reaction interface regions 321, 325 downstream of initial interfaces 323, 327. If fluids 312, 316, 332 are able to continue to interact through reaction products 320A, 320B, further chemical reaction may occur, thickening the transverse dimensions of inner and outer reaction products 320A, 320B at locations of reaction interface regions 321, 325 downstream of initial interfaces 323, 327.

Reaction products 320A, 320B may exist as intact, continuous and separate materials from fluids 312, 316, 332 and may exhibit clearly defined interfaces, such that reaction products 320A, 320B do not mix into fluids 312, 316, 332. If reaction products 320A, 320B behave as a fluid, the shape of reaction products 320A, 320B may remain continuous (and fluids 312, 316 and 316, 332 will not mix) if the local Reynolds numbers of reaction products 320A, 320B, $Re_{pA}$, $Re_{pB}$ are sufficiently low. In some embodiments, these local Reynolds numbers $Re_{pA}$, $Re_{pB}$ of reaction products 320A, 320B are less than 100, 50, 20, 10, or 1. If reaction products 320A, 320B behave as solids, the shape of reaction products 320A, 320B may remain continuous when the stress applied to reaction products 320A, 320B (due to their motion or otherwise) is less than the ultimate strength of the material of reaction products 320A, 320B.

The rheological properties of reaction products 320A, 320B may be dependent upon the concentrations of the reactants. If reaction products 320A, 320B behave as a solid and if the velocities $u_1$, $u_2$, $u_3$ of fluids 312, 316, 332 vary with time, the shape of reaction products 320A, 320B may remain continuous (with possible variation of their dimensions) while the shear stress (generated by motion evaluated at the interface) applied to cause its motion is less than the strength of the material of reaction products 320A, 320B. Outside of these criteria, reaction products 320A, 320B may not form a continuous product and the reactive species (fluids 312, 316, 332) may mix across reaction interface regions 321, 325.

If the conditions are such that the reaction products 320A, 320B form continuous sheets or films, the trajectories of reaction products 320A, 320B may remain generally parallel to the longitudinal/flow direction 311 for various combinations of [$C_a$, $C_b$, $C_c$, $u_1$, $u_2$, $u_3$, $\mu_1$, $\mu_2$, $\mu_3$, $\rho_1$, $\rho_2$, $\rho_3$, $D_a$, $D_1$, $D_3$] where $\mu_1$, $\mu_2$, $\mu_3$ are the apparent viscosity of the fluids 312, 316, 332; $\rho_1$, $\rho_2$, $\rho_3$ re the densities of the fluids 312, 316, 332 and $D_1$ and $D_3$ are the diffusivity of the reactants 312, 316 dissolved in fluid 316 into reaction products 320A, 320B. If the conditions are such that reaction products 320 form continuous reaction products 320A, 320B, then the thickness of the reaction product walls may increase at locations in reaction interface regions 321, 325 downstream of initial interfaces 323, 327. The mechanism for this increase in thickness at downstream locations may be a diffusive process, i.e. reactive species A and B diffuse into reaction interface region 321 and/or into reaction product 320A and reactive species B and C diffuse into reaction interface region 325 and/or into reaction product 320B. The growth of the walls of reaction products 320A, 320B may continue while reactive species A, B and C remain present in the system. Consequently, transverse dimensions of the walls of reaction products 320A, 320B may be controlled by removing one or more of the reactive species, for example by reaching the end of conduit 334 and allowing fluids 312, 316, 332 to spread transversely apart from one another out and/or away from reaction products 120A, 120B.

The transverse dimensions of reaction products 320A, 320B may be further controlled by varying inlet velocities $u_1$, $u_2$, $u_3$ (e.g. a ratio of inlet velocities $u_1$, $u_2$, $u_3$) upstream of initial interfaces 323, 327. If operated under suitable inlet velocity conditions, the transverse dimensions of reaction products 320A, 320B may be shaped accordingly. With varying inlet velocity conditions, the transverse dimensions of reaction products 320A, 320B may be made to vary along their axial lengths.

In some conditions, reaction products 320A, 320B may merge with one another to form a unitary reaction product 320, although this is not necessary. In some embodiments, reaction products 320A, 320B may remain spaced apart from one another. In some embodiments, reaction products 320A, 320B may come together in space but may not form a unitary reaction product. In some embodiments, reaction products 320A, 320B may exhibit mixing.

Cross-Sectional Shaping

The inventors also tested varying the volumetric flow rates ($Q_1$, $Q_2$) of inner and outer fluids 12, 16 the FIG. 1 apparatus 10 between two previously established stable operating condition sets with time to determine the impact of time variation on the shape of reaction product (hydrogel tube) 20. FIG. 14A shows a representative period of how the volumetric flow rates ($Q_1$, $Q_2$) of inner and outer fluids 12, 16 were varied in apparatus 10 in accordance with one particular experiment. In the particular experiment shown in FIG. 14A, the waveforms of this volumetric flow rate variation were repeated every 3.0s. FIG. 14B shows the results of the FIG. 14A volumetric flow rate variation on the outer radius (shown as r in FIG. 14B) of the reaction product (tube) 20. Specifically, FIG. 14B shows a ratio of the outer radius r of reaction product 20 to the inner radius (shown as R in FIG. 14B) of outer conduit 18, 19 versus $tf_c$, where t is time and $f_c=(3.0\ s)^{-1}$ is the frequency of the FIG. 14A volumetric flow rate period. FIG. 14B shows that varying the relative flow rates ($Q_1$, $Q_2$) of inner and outer fluids 12, 16 leads to corresponding changes in the inner radius r (i.e. the inner diameter) of reaction product 20. Specifically, as the volumetric flow rate $Q_1$ of inner fluid 12 increases relative to the volumetric flow rate $Q_2$ of outer fluid 16, the outer diameter of reaction product 20 increases (i.e. the reaction product 20 is thicker) and as the volumetric flow rate $Q_1$ of inner fluid 12 decreases relative to the volumetric flow rate $Q_2$ of outer fluid 16, the outer diameter of reaction product 20 decreases (i.e. the reaction product 20 is thinner).

Tube Applications—Blood Compatibility

The inventors test tubes 20,120 extruded using apparatus 10, 110 up to a fluid pressure of 35 kPa, well above the potential range of human blood pressure (~9-25 kPa), and approaches the arterial chamber pressure (~46 kPa) and venous chamber pressure (~35 kPa) in hemodialysis machines. Because it has been reported in the past that material spallation (or the liberation of tubing fragments from the luminal surface of ECC tubes into the blood path) promotes the formation of blood clots and is a major detriment to blood compatibility, several long-time flow studies were conducted (t>200 hours, Q=68 mL/min, with 50% glycerol) using tubes 20. The inventors have observed that for within experimental limitations of wall thickness variation greater than ~200 μm, the results show promise in limiting spallation for transporting blood.

FIG. 12A shows schematically that the adsorption of pro-inflammatory complement proteins, platelet adhesion and red cell hemolysis are important markers of biomaterial compatibility of a material with whole blood. Specifically, FIG. 12A shows a schematic illustration of platelet mediated thrombus formation on ECC tubing. FIG. 12B shows the experimental set up of how the inventors tested the blood compatibility of extruded hydrogel tubing 20 using alginate as inner fluid 12 and both $CaCl_2$ and $MgCl_2$ as outer fluid 16 under ECC-like conditions. The FIG. 12B tube 40 comprises the series connection of PVC tube section 42 and hydrogel tubing 20 (tube section 44) formed using apparatus 10 (made with 3% alginate as inner fluid 12 and 2% $CaCl_2$ and $MgCl_2$ as outer fluid 16). Tube 40 was filled with whole blood. FIGS. 12B_(i)-(iv) show scanning electron microscopy (SEM) images of the inner wall of PVC tube portion 42 and hydrogel tube portion 44 before and after incubation with whole blood. Specifically, FIGS. 12B_(i)-(ii) show PVC tubing 42 before and after incubation and FIGS. 12B_(iii)-(iv) show hydrogel tubing 44 formed using apparatus 10 before and after incubation. A visible decrease in platelet adhesion and activation on the hydrogel tubing 44 formed using apparatus 10 (relative to PVC tubing 42) can be seen in these SEM images.

FIG. 12C shows platelet deposition on the material surface of the FIG. 12B tube portions (PVC tube portion 42 and hydrogel tube portion 44) as quantified by lactate dehydrogenase (LDH) release. FIG. 12C demonstrates that after 4 hrs of whole blood circulation extruded hydrogel tube portion 44 rapidly attenuated platelet adhesion by ~6-fold relative to PVC tube portion 42. FIG. 12D shows the deposition of pro-inflammatory complement protein $C_3$ on the inner wall of the FIG. 12B PVC tube portion 42 and hydrogel tube portion 44 following whole blood exposure. Paired comparisons using a non-parametric t-test are significant with $p<0.001$. That is, the data of FIGS. 12C and 12D shows strong evidence that the null-hypothesis can be rejected. The deposition of the pro-inflammatory $C_3$ complement protein and red blood cell hemolysis was similar in both materials, suggesting that the extruded hydrogel tubing portion 44 performs as well as the clinical standard PVC tubing 42.

As discussed above, with respect to apparatus 10, a hydrogel tube (reaction product) 20 is formed in-situ (e.g. in apparatus 10) by a reaction (e.g. a cross-linking reaction) where the local Reynolds number of reaction product 20 in the reaction interface region 21 is Re~O(10) and the rate of the reaction (e.g. gelation or polymerization) is rapid in comparison to the diffusive and advective time scales. These methods and apparatus can be extended to the FIG. 10 apparatus 110 with the inertial triple-layer extrusion apparatus where chemical composition between the layers is coupled to the local rheology.

Blood Compatibility Tests

Whole blood was collected from healthy donors into citrate vacutainer tubes. Heparin was added to the collected blood to give a final concentration of 0.7 U/mL and was recalcified before each experiment by adding calcium chloride solution to give a final concentration of 2.2 mM.

A closed loop was prepared using 25 cm of medical grade PVC tubing connected to ~7 cm of extruded tubing 20 of an approximately equal internal diameter (~3.18 mm). The mechanical properties of the extruded tube 20 were examined beforehand by dynamical mechanical analysis (TA Instruments™ DMA Q800) and by measuring the pressure drop along a 1 m long, open ended, sample under flow. The volumetric flow-rate was set with a syringe pump, where the deflection of the inner wall was recorded with Optical Coherence Tomography (OCT, ThorLabs™). Estimates of the hoop stress were determined by the relation $$\sigma_\theta(P) = P\frac{R_i^2 + R_o^2}{R_o^2 - R_i^2},$$

where $R_i(P)$ and $R_o(P)$ are the tubes inner and outer radius at fluid pressure P (gage), respectively.

The mixed material tubing loop for the blood compatibility test was placed in a peristaltic roller pump (WF300-TH16, PreFluid) and sterilized with 70% ethanol at a flow-rate of 68 mL/min for 5 minutes. The loop was then washed thoroughly with sterile phosphate buffered saline (PBS). The blood was introduced into the loop prior to inserting it into the roller pump. All bubbles were removed by flowing the blood against gravity. The blood was circulated in the loop for 4 hrs at 68 mL/min and 37° C. to resemble the shear stress acting on the boundary of extra corporal circuits (ECCs). After circulation, the blood was removed from the tubing and the substrates were gently washed with PBS buffer and left to incubate for 2 hours in PBS before further analysis.

Hemolysis measurements were recorded before and after circulation to see the effects of circulation on erythrocyte damage. Samples of 1 mL of recalcified, heparinized whole blood were taken both before and after circulation and centrifuged for 2 minutes at 12 kg. 100 μL of supernatant was taken from the spun down samples and added to 550 μL Drabkins solution. The hemoglobin content of the supernatant was measured in triplicate through UV/Vis spectroscopy ($\lambda_{abs}$=540 nm).

Following the 4 hour exposure to blood, a washed 1 cm segment of tubing was fixed overnight with 2.5% glutaraldehyde. The tube was cut longitudinally to obtain a flat piece of material and washed three times with PBS. The samples were incubated in the FITC labelled anti-human component $C_3$ Monoclonal Antibody (product number CL7631F, Cedarlane™, Canada) in PBC buffer solution (0.5 mL at concentration 1:20 dilution) for 1 hour at room temperature. A second sample of material was incubated in the FITC labelled Mouse IgG1 isotype control in PBS buffer solution under identical concentrations and conditions as the $C_3$ antibody. Both samples were washed 3 times with PBS and images using confocal microscopy. Specific protein adsorption was obtained by measuring the intensity difference between the $C_3$ antibody and the isotype samples.

Platelet adhesion on the printed tubing was also quantified using lactate dehydrogenase (LDH) assay. A 2 cm segment of PBS washed tubing was incubated with 1.5 mL of 0.1% Triton X-100 buffer for 1 hour at room temperature. The LDH activity of the supernatant was measured in triplicated following the protocol given with the commercial kit (LDH-cytotoxicity colorimetric assay kit by Biovision™). A calibration curve was created using serial dilutions of a platelet suspension of known concentration lysed under identical conditions.

Samples from the three independent blood loop experiments (i.e. 3 donors) were prepared for scanning electron microscopy (SEM) (Hitachi™ S3000N VP-SEM). The inner surfaces of the tubing were gently washed three times with 1 mL of PBS buffer (0.15 M) for 10 seconds each and then fixed in 2.5% glutaraldehyde with PBS (1 mL) for 1 hour. The tubes were then cut into quadrants to expose the inner surface of the tubing, rinsed three times with PBS, followed by three rinses with milli-Q water, and dehydrated through standard critical point drying. The samples were sputter coated with gold (Edwards S150 Sputter Coater) to enhance contrast. SEM images were taken at 5 random locations along the inner wall of the tubing using an operating voltage of 10 kV and a magnification of 1000×.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method of moving materials to create a reaction product, the method comprising:

flowing a first fluid in an axial direction;

flowing a second fluid in the axial direction, the first and second fluids miscible with one another and the first and second fluids having an interface region therebetween; and permitting a reaction to create a reaction product in the interface region, the reaction product mitigating flow-disrupting mixing between the first and second fluids;

wherein inertial forces of the first fluid are greater than viscous forces of the first fluid such that a Reynolds number of the first fluid at an axial location corresponding to an upstream-most extent of the interface region is greater than 500.

2. The method of claim 1 wherein the inertial forces of the first fluid are greater than the viscous forces of the first fluid such that the Reynolds number of the first fluid at the axial location corresponding to the upstream-most extent of the interface region is greater than 1000.

3. The method of claim 1 wherein inertial forces of the second fluid are greater than viscous forces of the second fluid such that a Reynolds number of the second fluid at the axial location corresponding to the upstream-most extent of the interface region is greater than 500.

4. The method of claim 1 wherein inertial forces of the second fluid are greater than viscous forces of the second fluid such that a Reynolds number of the second fluid at the axial location corresponding to the upstream-most extent of the interface region is greater than 100.

5. The method of claim 1 wherein a flow of one or more of the first and second fluids is turbulent.

6. The method of claim 1 wherein the reaction in the interface region is characterized by a Damköhler value less than $10^9$.

7. The method of claim 1 wherein the reaction product flows in the axial direction with a local Reynolds number of the reaction product in the interface region of less than 100.

8. A method of moving materials to create a reaction product, the method comprising:

flowing a first fluid in an axial direction;

flowing a second fluid in the axial direction, the first and second fluids miscible with one another and the first and second fluids having an interface region therebetween; and permitting a reaction to create a reaction product in the interface region, the reaction product mitigating flow-disrupting mixing between the first and second fluids;

modifying one or more of a first fluid inlet velocity and a second fluid inlet velocity to control a cross-sectional dimension of the reaction product;

wherein inertial forces of the first fluid are greater than viscous forces of the first fluid such that a Reynolds number of the first fluid at an axial location corresponding to an upstream-most extent of the interface region is greater than 100.

9. The method of claim 1 wherein, in the interface region, a rate of rheological change associated with the reaction is greater than a rate of advection of the first and second fluids.

10. The method of claim 1 wherein, in the interface region, the reaction causes a local rheological change wherein a ratio of local viscous forces to local inertial forces in the interface region is less than about 1.25.

11. The method of claim 1 wherein, in the interface region, the reaction causes a local rheological change wherein viscous forces in the interface region are less than the inertial forces in the interface region.

12. The method of claim 1 wherein the first fluid is a solution of a first reactant and the second fluid is a solution of a second reactant, wherein the first reactant is a polyvalent cation and the second reactant is an alginate and the reaction product is a hydrogel.

* * * * *